(12) United States Patent
Yoeli

(10) Patent No.: US 8,833,692 B2
(45) Date of Patent: Sep. 16, 2014

(54) WALL EFFECTS ON VTOL VEHICLES

(75) Inventor: Raphael Yoeli, Tel-Aviv (IL)

(73) Assignee: Urban Aeronautics Ltd., Yavne (IL)

( * ) Notice: Subject to any disclaimer, the term of this patent is extended or adjusted under 35 U.S.C. 154(b) by 846 days.

(21) Appl. No.: 12/516,257

(22) PCT Filed: Nov. 27, 2007

(86) PCT No.: PCT/IL2007/001465
§ 371 (c)(1),
(2), (4) Date: Aug. 10, 2009

(87) PCT Pub. No.: WO2008/065654
PCT Pub. Date: Jun. 5, 2008

(65) Prior Publication Data
US 2010/0051753 A1      Mar. 4, 2010

Related U.S. Application Data

(60) Provisional application No. 60/867,238, filed on Nov. 27, 2006.

(51) Int. Cl.
*B64C 29/00* (2006.01)

(52) U.S. Cl.
USPC ........................................ 244/23 A

(58) Field of Classification Search
USPC ........ 244/12, 3, 12.6, 23 R, 23 A, 23 B, 53 R
See application file for complete search history.

(56) References Cited

U.S. PATENT DOCUMENTS

| | | | |
|---|---|---|---|
| 1,287,076 A | 12/1918 | Moses | |
| 2,077,471 A | 4/1937 | Fink | |
| 2,138,999 A | 12/1938 | Clark | |
| 2,242,201 A | 5/1941 | Woods | |
| 2,273,724 A | 2/1942 | Nelson et al. | |
| D155,004 S | 8/1949 | Gluhareff | |
| 2,709,947 A | 6/1955 | Woods | |
| 2,734,699 A * | 2/1956 | Lippisch | 244/23 R |
| 2,734,705 A | 2/1956 | Robertson | |
| 2,777,649 A | 1/1957 | Williams | |
| 2,812,636 A | 11/1957 | Kadosch et al. | |
| 2,899,149 A | 8/1959 | Breguet | |

(Continued)

FOREIGN PATENT DOCUMENTS

| | | |
|---|---|---|
| EP | 0 236583 | 9/1987 |
| EP | 0 553490 | 8/1993 |

(Continued)

OTHER PUBLICATIONS

U.S. Appl. No. 12/549,872 (Yoeli) filed Aug. 28, 2009.

(Continued)

*Primary Examiner* — Joseph W Sanderson
(74) *Attorney, Agent, or Firm* — Nixon & Vanderhye P.C.

(57) ABSTRACT

Ducted air flow vehicle that includes a fuselage having a longitudinal axis, supporting at least one air flow duct and a prime mover arranged to force surrounding air into the duct through an inlet at an upper end of the duct with normally symmetrical airflow streams, thereby creating a lift force directed substantially along a duct axis; a plurality of vanes extending across the inlet, substantially parallel to the longitudinal axis; and wherein one or more groups of the vanes are selectively pivotable to align with adjacent abnormal asymmetrical airflow streams.

4 Claims, 81 Drawing Sheets

(56) References Cited

U.S. PATENT DOCUMENTS

| | | |
|---|---|---|
| 2,930,544 A | 3/1960 | Howell |
| 2,936,969 A | 5/1960 | Griffith et al. |
| 2,939,649 A | 6/1960 | Shaw |
| 2,951,661 A | 9/1960 | Dorman et al. |
| 2,955,780 A | 10/1960 | Hulbert |
| 2,968,453 A | 1/1961 | Bright |
| 2,973,921 A | 3/1961 | Price |
| 2,975,676 A | 3/1961 | Butler |
| 2,988,301 A | 6/1961 | Fletcher |
| 3,033,493 A | 5/1962 | Wilde et al. |
| 3,039,537 A | 6/1962 | Heidelberg |
| 3,058,693 A * | 10/1962 | Doak .................. 244/23 A |
| 3,082,977 A | 3/1963 | Arlin |
| 3,088,695 A | 5/1963 | Clark |
| 3,090,581 A | 5/1963 | Einarsson |
| 3,116,898 A | 1/1964 | Clark et al. |
| 3,136,500 A | 6/1964 | Kerry |
| 3,139,244 A | 6/1964 | Bright |
| 3,161,374 A | 12/1964 | Allred et al. |
| 3,167,273 A | 1/1965 | Calderon |
| 3,174,573 A | 3/1965 | Chaplin |
| 3,179,353 A | 4/1965 | Peterson |
| 3,179,354 A | 4/1965 | Alvarez-Calderon |
| 3,181,810 A | 5/1965 | Olson |
| 3,184,183 A | 5/1965 | Piasecki |
| 3,187,817 A | 6/1965 | Colley |
| 3,198,082 A | 8/1965 | Kerris |
| 3,201,067 A | 8/1965 | Meyerhoff |
| 3,203,645 A | 8/1965 | Shaw |
| 3,223,354 A | 12/1965 | Seibold et al. |
| 3,224,712 A | 12/1965 | Taylor et al. |
| 3,231,221 A | 1/1966 | Platt |
| 3,244,246 A | 4/1966 | Weiland |
| 3,259,343 A | 7/1966 | Roppel |
| 3,262,511 A | 7/1966 | Carr |
| 3,262,657 A | 7/1966 | Anker-Holth |
| 3,265,329 A | 8/1966 | Postelson-Apostolescu |
| 3,276,528 A | 10/1966 | Tucknott et al. |
| 3,289,977 A | 12/1966 | Staats |
| 3,350,035 A | 10/1967 | Schlieben |
| 3,360,217 A | 12/1967 | Trotter |
| 3,383,074 A | 5/1968 | Coplin |
| 3,384,327 A | 5/1968 | Postelson-Apostolescu |
| 3,397,852 A | 8/1968 | Katzen |
| 3,397,854 A | 8/1968 | Reyle |
| 3,454,238 A | 7/1969 | Goodson |
| 3,463,420 A | 8/1969 | Butler et al. |
| 3,481,559 A | 12/1969 | Postelson-Apostolescu |
| 3,519,224 A | 7/1970 | Boyd et al. |
| 3,559,921 A | 2/1971 | Timperman |
| 3,580,530 A | 5/1971 | Wada |
| 3,584,810 A | 6/1971 | Velton |
| 3,606,208 A | 9/1971 | Postelson-Apostolescu |
| 3,614,030 A | 10/1971 | Moller |
| 3,627,235 A | 12/1971 | Lippisch |
| 3,633,849 A | 1/1972 | Kling |
| 3,665,809 A | 5/1972 | Darlington et al. |
| 3,713,748 A | 1/1973 | Langley |
| 3,752,417 A | 8/1973 | Lagace |
| 3,827,527 A | 8/1974 | Bertelsen |
| 3,873,049 A | 3/1975 | Horsdal |
| 3,904,155 A | 9/1975 | Chavis |
| 3,912,201 A | 10/1975 | Bradbury |
| 3,955,780 A | 5/1976 | Postelson |
| 3,972,490 A | 8/1976 | Zimmermann et al. |
| 4,022,405 A | 5/1977 | Peterson |
| 4,043,421 A | 8/1977 | Smith |
| 4,071,207 A | 1/1978 | Piasecki et al. |
| 4,149,688 A | 4/1979 | Miller, Jr. |
| 4,171,784 A | 10/1979 | Eickmann |
| 4,194,707 A | 3/1980 | Sharpe |
| 4,469,294 A | 9/1984 | Clifton |
| 4,505,442 A | 3/1985 | Kirsch et al. |
| 4,505,443 A | 3/1985 | Bradfield et al. |
| 4,537,372 A | 8/1985 | Forizs |
| 4,598,890 A | 7/1986 | Herzog et al. |
| 4,701,602 A | 10/1987 | Schaefer et al. |
| 4,754,940 A | 7/1988 | Deter |
| 4,757,962 A | 7/1988 | Grant |
| 4,765,568 A | 8/1988 | Carl et al. |
| 4,795,111 A | 1/1989 | Moller |
| 4,796,836 A | 1/1989 | Buchelt |
| 4,824,048 A | 4/1989 | Kim |
| 4,828,203 A | 5/1989 | Clifton et al. |
| 4,834,319 A | 5/1989 | Ewy et al. |
| 4,856,732 A | 8/1989 | Eickmann |
| 4,880,071 A | 11/1989 | Tracy |
| 4,892,274 A | 1/1990 | Pohl et al. |
| 4,917,332 A | 4/1990 | Patterson, Jr. |
| 4,934,629 A | 6/1990 | Brant |
| 4,982,914 A | 1/1991 | Eickmann |
| 5,064,143 A | 11/1991 | Bucher |
| 5,101,927 A | 4/1992 | Murtuza |
| 5,141,173 A | 8/1992 | Lay |
| 5,209,428 A | 5/1993 | Bevilaqua et al. |
| 5,297,761 A | 3/1994 | Kendall, Jr. et al. |
| 5,303,879 A | 4/1994 | Bucher |
| 5,395,073 A | 3/1995 | Rutan et al. |
| 5,407,150 A | 4/1995 | Sadleir |
| 5,419,514 A | 5/1995 | Ducan |
| 5,454,531 A | 10/1995 | Melkuti |
| 5,505,407 A | 4/1996 | Chiappetta |
| 5,666,483 A | 9/1997 | McClary |
| 5,738,302 A | 4/1998 | Freeland |
| 5,746,390 A | 5/1998 | Chiappetta et al. |
| 5,806,805 A | 9/1998 | Elbert et al. |
| 5,890,441 A | 4/1999 | Swinson et al. |
| 6,050,520 A | 4/2000 | Kirla |
| 6,089,501 A | 7/2000 | Frost |
| 6,105,901 A | 8/2000 | Ulanoski et al. |
| 6,119,985 A | 9/2000 | Clapp et al. |
| 6,170,778 B1 | 1/2001 | Cycon et al. |
| 6,254,032 B1 | 7/2001 | Bucher |
| 6,270,038 B1 | 8/2001 | Cycon et al. |
| 6,318,668 B1 | 11/2001 | Ulanoski et al. |
| 6,371,406 B1 | 4/2002 | Corcoran |
| 6,382,559 B1 | 5/2002 | Sutterfield et al. |
| 6,402,088 B1 | 6/2002 | Syrovy et al. |
| 6,431,494 B1 | 8/2002 | Kinkead et al. |
| 6,446,911 B1 | 9/2002 | Yount et al. |
| 6,457,670 B1 | 10/2002 | Geranio |
| 6,464,166 B1 | 10/2002 | Yoeli |
| 6,474,598 B2 | 11/2002 | Carter, Jr. |
| 6,520,449 B2 | 2/2003 | Illingworth |
| 6,561,456 B1 | 5/2003 | Devine |
| 6,568,630 B2 | 5/2003 | Yoeli |
| 6,616,094 B2 | 9/2003 | Illingworth |
| 6,644,598 B2 | 11/2003 | Glezer et al. |
| 6,648,270 B1 | 11/2003 | Burnett et al. |
| 6,704,624 B2 | 3/2004 | Ortega et al. |
| 6,708,920 B2 | 3/2004 | Fukuyama |
| 6,745,977 B1 | 6/2004 | Long et al. |
| 6,751,530 B2 | 6/2004 | Seifert et al. |
| D496,606 S | 9/2004 | Sanders, Jr. |
| 6,808,140 B2 | 10/2004 | Moller |
| 6,817,570 B2 | 11/2004 | Yoeli |
| 6,824,095 B2 | 11/2004 | Mao |
| 6,834,832 B2 | 12/2004 | Jamgarov |
| 6,843,447 B2 | 1/2005 | Morgan |
| 6,883,748 B2 | 4/2005 | Yoeli |
| 6,886,776 B2 | 5/2005 | Wagner et al. |
| 6,892,979 B2 | 5/2005 | Milde |
| 6,892,980 B2 | 5/2005 | Kawai |
| 6,913,226 B2 | 7/2005 | Huynh |
| 6,926,322 B2 | 8/2005 | Browne et al. |
| 6,969,027 B2 | 11/2005 | Ishiba |
| 6,974,105 B2 | 12/2005 | Pham |
| 7,246,769 B2 | 7/2007 | Yoeli |
| 7,249,732 B2 | 7/2007 | Sanders, Jr. et al. |
| 7,267,300 B2 | 9/2007 | Heath et al. |
| 7,275,712 B2 | 10/2007 | Yoeli |
| 7,364,115 B2 * | 4/2008 | Parks et al. .................. 244/12.4 |
| 7,717,368 B2 | 5/2010 | Yoeli |
| 7,789,342 B2 | 9/2010 | Yoeli |

(56) References Cited

U.S. PATENT DOCUMENTS

| | | | |
|---|---|---|---|
| 7,806,362 | B2 | 10/2010 | Yoeli |
| 7,857,253 | B2 | 12/2010 | Yoeli |
| 7,918,416 | B2 | 4/2011 | Yoeli |
| 7,946,528 | B2 | 5/2011 | Yoeli |
| 8,020,804 | B2 | 9/2011 | Yoeli |
| 8,066,220 | B2 | 11/2011 | Kirstein |
| 8,342,441 | B2 | 1/2013 | Yoeli |
| 2002/0060267 | A1 | 5/2002 | Yavnai |
| 2002/0161488 | A1 | 10/2002 | Guillemin et al. |
| 2003/0038213 | A1 | 2/2003 | Yoeli |
| 2003/0062442 | A1 | 4/2003 | Milde, Jr. |
| 2003/0062443 | A1 | 4/2003 | Wagner et al. |
| 2003/0080242 | A1 | 5/2003 | Kawai |
| 2003/0085319 | A1 | 5/2003 | Wagner et al. |
| 2003/0127559 | A1 | 7/2003 | Walmsley |
| 2003/0195673 | A1 | 10/2003 | Foch et al. |
| 2004/0026563 | A1 | 2/2004 | Moller |
| 2004/0104303 | A1 | 6/2004 | Mao |
| 2004/0149857 | A1 | 8/2004 | Yoeli |
| 2004/0155143 | A1 | 8/2004 | Yoeli |
| 2005/0029407 | A1 | 2/2005 | Pohl et al. |
| 2005/0040283 | A1 | 2/2005 | Frazer |
| 2005/0065669 | A1 | 3/2005 | Roux et al. |
| 2005/0109875 | A1 | 5/2005 | Ouellette et al. |
| 2005/0178881 | A1 | 8/2005 | Yoeli |
| 2005/0242231 | A1 | 11/2005 | Yoeli |
| 2006/0097107 | A1* | 5/2006 | Parks et al. ............ 244/52 |
| 2006/0113426 | A1 | 6/2006 | Yoeli |
| 2006/0226281 | A1 | 10/2006 | Walton |
| 2006/0231675 | A1 | 10/2006 | Bostan |
| 2007/0018034 | A1 | 1/2007 | Dickau |
| 2007/0034734 | A1 | 2/2007 | Yoeli |
| 2007/0034738 | A1 | 2/2007 | Sanders, Jr. et al. |
| 2007/0034739 | A1 | 2/2007 | Yoeli |
| 2007/0095971 | A1 | 5/2007 | Yoeli |
| 2007/0158494 | A1 | 7/2007 | Burrage |
| 2008/0054121 | A1 | 3/2008 | Yoeli |
| 2008/0142643 | A1 | 6/2008 | Yoeli |
| 2008/0283673 | A1 | 11/2008 | Yoeli |
| 2009/0084907 | A1 | 4/2009 | Yoeli |
| 2009/0140102 | A1 | 6/2009 | Yoeli |
| 2009/0159757 | A1 | 6/2009 | Yoeli |
| 2010/0051740 | A1 | 3/2010 | Yoeli |
| 2010/0076625 | A1 | 3/2010 | Yoeli |
| 2010/0270419 | A1 | 10/2010 | Yoeli |
| 2011/0042509 | A1 | 2/2011 | Bevirt et al. |
| 2011/0042510 | A1 | 2/2011 | Bevirt et al. |
| 2011/0049306 | A1 | 3/2011 | Yoeli |
| 2011/0049307 | A1 | 3/2011 | Yoeli |
| 2011/0168834 | A1 | 7/2011 | Yoeli |
| 2011/0174920 | A1 | 7/2011 | Yoeli |
| 2012/0080564 | A1 | 4/2012 | Yoeli |

FOREIGN PATENT DOCUMENTS

| | | |
|---|---|---|
| EP | 0 922925 | 6/1999 |
| GB | 935884 | 9/1963 |
| GB | 951186 | 3/1964 |
| IT | 666076 A | 8/1964 |
| SE | 184314 | 6/1963 |
| WO | 01/93039 A1 | 12/2001 |
| WO | 02/096750 A2 | 12/2002 |
| WO | 02/098732 A2 | 12/2002 |
| WO | 03/016134 A1 | 2/2003 |
| WO | 2004/012993 A1 | 2/2004 |
| WO | 2004/031876 A1 | 4/2004 |
| WO | 2004/065208 A2 | 8/2004 |
| WO | WO 2005/039972 | 5/2005 |
| WO | 2006/072960 A2 | 7/2006 |
| WO | 2006/131920 | 12/2006 |
| WO | 2007/052271 A2 | 5/2007 |
| WO | 2007/099543 A2 | 9/2007 |
| WO | 2007/129313 A2 | 11/2007 |
| WO | 2008/065664 A2 | 6/2008 |
| WO | 2008/135973 A2 | 11/2008 |
| WO | 2009/077968 A2 | 6/2009 |
| WO | 2009/147630 A1 | 12/2009 |
| WO | 2010/026517 A2 | 3/2010 |
| WO | 2010/067325 A2 | 6/2010 |

OTHER PUBLICATIONS

U.S. Appl. No. 12/598,514 (Yoeli) filed Nov. 2, 2009.
Written Opinion and International Search Report of the International Searching Authority in International Application No. PCT/IB09/053768 (Yoeli) (now WO 2010-026517 A2) dated Mar. 3, 2010.
U.S. Appl. No. 13/071,858 (Yoeli) filed Mar. 25, 2011.
International Search Report for PCT/IL2007/001465, mailed Sep. 30, 2008.
U.S. Appl. No. 13/252,278 (Yoeli), filed Oct. 4, 2011.
Edward D. Flinn, "Revolutionary X-Hawk Hovers Near Success," Aerospace America, Jul. 2003, pp. 26-28.
Raymond L. Robb, "Driving on Air: $20^{th}$ Century Flying Carpets," Vertiflite, vol. 51, No. 1, Spring 2005, pp. 2-11.
Urban Aeronautics Ltd., "The X-Hawk VTOL Utility Vehicle"—product description and specifications, 2004.
Piasecki Aircraft Corporation Product Description and History for Piasecki VZ-8 VTOL research vehicle (undated).
De Lorean DMC-12, alleged to have first been produced in 1981 (images available from Wikipedia, the free encyclopedia, at http://en.wikipedia.org/wiki/De_Lorean_DMC-12 ).
International Search Report for International Application No. PCT/IL02/00417 (now WO 02/096750), dated May 23, 2003, published Oct. 2, 2003.
Written Opinion in International Application No. PCT/IL02/00417 (now WO 02/096750), Aug. 19, 2003.
International Preliminary Examination Report for International Application No. PCT/IL02/00417 (now WO 02/096750), Oct. 20, 2003.
Corrected International Preliminary Examination Report for International Application No. PCTAL02/00417 (now WO 02/096750), Jul. 25, 2004.
International Search Report for International Application No. PCT/IL02/000439 (now WO 2002/098732), dated Apr. 28, 2003, published Mar. 18, 2004.
International Preliminary Examination Report in International Application No. PCT/IL02/000439 (now WO 2002/098732), Jul. 26, 2004.
International Search Report for International Application No. PCT/IL02/00682 (now WO 03/016134 (Yoeli)), dated Dec. 6, 2002.
International Search Report for International Application No. PCT/IL03/00640 (now WO 2004/012993 (Yoeli)), dated Jan. 2, 2004.
International Search Report for International Application No. PCT/IL03/00786 (now WO 2004/031876), Feb. 9, 2004.
International Search Report for International Application No. PCT/IL04/00984 (now WO 2005/039972 (Yoeli)), dated Dec. 6, 2005, published Jan. 26, 2006.
Written Opinion of the International Searching Authority in International Application No. PCT/IL04/00984 (now WO 2005/039972 (Yoeli)), dated Dec. 6, 2005.
International Preliminary Report on Patentability in International Application No. PCT/IL04/00984 (now WO 2005/039972 (Yoeli)), dated May 1, 2006.
Written Opinion/Search Report of the International Searching Authority in International Application No. PCT/IL06/00032 (now WO 2006/072960 (Yoeli)), dated Sep. 11, 2006.
International Preliminary Report on Patentability in International Application No. PCT/IL06/00032 (now WO 2006/072960 (Yoeli)), dated Sep. 11, 2006.
International Search Report for International Application No. PCT/IL06/00663 (now WO 2006/131920) (Yoeli) dated Dec. 19, 2006.
Written Opinion of the International Searching Authority in International Application No. PCT/IL06/00663 (now WO 2006/131920) (Yoeli) dated Dec. 19, 2006.
International Search Report for International Application No. PCT/IL06/01264 (now WO 2007/052271 A2) (Yoeli) dated Aug. 5, 2008.

(56) References Cited

OTHER PUBLICATIONS

Written Opinion of the International Searching Authority in International Application No. PCT/IL06/01264 (now WO 2007/052271 A2) (Yoeli) dated Aug. 5, 2008.
Written Opinion and Search Report of the International Searching Authority in International Application No. PCT/IL07/00271 (now WO 2007/099543 A2) (Yoeli) dated Oct. 28, 2008.
International Search Report for International Application No. PCT/IL07/00544 (now WO 2007/129313) (Yoeli) dated Jul. 7, 2008.
Written Opinion of the International Searching Authority in International Application No. PCT/IL07/00544 (now WO 2007/129313) (Yoeli) dated Jul. 7, 2008.
Written Opinion of the International Searching Authority in International Application No. PCT/IL0701465 (now WO 2008/065654) (Yoeli) dated Sep. 30, 2008.
Written Opinion and Search Report of the International Searching Authority in International Application No. PCT/IL07/01475 (now WO 2008/065664 A2) (Yoeli) dated Sep. 2, 2008.
International Search Report for International Application No. PCT/IL08/00575 (now WO 2008/135973) (Yoeli) dated Oct. 28, 2008.
Written Opinion of the International Searching Authority in International Application No. PCT/IL08/00575 (now WO 2008/135973) (Yoeli) dated Oct. 28, 2008.
U.S. Appl. No. 10/523,609 (Yoeli) filed Feb. 7, 2005.
U.S. Appl. No. 10/987,321 (Yoeli) filed Nov. 15, 2004.
U.S. Appl. No. 11/061,652 (Yoeli) filed Feb. 22, 2005.
U.S. Appl. No. 11/411,243 (Yoeli) filed Apr. 26, 2006.
U.S. Appl. No. 11/447,311 (Yoeli) filed Jun. 6, 2006.
U.S. Appl. No. 11/405,003 (Yoeli) filed Apr. 17, 2006.
U.S. Appl. No. 11/794,906 (Yoeli) filed Jul. 9, 2007.
U.S. Appl. No. 11/798,187 (Yoeli) filed May 10, 2007.
U.S. Appl. No. 11/826,202 (Yoeli) filed Jul. 12, 2007.
U.S. Appl. No. 11/892,414 (Yoeli) filed Aug. 22, 2007.
U.S. Appl. No. 12/224,549 (Yoeli) filed Nov. 4, 2008.
U.S. Appl. No. 12/226,952 (Yoeli) filed Feb. 27, 2009.
U.S. Appl. No. 12/516,743 (Yoeli) filed May 28, 2009.
Written Opinion and International Search Report of the International Searching Authority in International Application No. PCT/IB09/55656 (now WO 2010-067325 A2) mailed Sep. 30, 2010.
U.S. Appl. No. 12/938,444 (Yoeli) filed Nov. 3, 2010.
U.S. Appl. No. 12/989,533 (Yoeli) filed Oct. 25, 2010.
Corrected Written Opinion and Search Report of the International Searching Authority in International Application No. PCT/IL07/01475 (now WO 2008/065664 A2) (Yoeli) dated Jul. 27, 2009.
Written Opinion and International Search Report of the International Searching Authority in International Application No. PCT/IB08/055301 (now WO 2009/077968) (Yoeli) dated Aug. 14, 2009.
Written Opinion and International Search Report of the International Searching Authority in International Application No. PCT/IB09/052346 (Yoeli) dated Oct. 20, 2009.
U.S. Appl. No. 12/747,830 (Yoeli) filed Jun. 11, 2010.

\* cited by examiner

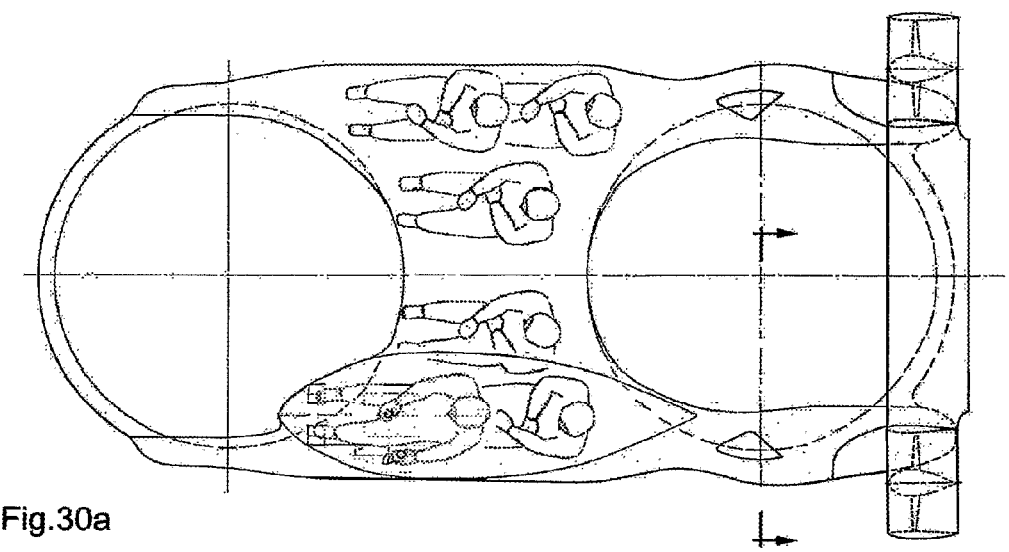
Fig.30a
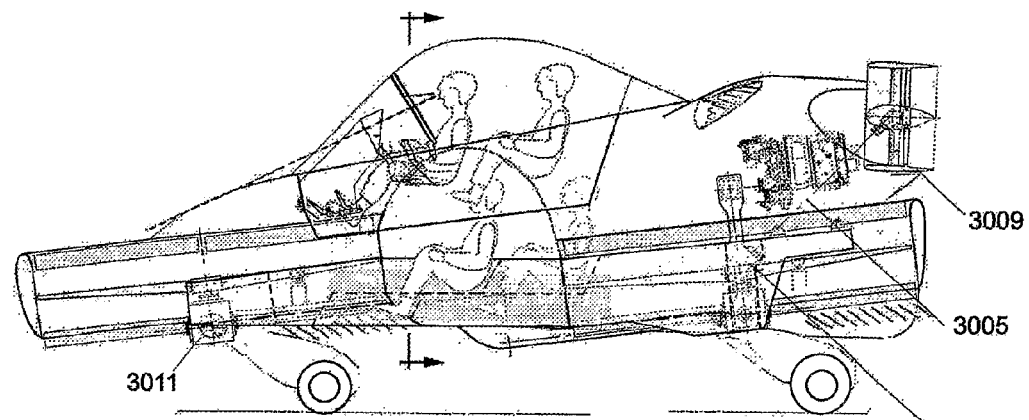
Fig.30b
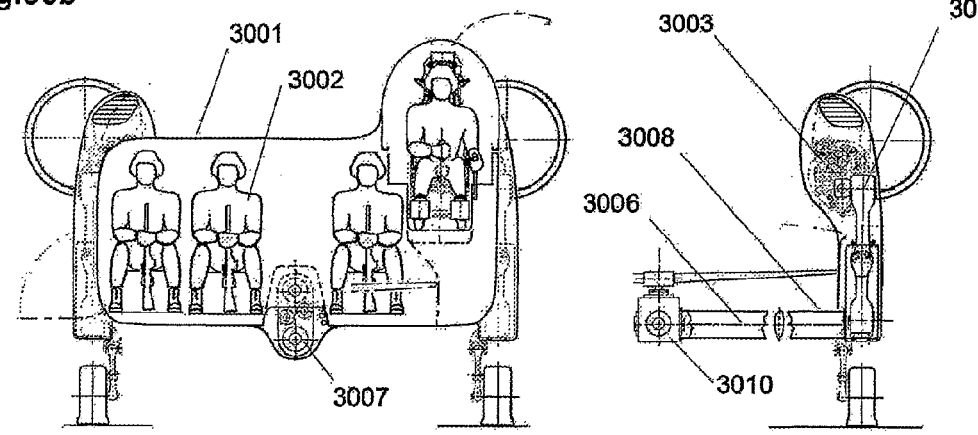
Fig.30c
Fig.30d

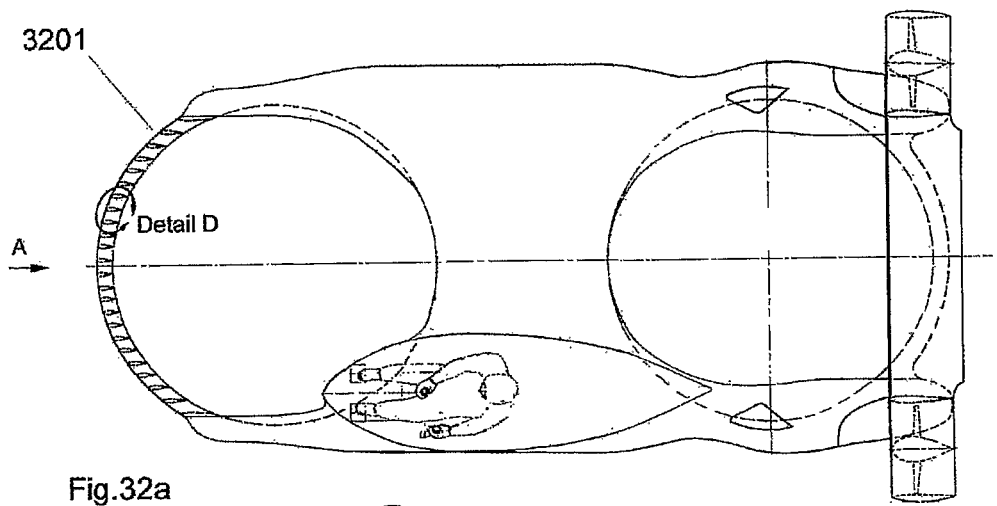
Fig.32a
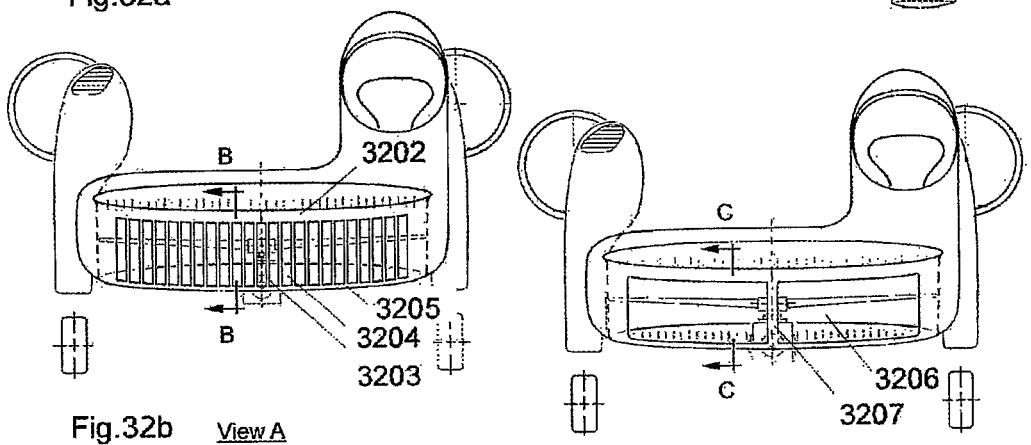
Fig.32b  View A
Fig.32c  View A (optional)
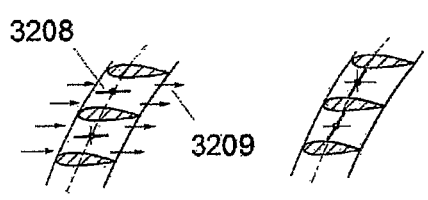
Fig.32d   Fig.32e
Detail D
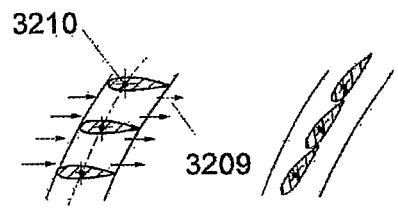
Fig.32f   Fig.32g
B-B
C-C

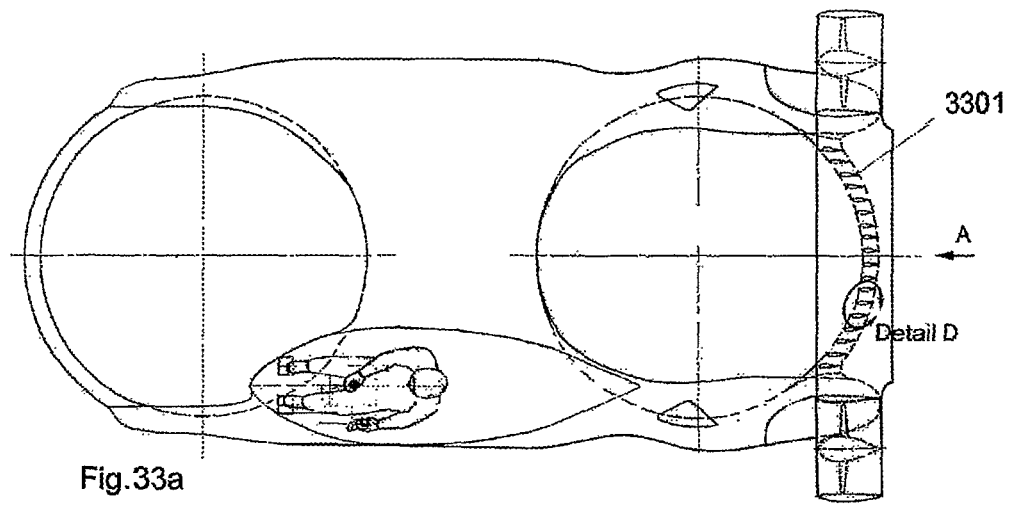
Fig.33a
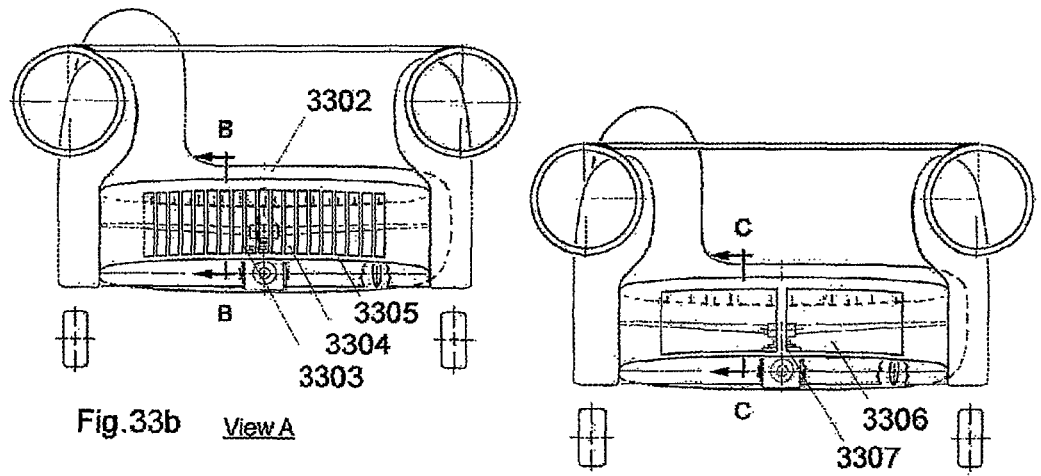
Fig.33b  View A
Fig.33c  View A (optional)
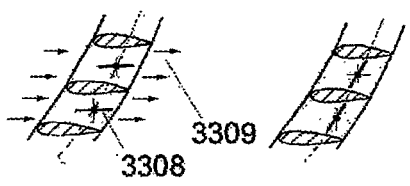
Fig.33d  Fig.33e
Detail D
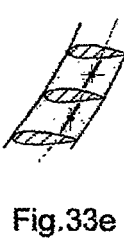
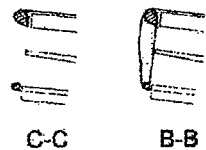
C-C  B-B
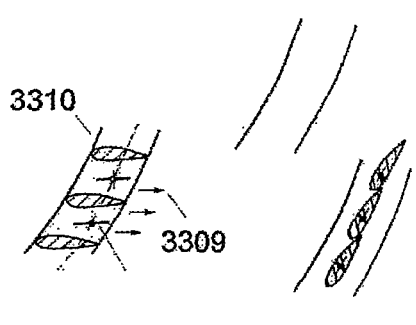
Fig.33f  Fig.33g

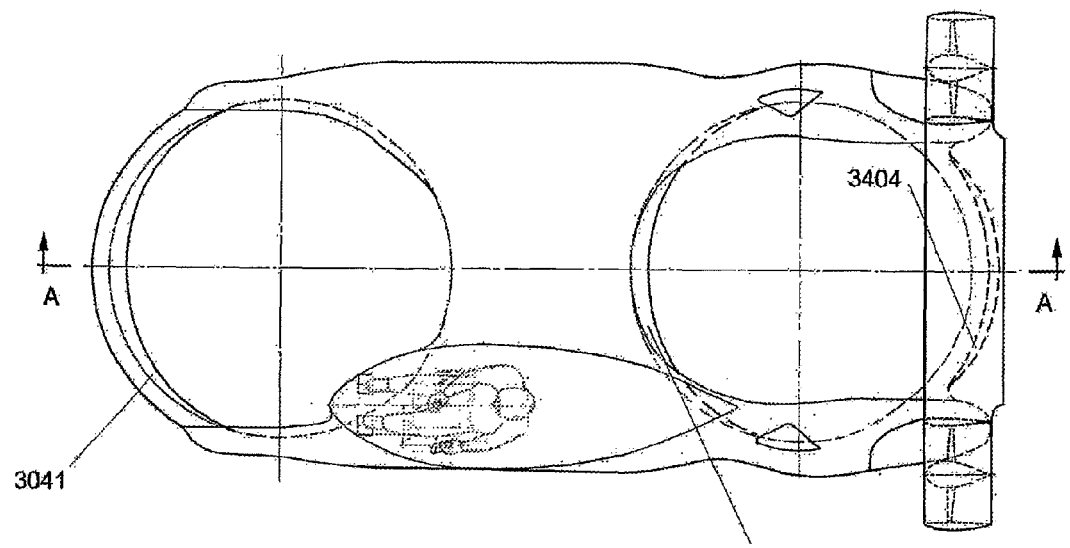
Fig.34a
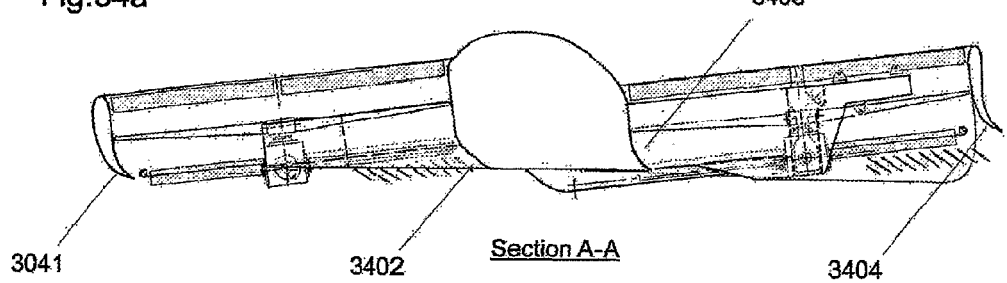
Section A-A
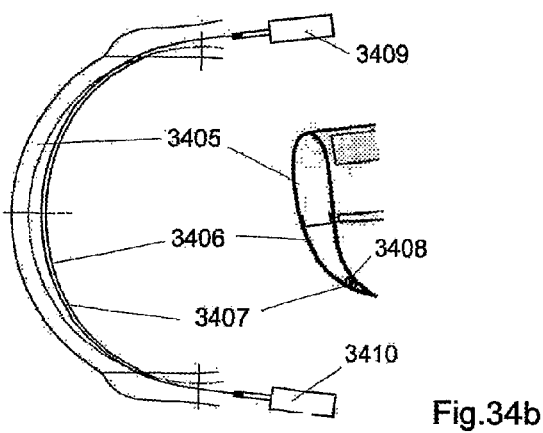
Fig.34b

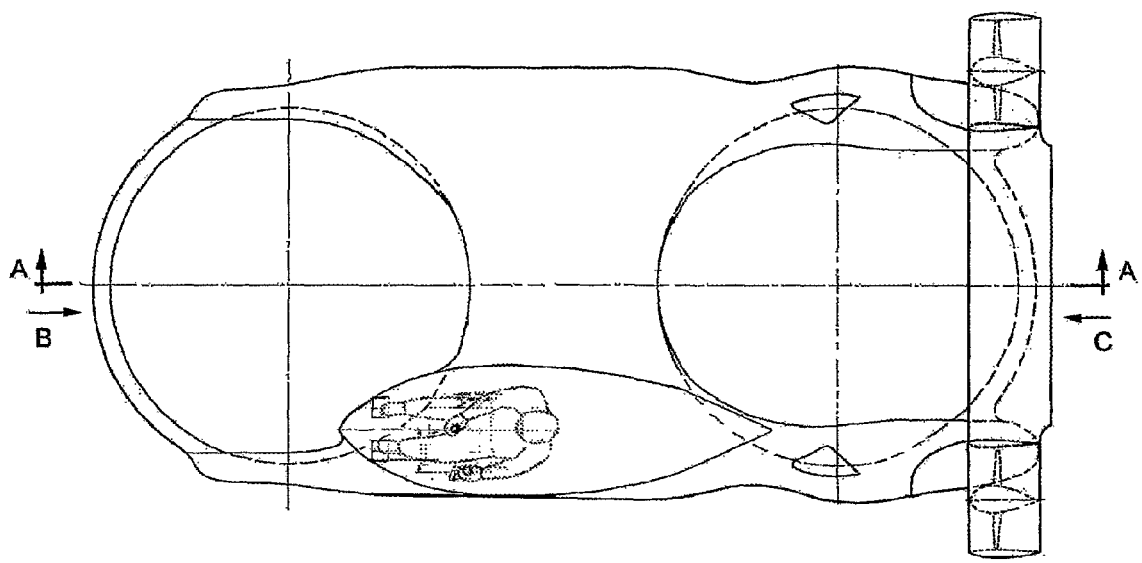
Fig.35a
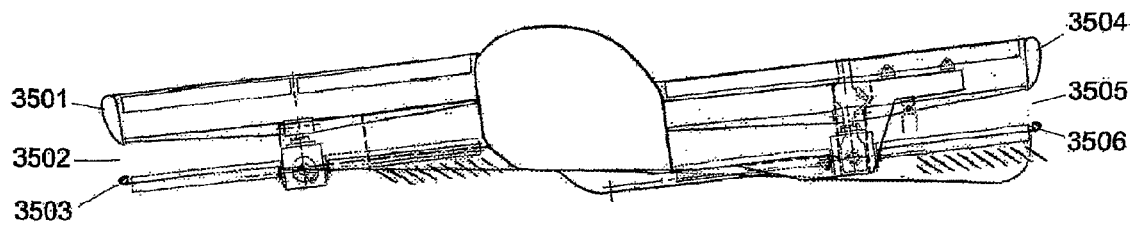
Section A-A
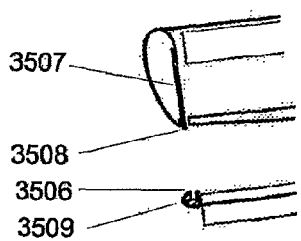
Fig.35b
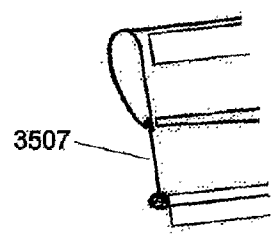
Fig.35c
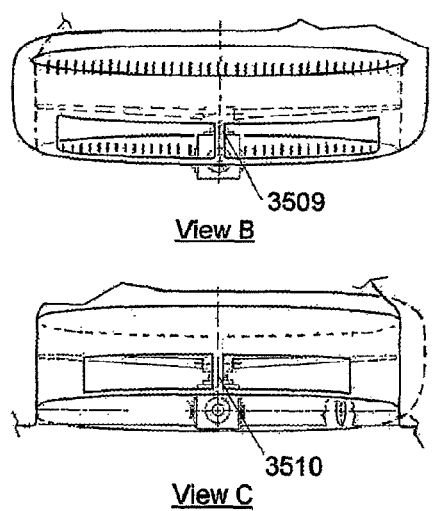
View B
View C

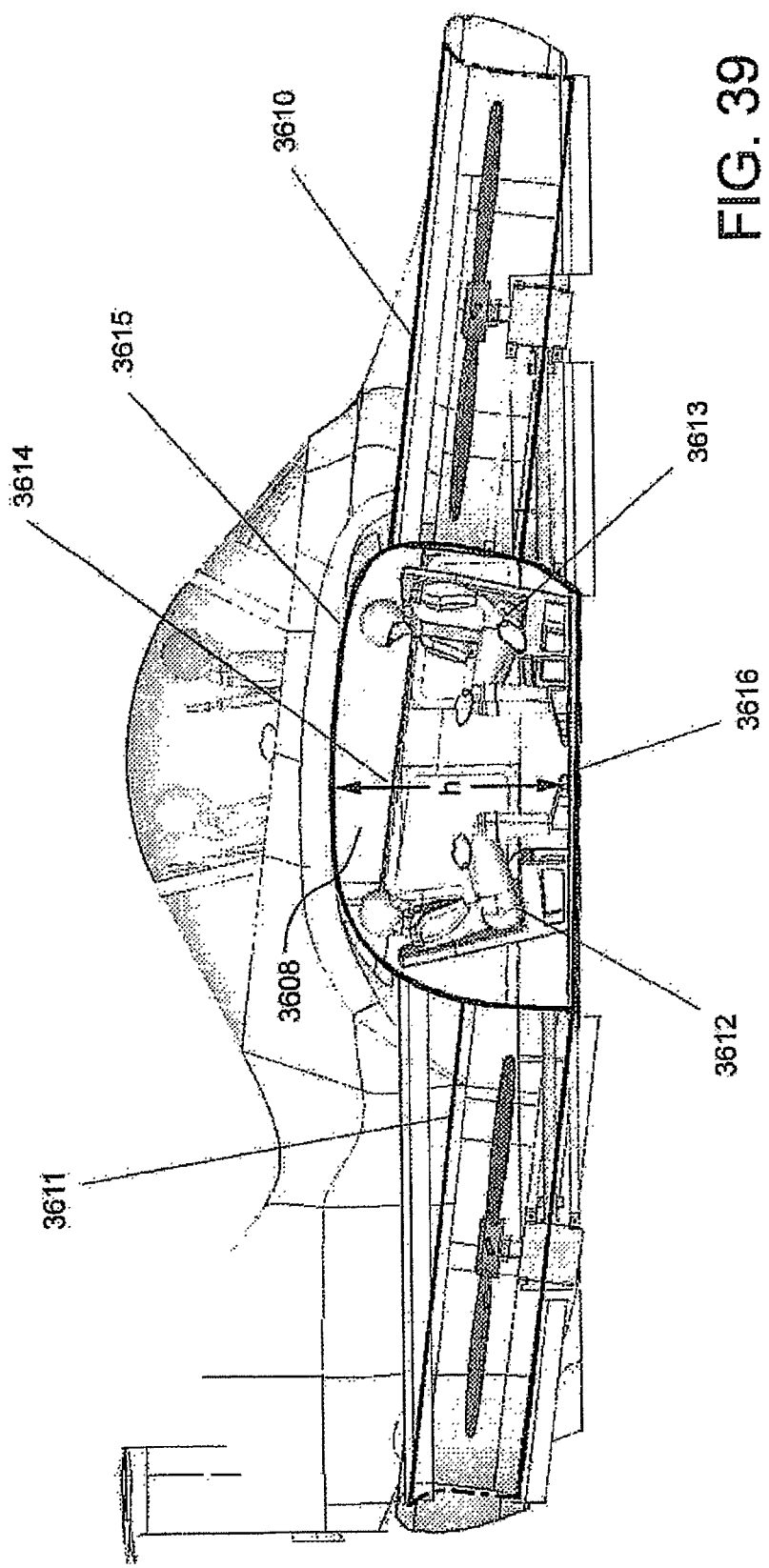

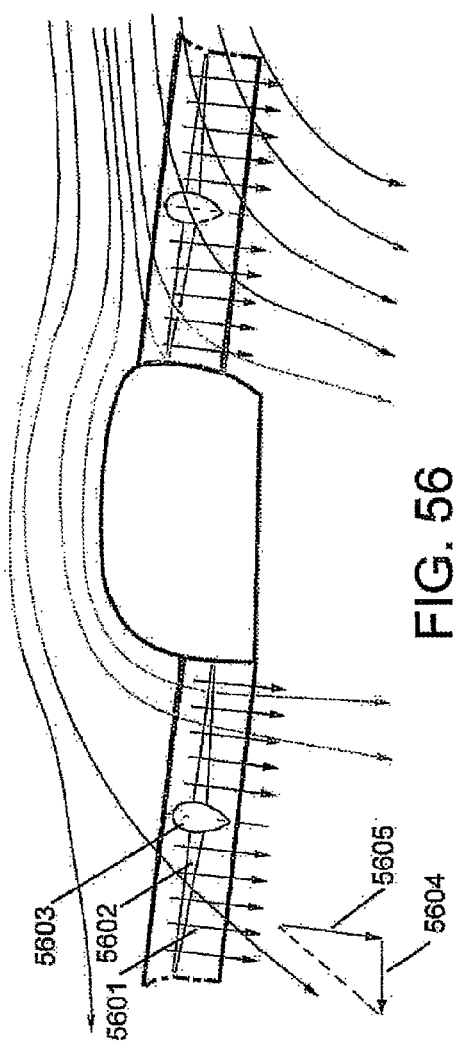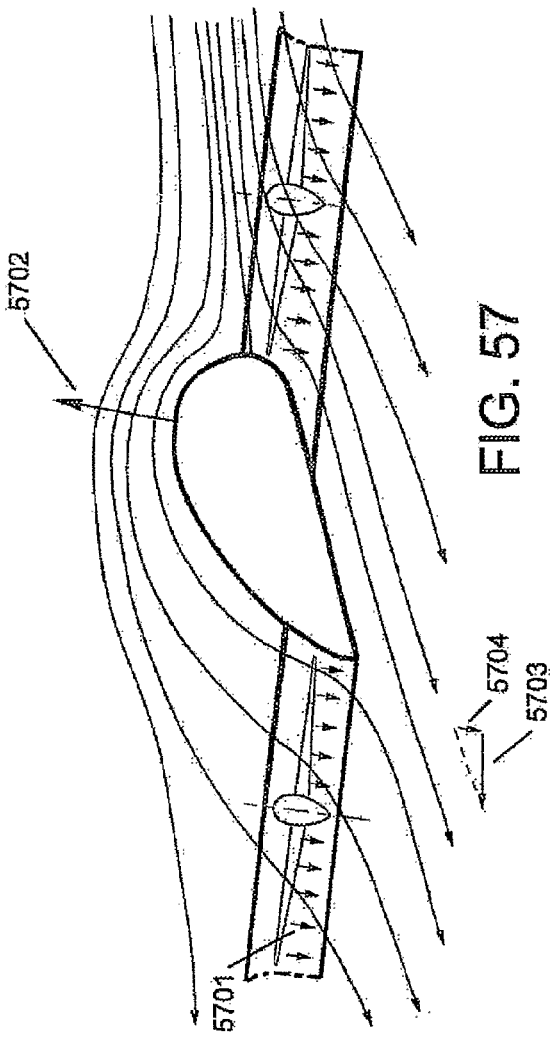

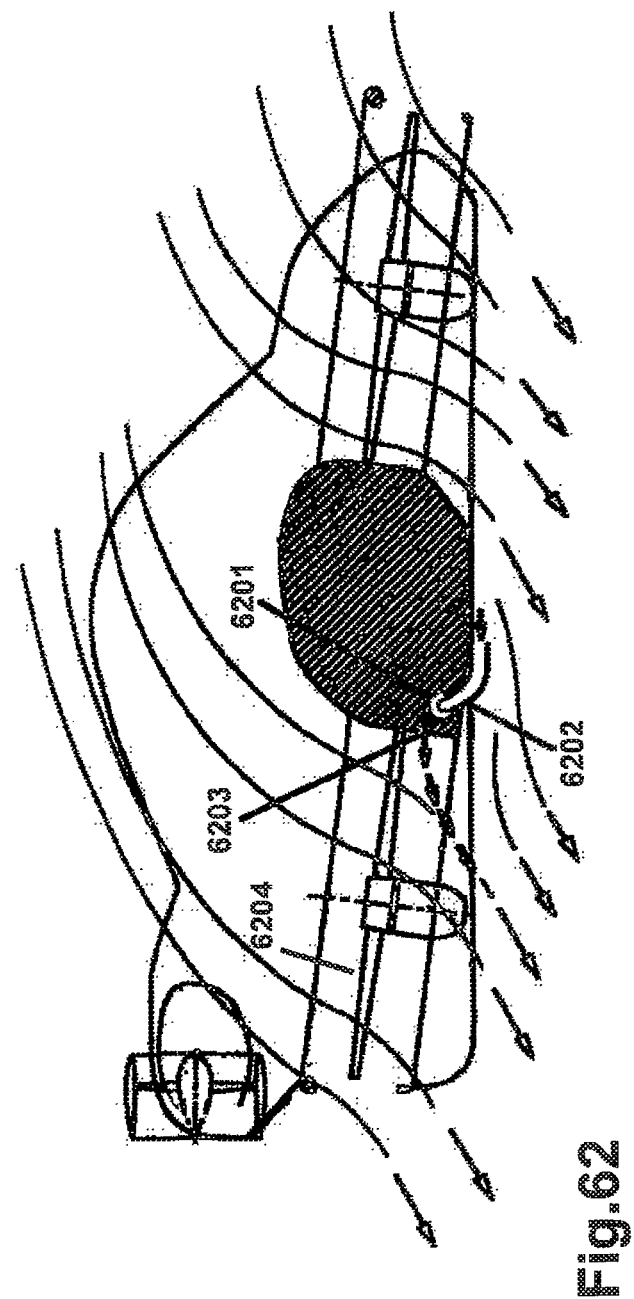

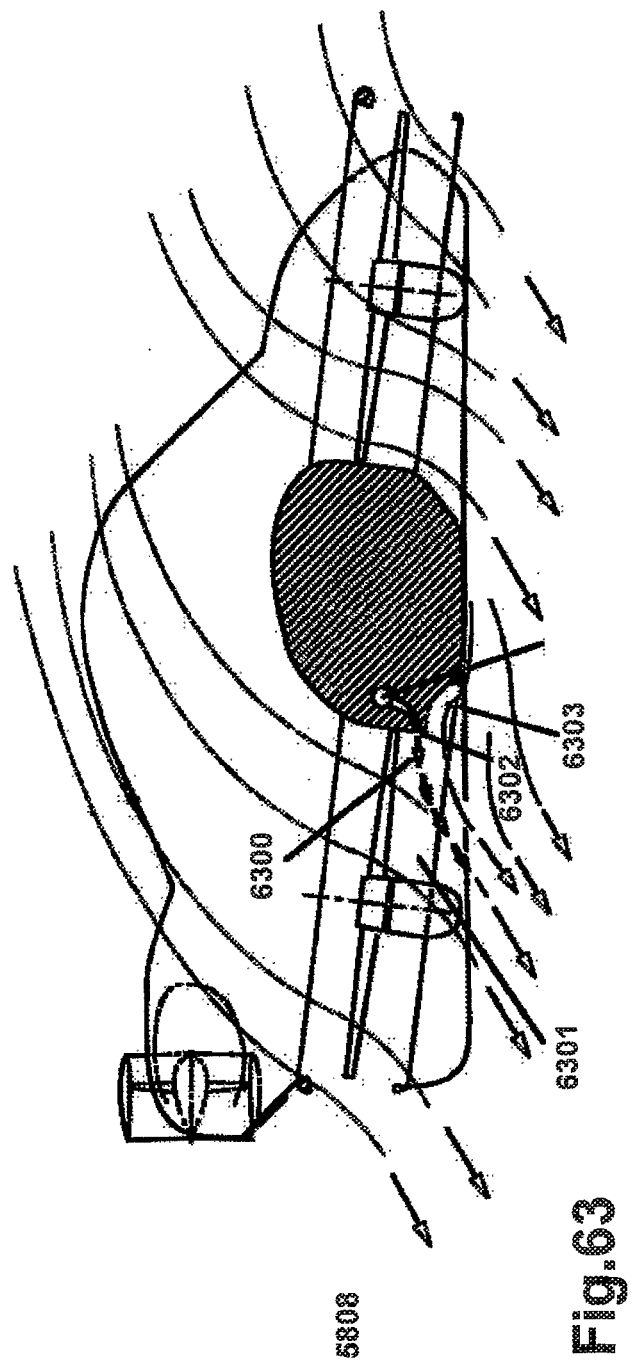

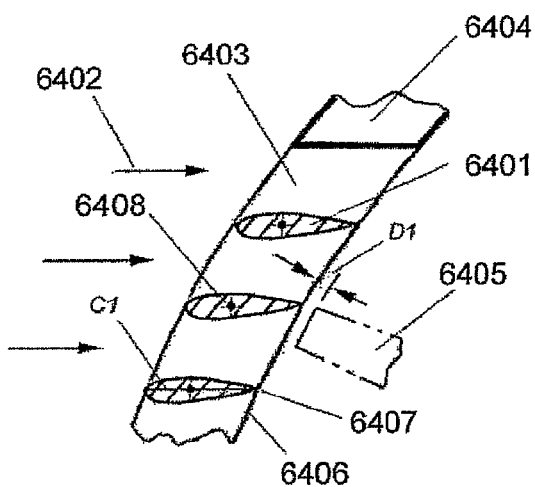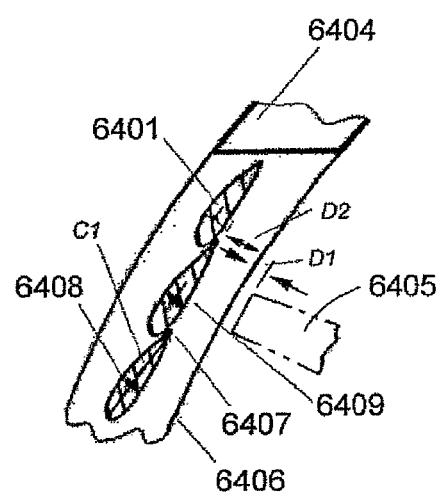
FIG. 64a            FIG. 64b
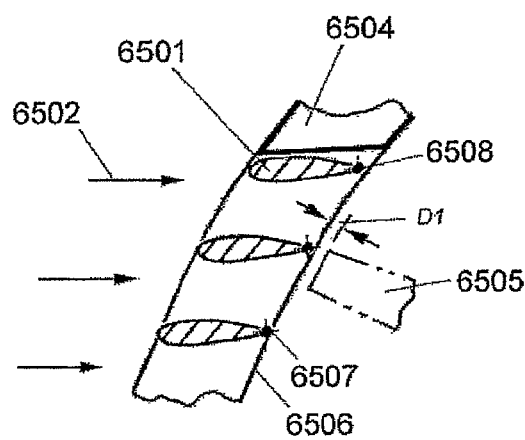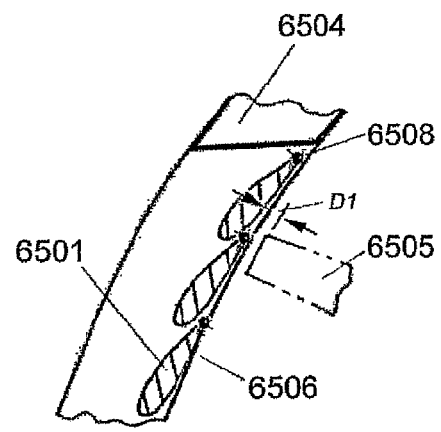
FIG. 65a            FIG. 65b

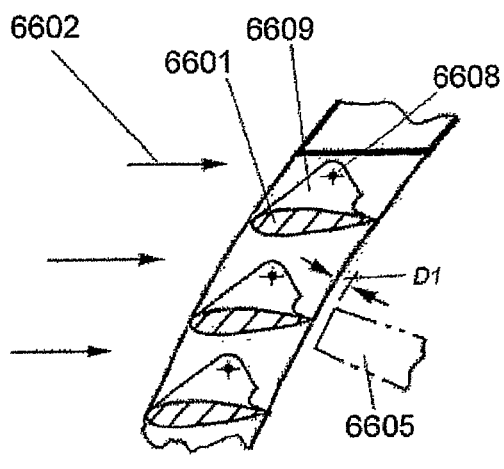
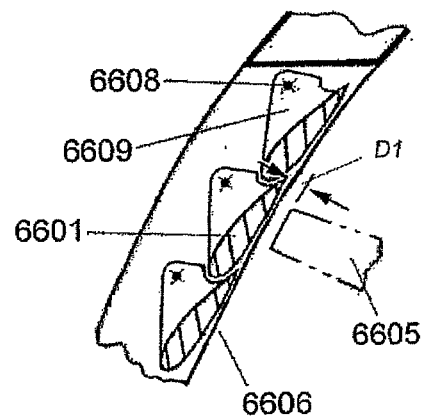
FIG. 66a          FIG. 66b
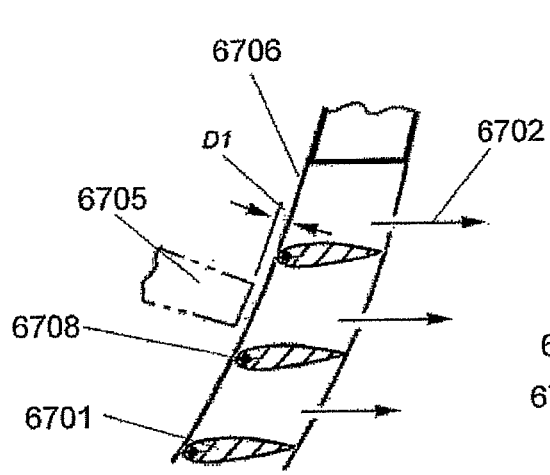
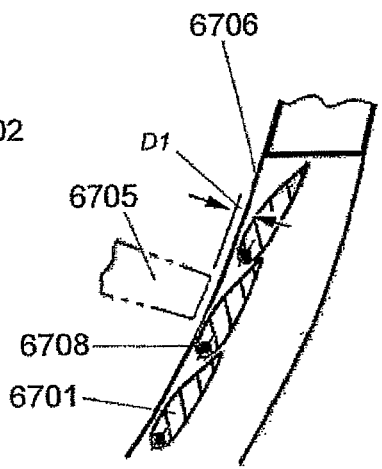
FIG. 67a          FIG. 67b

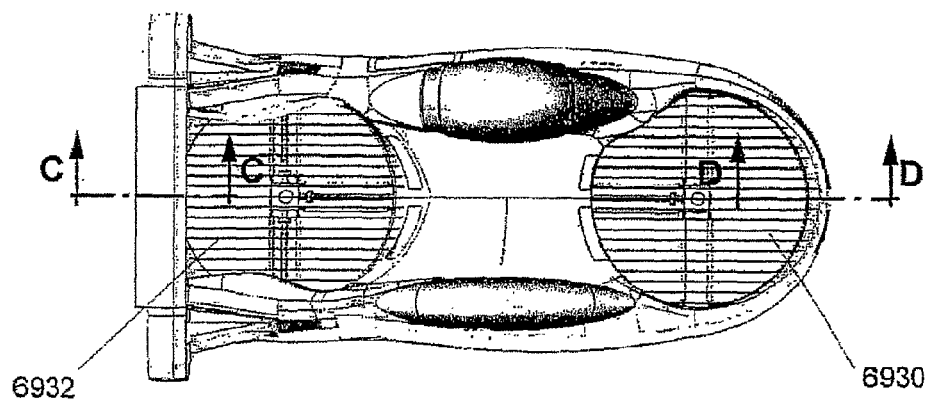
FIG. 69a
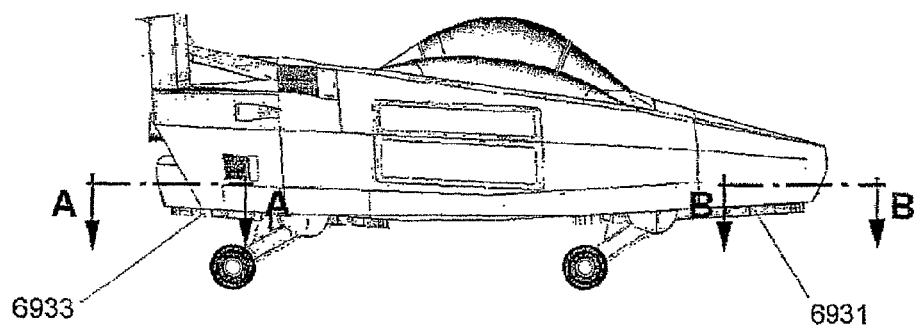
FIG. 69b
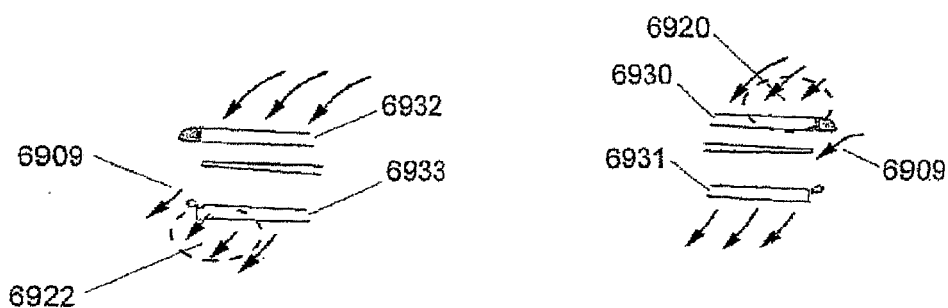
SECTION C-C
FIG. 69d
SECTION D-D
FIG. 69c

SECTION A-A

SECTION B-B

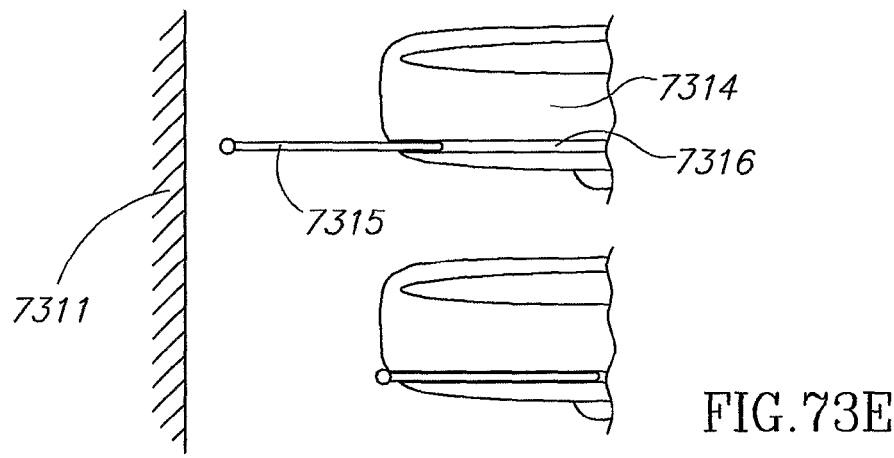
FIG.73E
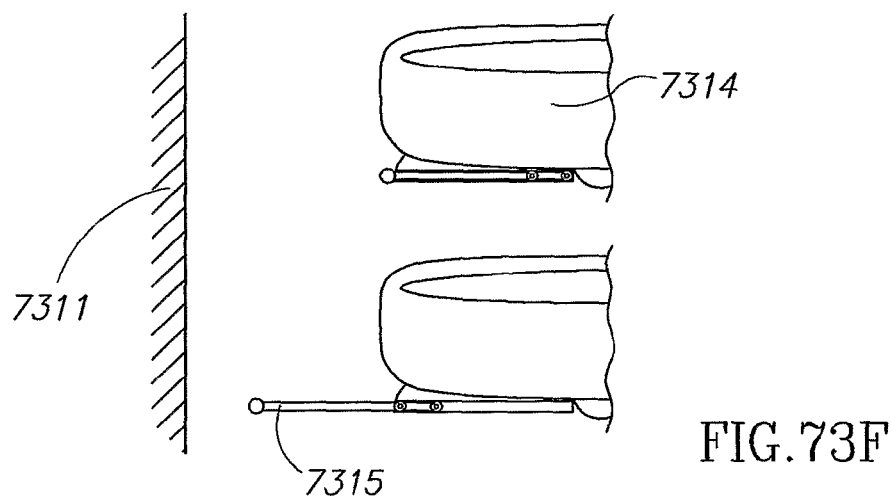
FIG.73F
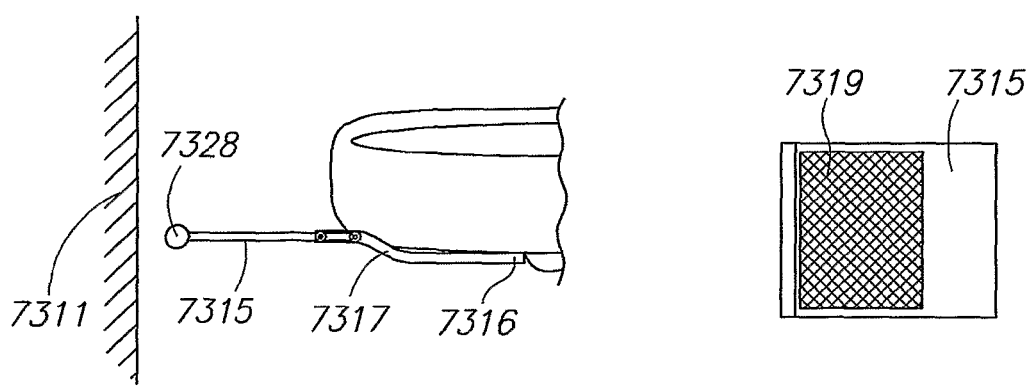
FIG.73G
FIG.73H

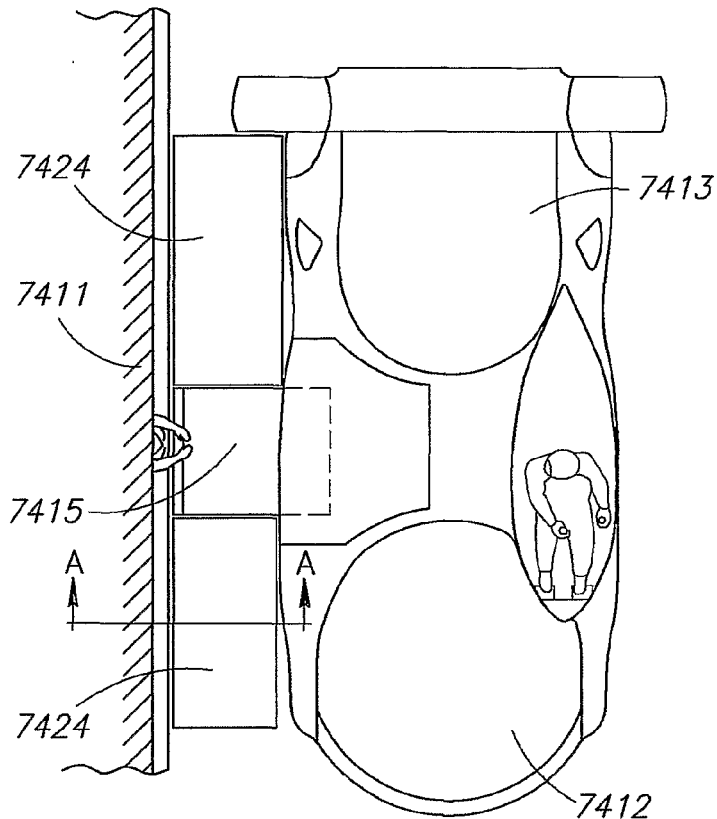
FIG.74A
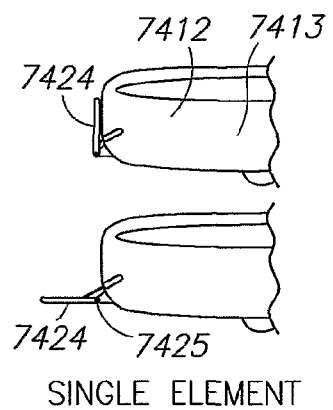
SINGLE ELEMENT
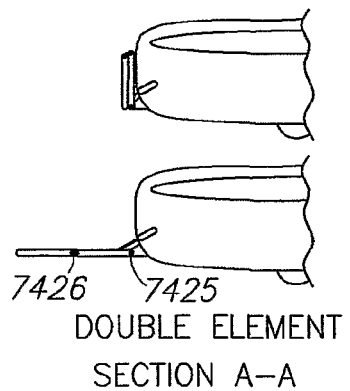
DOUBLE ELEMENT
SECTION A-A
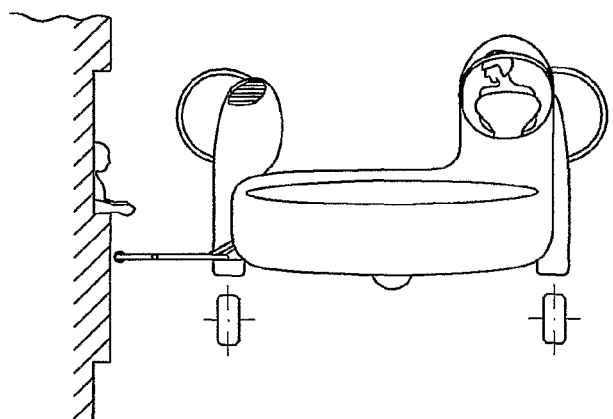
FIG.74B

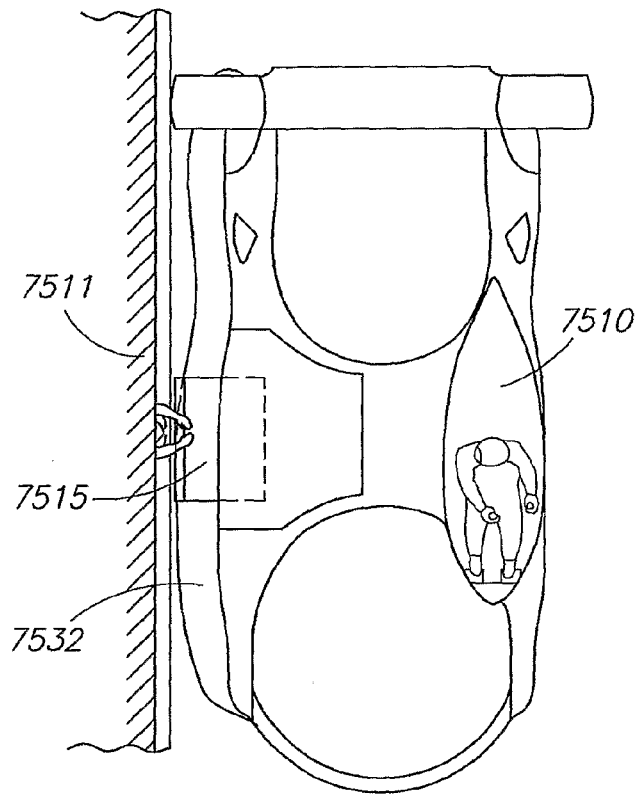
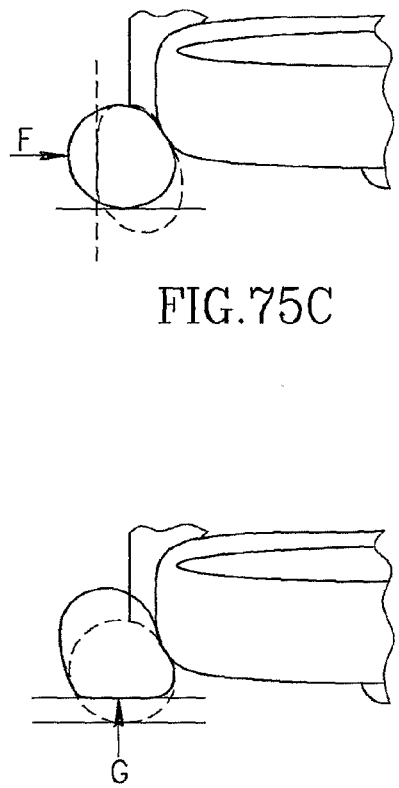
FIG.75C
FIG.75A
FIG.75D
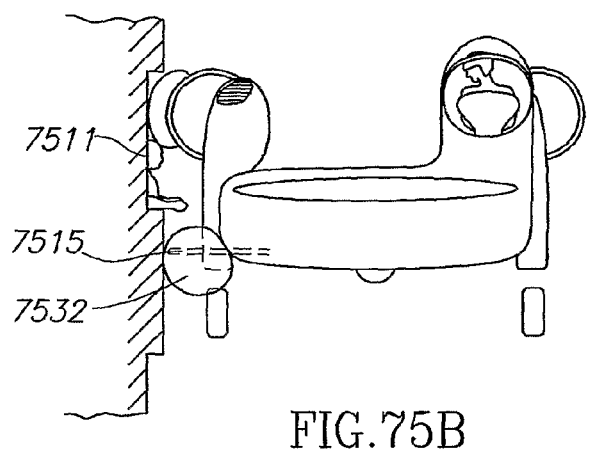
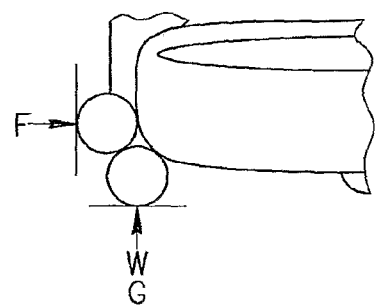
FIG.75B
FIG.75E

WALL EFFECTS ON VTOL VEHICLES

This application is the U.S. national phase of International Application No. PCT/IL2007/001465 filed 27 Nov. 2007, which designated the U.S. and claims the benefit of U.S. Provisional Application No. 60/867,238 filed 27 Nov. 2006, the entire contents of each of which are hereby incorporated by reference.

FIELD AND BACKGROUND OF THE INVENTION

The present application relates to VTOL vehicles with multi-function capabilities and, specifically to ducted fan arrangements that facilitate the flow of air during hover as well as forward flight of such vehicles, and the operation and behavior of these vehicles in restrictive environments and proximity to objects.

VTOL vehicles rely on direct thrust from propellers or rotors, directed downwardly, for obtaining lift necessary to support the vehicle in the air. Many different types of VTOL vehicles have been proposed where the weight of the vehicle in hover is carried directly by rotors or propellers, with the axis of rotation perpendicular to the ground. One well known vehicle of this type is the conventional helicopter which includes a large rotor mounted above the vehicle fuselage. Other types of vehicles rely on a multitude of propellers that are either exposed (e.g., unducted fans), or installed inside circular cavities, shrouds, ducts or other types of nacelle (e.g., ducted fans), where the flow of air takes place inside ducts. Some VTOL vehicles (such as the V-22) use propellers having their axes of rotation fully rotatable (up to 90 degrees or so) with respect to the body of the vehicle; these vehicles normally have the propeller axis perpendicular to the ground for vertical takeoff and landing, and then tilt the propeller axis forward for normal flight. Other vehicles use propellers having nearly horizontal axes, but include aerodynamic deflectors installed behind the propeller which deflect all or part of the flow downwardly to create direct upward lift.

A number of VTOL vehicles have been proposed in the past where two or four propellers, usually mounted inside ducts (i.e., ducted fans), were placed forwardly of, and rearwardly of, the main payload of the vehicle. One typical example is the Piasecki VZ-8 'Flying Jeep' which had two large ducts, with the pilots located to the sides of the vehicle, in the central area between the ducts. A similar configuration was used on the Chrysler VZ-6 and on the CityHawk flying car. Also the Bensen 'Flying Bench' uses a similar arrangement. The Curtiss Wright VZ-7 and the Moller Skycar use four, instead of two, thrusters where two are located on each side (forward and rear) of the pilots and the payload, the latter being of fixed nature at the center of the vehicle, close to the vehicle's center of gravity.

The foregoing existing vehicles are generally designed for specific functions and are therefore not conveniently capable of performing a multiplicity of functions.

Patents owned by the present assignee that relate to VTOL vehicles include U.S. Pat. Nos. 6,464,166; 6,568,630; 6,817,570 and 6,883,748. The '570 patent discloses unique control vane arrangements including pivotally mounted vanes at both the inlet end and the outlet or exit end of the ducted fan units. A related pending application Ser. No. 11/411,243, filed Apr. 26, 2006, discloses duct and fuselage modification that facilitate air flow particularly during forward flight. For example, openings are provided in the forward and rearward duct walls to selectively allow air to enter the forward duct in a substantially horizontal flow direction and to exit the rearward duct in a direction with at least a horizontal flow component. In addition, fuselage shape changes enhance aerodynamic life, thus reducing the lift burden on the ducted fans.

SUMMARY OF THE INVENTION

An object of the present invention is to provide a vehicle of a relatively simple inexpensive construction and yet capable of performing a multiplicity of different functions.

According to the one example, there is provided a vehicle, comprising: a fuselage having a longitudinal axis and a transverse axis; at least one lift-producing propeller carried by the fuselage on each side of the transverse axis; a pilot's compartment formed in the fuselage between the lift-producing propellers and substantially aligned with the longitudinal axis; and a pair of payload bays formed in the fuselage between the lift-producing propellers and on opposite sides of the pilot's compartment.

According to further features in other examples described below, each of the payload bays includes a cover deployable to an open position providing access to the payload bay, and to a closed position covering the payload bay. In some described preferred embodiments, the cover of each of the payload bays is pivotally mounted to the fuselage along an axis parallel to the longitudinal axis of the fuselage at the bottom of the respective payload bay, such that when the cover is pivoted to the open position it also serves as a support for supporting the payload or a part thereof in the respective payload bay.

Various embodiments are described below wherein the lift propellers are ducted or unducted fans, and wherein the fuselage carries a pair of the lift producing propellers on each side of the transverse axis, a vertical stabilizer at the rear end of the fuselage, or a horizontal stabilizer at the rear end of the fuselage.

Several exemplary embodiments are also described below wherein the fuselage also carries a pair of pusher propellers at the rear end of the fuselage, on opposite sides of the longitudinal axis. In the described embodiments, the fuselage carries two engines, each for driving one of the lift-producing propellers and pusher propellers with the two engines being mechanically coupled together in a common transmission. In one described preferred embodiment, the two engines are located in engine compartments in pylons formed in the fuselage on opposite sides of its longitudinal axis. In another described embodiment, the two engines are located in a common engine compartment aligned with the longitudinal axis of the fuselage and underlying the pilot's compartment.

One embodiment is described wherein the vehicle is a vertical take-off and landing (VTOL) vehicle and includes a pair of stub wings each pivotally mounted under one of the payload bays to a retracted, stored position, and to an extended, deployed position for enhancing lift. Another embodiment is described wherein the vehicle includes a flexible skirt extending below the fuselage enabling the vehicle to be used as, or converted to, a hovercraft for movement over ground or water. A further embodiment is described wherein the vehicle includes large wheels attachable to the rear end of the fuselage for converting the vehicle to an all terrain vehicle (ATV).

As will be described more particularly below, a vehicle constructed in accordance with the foregoing features may be of a relatively simple and inexpensive construction capable of conveniently performing a host of different functions besides the normal functions of a VTOL vehicle. Thus, the foregoing features enable the vehicle to be constructed as a utility vehicle for a large array of tasks including serving as a weapons platform; transporting personnel, weapons, and/or cargo; evacuating medically wounded, etc., without requiring major changes in the basic structure of the vehicle when transferring from one task to another.

An alternative vehicle arrangement is described wherein the vehicle is relatively small in size, having insufficient room for installing a cockpit in the middle of the vehicle and where the pilot's cockpit is therefore installed to one side of the vehicle, thereby creating a large, single payload bay in the remaining area between the two lift-producing propellers.

Other vehicle arrangement are described wherein the vehicle does not feature any form of pilot's enclosure, for use in an unmanned role, piloted by suitable on-board electronic computers or being remotely controlled from the ground.

Additional features in the exemplary embodiments relate to a central portion of the aircraft fuselage that may be aerodynamically shaped to enhance the flight characteristics of the vehicle. For example, the bottom of the fuselage may be curved so as to reduce momentum drag on the vehicle. In another example, the central portion of the fuselage is airfoil-shaped to create an increase in negative pressure above the fuselage and to increase positive pressure below the fuselage, thereby providing additional aerodynamic lift. In another example, a curved cutout is employed at a lower forward-facing fuselage section just behind the forward duct to cause air to assume a general direction similar to the direction of flow prior to contact with the vehicle.

Additional modifications to the aft duct and to the control vanes in both the forward and aft ducts further enhance the control aspects of the VTOL vehicle and enhance air flow through the aft duct, particularly in forward flight.

In the illustrated embodiments, auxiliary air is introduced through plural slots in the forward-facing wall of the aft duct. An air scoop located on the lower surface of the fuselage may also be used to supply auxiliary air to the duct. In one example, auxiliary air is introduced utilizing the turbine engine compressor of the vehicle as a source of the additional air. In another example, auxiliary air is introduced with the aid of an air pump and associated compressor. The scoops, supply ducts or slots may have varying cross sections to accelerate the flow of auxiliary air into the duct. Supplying auxiliary air to the aft duct causes duct air to separate from the duct wall, reducing drag of the vehicle in forward flight.

It is also a feature of the illustrated embodiments that the duct wall slots are located between the plane of the duct fan propeller and the exit end of the duct.

It will be understood that the above arrangements may also be utilized in combination with adjustable openings formed in the forward-facing wall of the forward duct, as well as in the rearward-facing wall of the aft duct. The adjustable openings may have a curved barrier mounted inside the duct wall for sliding movement relative to the opening to control the airflow through the opening.

Alternatively, vertical louvers arranged within the openings can be rotated and used as control surfaces complementary to the main control vanes at the inlets and exits of the ducts. The axes of the vertical louvers may be configured at approximately 25-30% of the chord of the louvers. The louvers may also be configured so that when in the closed position, they substantially align with the inner surface of the duct wall.

Alternatively, the openings at the front side of the forward duct and the rear side of the aft duct are full openings so that the ducts are actually incomplete circles.

Additional features in the exemplary embodiments relate to controlling forces generated on the vehicle near side objects.

Further features and advantages of the invention will be apparent from the description below. Some of those describe unique features applicable in any single or multiple ducted fan and VTOL vehicles.

BRIEF DESCRIPTION OF THE DRAWINGS

The invention is herein described, by way of example only, with reference to the accompanying drawings, wherein:

FIGS. 30a-d show a vehicle generally similar to that shown in FIG. 18, however having alternative internal arrangements for various elements including cabin arrangement geometry to enable carriage of 5 passengers or combatants;

FIGS. 32a-g illustrate means for enabling the external airflow to penetrate the walls of the forward ducted fan of the vehicles described in FIGS. 1-21 and FIGS. 30-31 while in forward flight, for the purpose of minimizing the momentum drag of the vehicle;

FIGS. 33a-g illustrate means for enabling the internal airflow to exit through the walls of the aft ducted fan of the vehicles described in FIGS. 1-21 and FIGS. 30-31, while in forward flight, for the purpose of minimizing the momentum drag of the vehicle;

FIG. 34 illustrates means for directing the internal airflow to exit with a rearward velocity component for the purpose of minimizing the momentum drag of the vehicle in forward flight;

FIGS. 35a-c illustrate additional optional means for enabling the external airflow to penetrate the walls of the forward duct and the internal airflow to exit through the walls of the aft ducted fan of the vehicles described in FIGS. 1-21 and FIGS. 30-31, while in forward flight, for the purpose of minimizing the momentum drag of the vehicle;

FIG. 39 illustrates a longitudinal cross-section taken along line 39-39 of FIG. 38;

FIGS. 56 and 57 illustrate the influence of the magnitude of the induced velocity through the lift fans, relative to the free-stream velocity, on the shape of the streamlines flowing around the center section, as well as through and out of the lift fans of the vehicles of FIG. 40 and FIG. 52;

FIGS. 60-63 illustrate optional means for directing the flow exiting the aft duct behind the center fuselage to the rear of the vehicles described in FIGS. 1-21 and FIGS. 30-31, while in forward flight, for the purpose of minimizing the momentum drag of the vehicle;

FIGS. 64a and 65a illustrate the clearances between the rotor blades and the duct and the vertical louvers, also called vertical supports, of the forward (front) duct configurations shown in FIGS. 32f and 32g.

FIGS. 64b and 65b illustrate the vehicle louvers of FIGS. 64a and 64b rotated to a 'closed position.'

FIGS. 66a and 66b illustrate alternative vertical louvers at the forward or front duct;

FIGS. 67a and 67b illustrate the configurations of FIG. 63a and FIG. 63b applied to the aft (rear) duct;

FIGS. 69a-g illustrate the application of the vertical louvers as control elements of the vehicle;

FIGS. 73a-h illustrate applications of a separator to counter the forces generated on the vehicle near side objects.

FIGS. 74a-d illustrate an alternative application of flexible separators on the vehicle.

FIGS. 75a-h illustrate other versions of the separators which can also be used for other purposes.

It is to be understood that the foregoing drawings, and the description below, are provided primarily for purposes of facilitating understanding the conceptual aspects of the invention and various possible embodiments thereof, including what is presently considered to be a preferred embodiment. In the interest of clarity and brevity, no attempt is made to provide more details than necessary to enable one skilled in the art, using routine skill and design, to understand and practice the described invention. It is to be further understood that the embodiments described are for purposes of example only, and that the invention is capable of being embodied in other forms and applications than described herein.

DETAILED DESCRIPTION OF PREFERRED EMBODIMENTS

As indicated earlier, the present invention provides a vehicle of a novel construction which permits it to be used for a large variety of tasks and missions with no changes, or minimum changes, required when converting from one mission to another.

Figure 1:
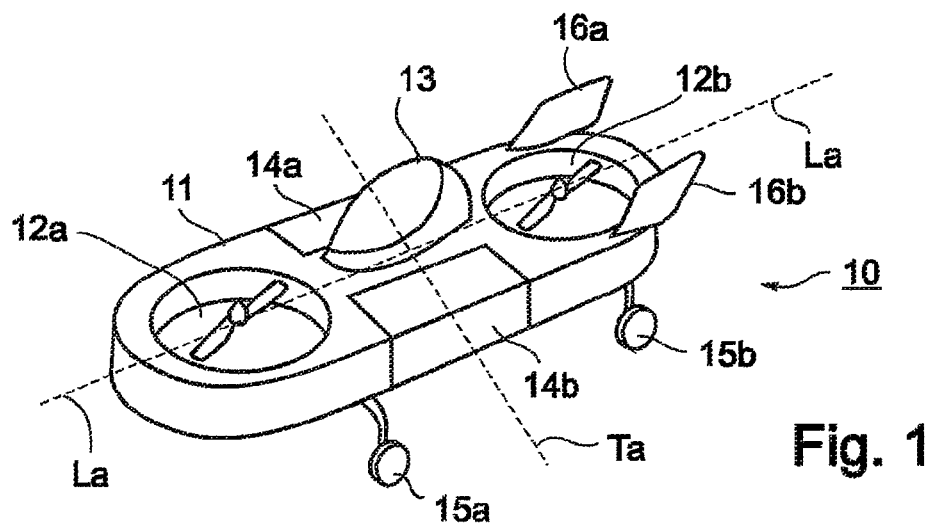
FIG. 1 illustrates one form of VTOL vehicle constructed in accordance with present invention with two ducted fans.

The basic construction of such a vehicle is illustrated in FIG. 1, and is therein generally designated 10. It includes a fuselage 11 having a longitudinal axis LA and a transverse axis TA. Vehicle 10 further includes two lift-producing propellers 12a, 12b carried at the opposite ends of the fuselage 11 along its longitudinal axis LA and on opposite sides of its transverse axis TA. Lift-producing propellers 12a, 12b are ducted fan propulsion units extending vertically through the fuselage and rotatable about vertical axes to propel the air downwardly and thereby to produce an upward lift.

Vehicle 10 further includes a pilot's compartment 13 formed in the fuselage 11 between the lift-producing propellers 12a, 12 and substantially aligned with the longitudinal axis LA and transverse axis TA of the fuselage. The pilot's compartment 13 may be dimensioned so as to accommodate a single pilot or two (or more) pilots, as shown, for example, in FIG. 6a.

Vehicle 10 illustrated in FIG. 1 further includes a pair of payload bays 14a, 14b formed in the fuselage 11 laterally on the opposite sides of the pilot's compartment 13 and between the lift-producing propellers 12a, 12b. The payload bays 14a, 14b shown in FIG. 1 are substantially flush with the fuselage 11, as will be described more particularly below with respect to FIGS. 6a-6c and the pictorial illustration in FIGS. 8a-8d. Also described below, particularly with respect to the pictorial illustrations of FIGS. 8a-8d, are the wide variety of tasks and missions capable of being accomplished by the vehicle when constructed as illustrated in FIG. 1 (and in the later illustrations), and particularly when provided with the payload bays corresponding to 14a, 14b of FIG. 1.

Vehicle 10 illustrated in FIG. 1 further includes a front landing gear 15a and a rear landing gear 15b mounted at the opposite ends of its fuselage 11. In FIG. 1 the landing gears are non-retractable, but could be retractable as in later described embodiments. Aerodynamic stabilizing surfaces may also be provided, if desired, as shown by the vertical stabilizers 16a, 16b carried at the rear end of fuselage 11 on the opposite sides of its longitudinal axis LA.

Figure 2:
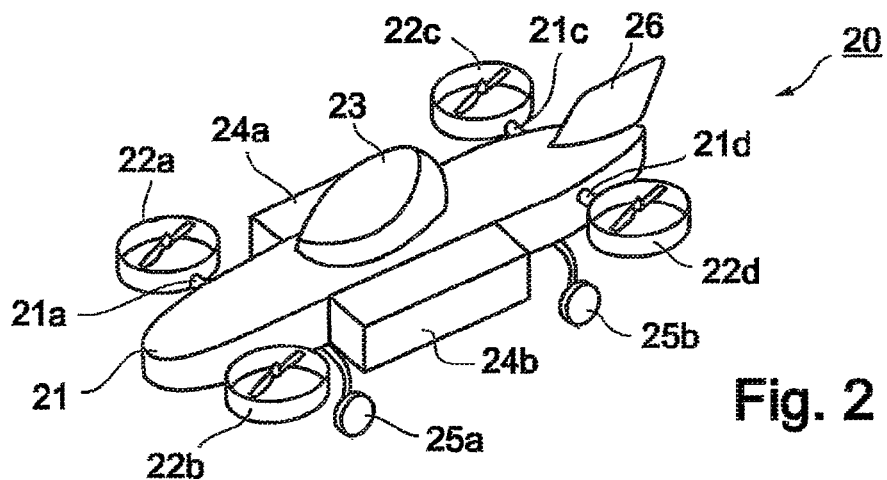
FIG. 2 illustrates an alternative construction with four ducted fans.

FIG. 2 illustrates another vehicle construction in accordance with the present invention. In the vehicle of FIG. 2, therein generally designated 20, the fuselage 21 is provided with a pair of lift-producing propellers on each side of the transverse axis of the fuselage. Thus, as shown in FIG. 2, the vehicle includes a pair of lift-producing propellers 22a, 22b at the front end of the fuselage 21, and another pair of lift-producing propellers 22c, 22d at the rear end of the fuselage. The lift-producing propellers 22a-22d shown in FIG. 2 are also ducted fan propulsion units. However, instead of being formed in the fuselage 21, they are mounted on mounting structures 21a-21d to project laterally of the fuselage.

Vehicle 20 illustrated in FIG. 2 also includes the pilot's compartment 23 formed in the fuselage 21 between the two pairs of lift-producing propellers 22a, 22b and 22c, 22d, respectively. As in the case of the pilot's compartment 13 in FIG. 1, the pilot's compartment 23 in FIG. 2 is also substantially aligned with the longitudinal axis LA and transverse axis TA of the fuselage 21.

Vehicle 20 illustrated in FIG. 2 further includes a pair of payload bays 24a, 24b formed in the fuselage 21 laterally of the pilot's compartment 23 and between the two pairs of lift-producing propellers 22a-22d. In FIG. 2, however, the payload bays are not formed integral with the fuselage, as in FIG. 1, but rather are attached to the fuselage so as to project laterally on opposite sides of the fuselage. Thus, payload bay 24a is substantially aligned with the lift-producing propellers 22a, 22c on that side of the fuselage; and payload bay 24b is substantially aligned with the lift-producing propellers 22b and 22d at that side of the fuselage.

Vehicle 20 illustrated in FIG. 2 also includes a front landing gear 25a and a rear landing gear 25b, but only a single vertical stabilizer 26 at the rear end of the fuselage aligned with its longitudinal axis. It will be appreciated however, that vehicle 20 illustrated in FIG. 2 could also include a pair of vertical stabilizers, as shown at 16a and 16b in FIG. 1, or could be constructed without any such aerodynamic stabilizing surface.

Figure 3:
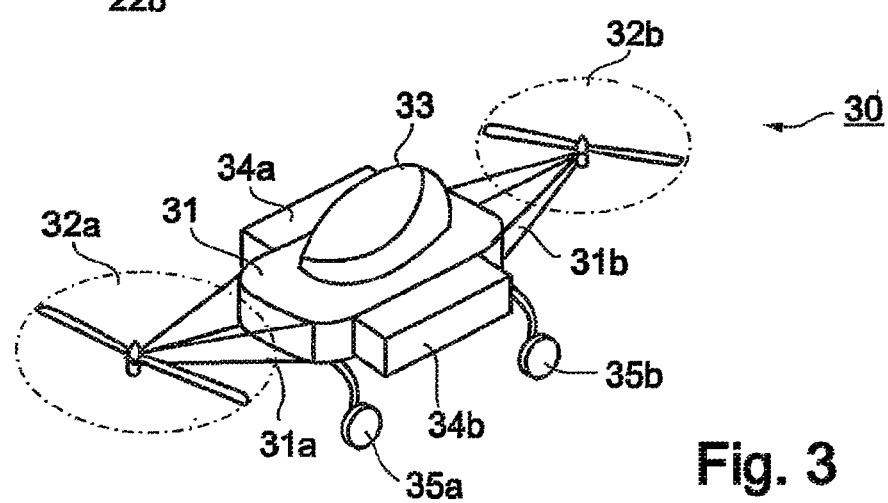
FIG. 3 illustrates a construction similar to FIG. 1 with free propellers, i.e., unducted fans.

FIG. 3 illustrates a vehicle 30 also including a fuselage 31 of a very simple construction having a forward mounting structure 31a for mounting the forward lift-producing propeller 32a, and a rear mounting structure 31b for mounting the rear lift-producing propeller 32b. Both propellers are unducted, i.e., free, propellers. Fuselage 31 is formed centrally thereof with a pilots compartment 33 and carries the two payload bays 34a, 34b on its opposite sides laterally of the pilot's compartment.

Vehicle 30 illustrated in FIG. 3 also includes a front landing gear 35a and a rear landing gear 35b, but for simplification purposes, it does not include an aerodynamic stabilizing surface corresponding to vertical stabilizers 16a, 16b in FIG. 1.

Figure 4:
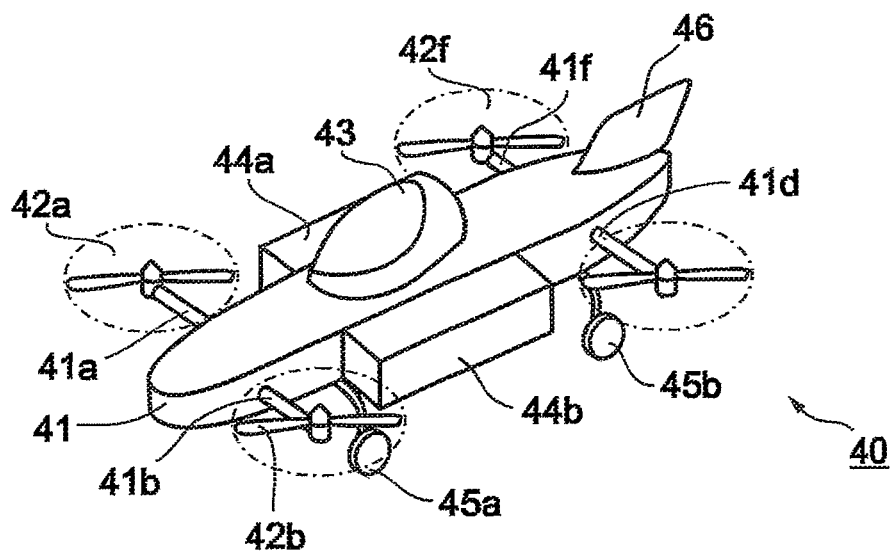
FIG. 4 illustrates a construction similar to FIG. 2 with free propellers.

FIG. 4 illustrates a vehicle, generally designated 40, of a similar construction as in FIG. 2 but including a fuselage 41 mounting a pair of unducted propellers 42a, 42b at its front end, and a pair of unducted propellers 42c, 42d at its rear end by means of mounting structures 41a-41d, respectively. Vehicle 40 further includes a pilot's compartment 43 centrally of the fuselage, a pair of payload bays 44a, 44b laterally of the pilot's compartment, a front landing gear 45a, a rear landing gear 45b, and a vertical stabilizer 46 at the rear end of the fuselage 41 in alignment with its longitudinal axis.

Figure 5:
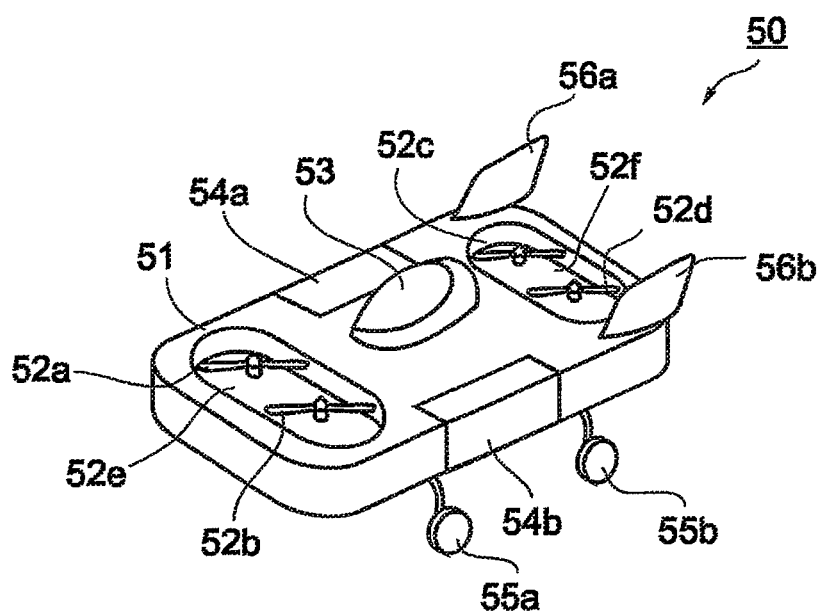
FIG. 5 illustrates a construction similar to that of FIG. 1 but including two propellers, instead of a single propeller, mounted side-by-side in a single, oval shaped duct at each end of the vehicle.

FIG. 5 illustrates a vehicle, generally designated 50, including a fuselage 51 mounting a pair of lift-producing propellers 52a, 52b at its front end, and another pair 52c, 52d at its rear end. Each pair of lift-producing propellers 52a, 52b and 52c, 52d is enclosed within a common oval-shaped duct 52e, 52f at the respective end of the fuselage.

Vehicle 50 illustrated in FIG. 5 further includes a pilot' compartment 53 formed centrally of the fuselage 51, a pair of payload bays 54a, 54b laterally of the pilot's compartment 53, a front landing gear 55a, a rear landing gear 55b, and vertical stabilizers 56a, 56b carried at the rear end of the fuselage 51.

Figure 6A:
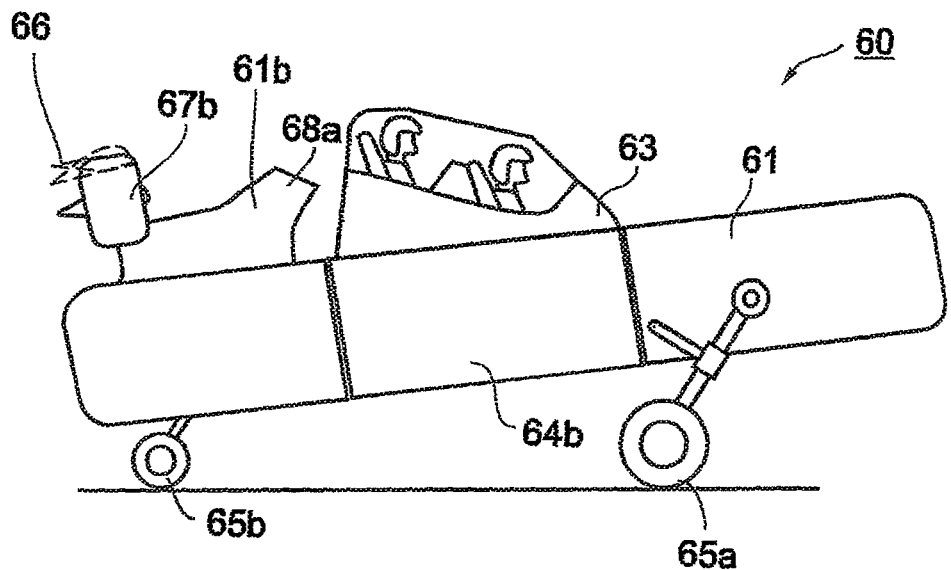
FIGS. 6a, 6b and 6c are side, top and rear views, respectively, illustrating another VTOL vehicle constructed in accordance with the present invention and including pusher propellers in addition to the lift-producing propellers.
Figure 6B:
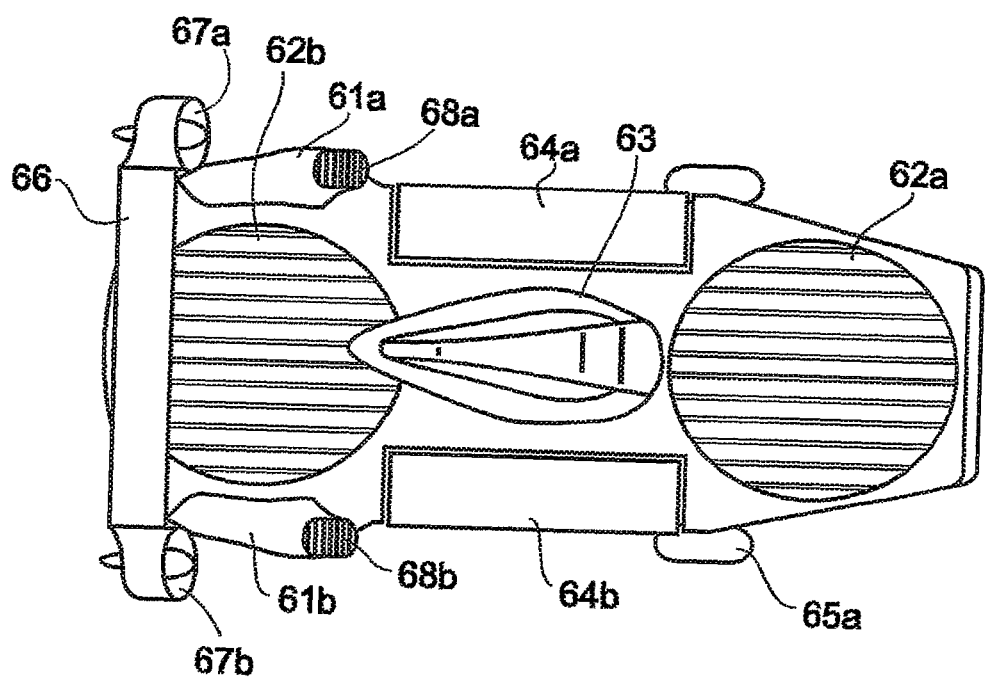
Figure 6C:
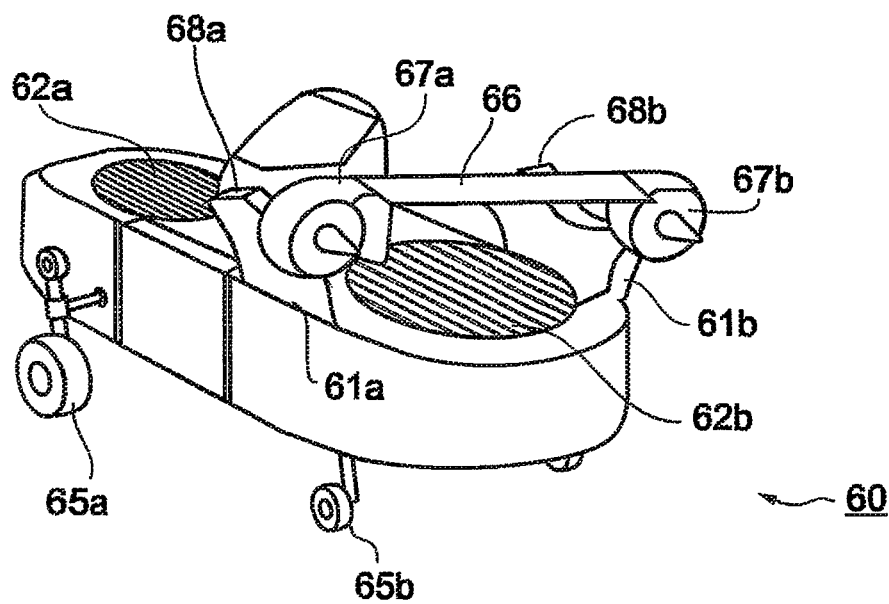

FIGS. 6a, 6b and 6c are side, top and rear views, respectively, of another vehicle constructed in accordance with the present invention. The vehicle illustrated in FIGS. 6a-6c, therein generally designated 60, also includes a fuselage 61 mounting a lift-producing propeller 62a, 62b at its front and rear ends, respectively. The latter propellers are preferably ducted units as in FIG. 1.

Vehicle 60 further includes a pilot's compartment 63 centrally of the fuselage 61, a pair of payload bays 64a, 64b laterally of the fuselage and of the pilot's compartment, a front landing gear 65a, a rear landing gear 65b, and a stabilizer, which, in this case, is a horizontal stabilizer 66 extending across the rear end of the fuselage 61.

Vehicle 60 illustrated in FIGS. 6a-6c further includes a pair of pusher propellers 67a, 67b, mounted at the rear end of the fuselage 61 at the opposite ends of the horizontal stabilizer 66. As shown particularly in FIG. 6c the rear end of the fuselage 61 is formed with a pair of pylons 61a, 61b, for mounting the two pusher propellers 67a, 67b, together with the horizontal stabilizer 66.

The two pusher propellers 67a, 67b are preferably variable-pitch propellers enabling the vehicle to attain higher horizontal speeds. The horizontal stabilizer 66 is used to trim the vehicle's pitching moment caused by the ducted fans 62a, 62b, thereby enabling the vehicle to remain horizontal during high speed flight.

Each of the pusher propellers 67a, 67b is driven by an engine enclosed within the respective pylon 61a, 61b. The two engines are preferably turbo-shaft engines. Each pylon is thus formed with an air inlet 68a, 68b at the forward end of the respective pylon, and with an air outlet (not shown) at the rear end of the respective pylon.

Figure 7:
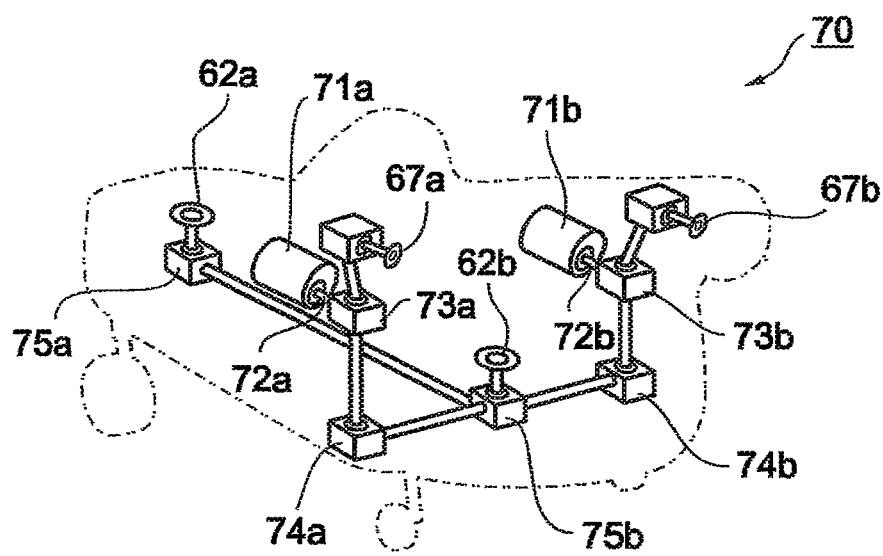
FIG. 7 is a diagram illustrating the drive system in the vehicle of FIGS. 6a-6c.

FIG. 7 schematically illustrates the drive within the vehicle 60 for driving the two ducted fans 62a, 62b as well as the pusher propellers 67a, 67b. The drive system, generally designated 70, includes two engines 71, 71b, each incorporated in an engine compartment within one of the two pylons 61a, 61b. Each engine 71a, 71b, is coupled by an over-running clutch 72a, 72b, to a gear box 73a, 73b coupled on one side to the respective thrust propeller 67a, 67b, and on the opposite side to a transmission for coupling to the two ducted fans 62a, 62b at the opposite ends of the fuselage. Thus, as schematically shown in FIG. 7, the latter transmission includes additional gear boxes 74a, 74b coupled to rear gear box 75b for driving the rear ducted fan 62b, and front gear box 75a for driving the front ducted fan 62b.

Figure 8:
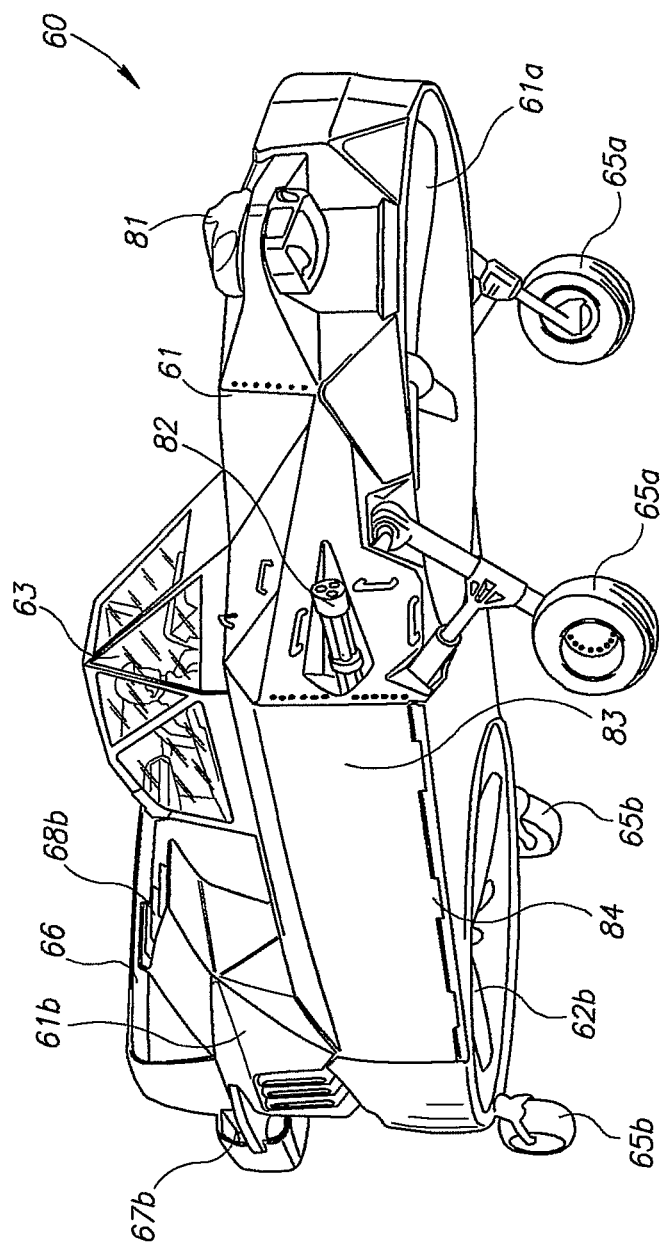
FIG. 8 is a pictorial illustration of a vehicle constructed in accordance with FIGS. 6a-6c and 7.

FIG. 8 illustrates an example of the outer appearance that vehicle 60 may take.

In the illustration of FIG. 8, those parts of the vehicle which correspond to the above-described parts in FIGS. 6a-6c are identified by the same reference numerals in order to facilitate understanding FIG. 8, however, illustrates a number of additional features which may be provided in such a vehicle.

Thus, as shown in FIG. 8, the front end of the fuselage 61 may be provided with a stabilized sight and FLIR (Forward Looking Infra-Red) unit, as shown at 81, and with a gun at the forward end of each payload bay, as shown at 82. In addition, each payload bay may include a cover 83 deployable to an open position providing access to the payload bay, and to a closed position covering the payload bay with respect to the fuselage 61.

In FIG. 8, cover 83 of each payload bay is pivotally mounted to the fuselage 61 along an axis 84 parallel to the longitudinal axis of the fuselage at the bottom of the respective bay. The cover 83, when in its closed condition, conforms to the outer surface of the fuselage 61 and is flush therewith. When the cover 83 is pivoted to its open position, it serves as a support for supporting the payload, or a part thereof, in the respective payload bay.

Figure 8A:
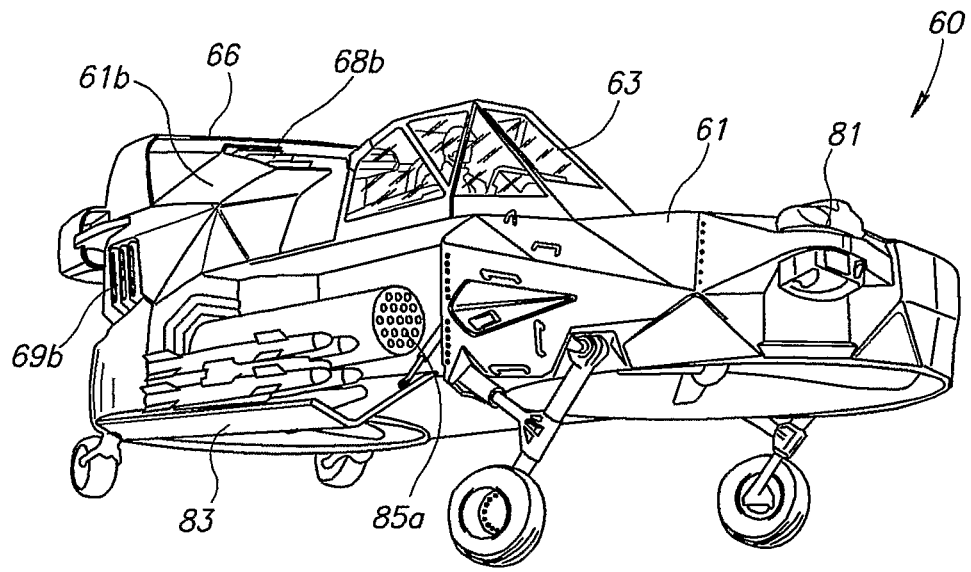
FIG. 8a-8d illustrate examples of various tasks and missions capable of being accomplished by the vehicle of FIG. 8.
Figure 8B:
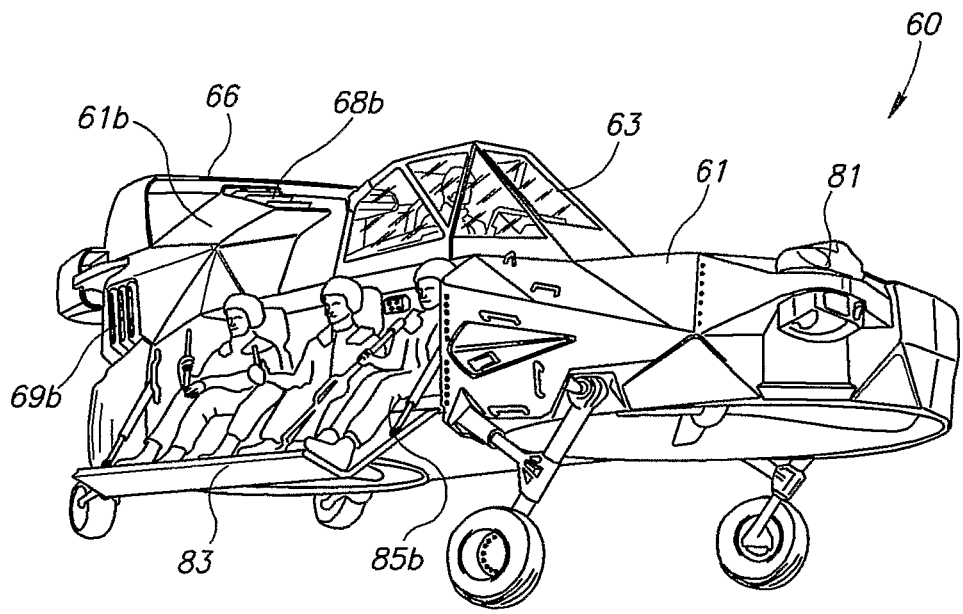
Figure 8C:
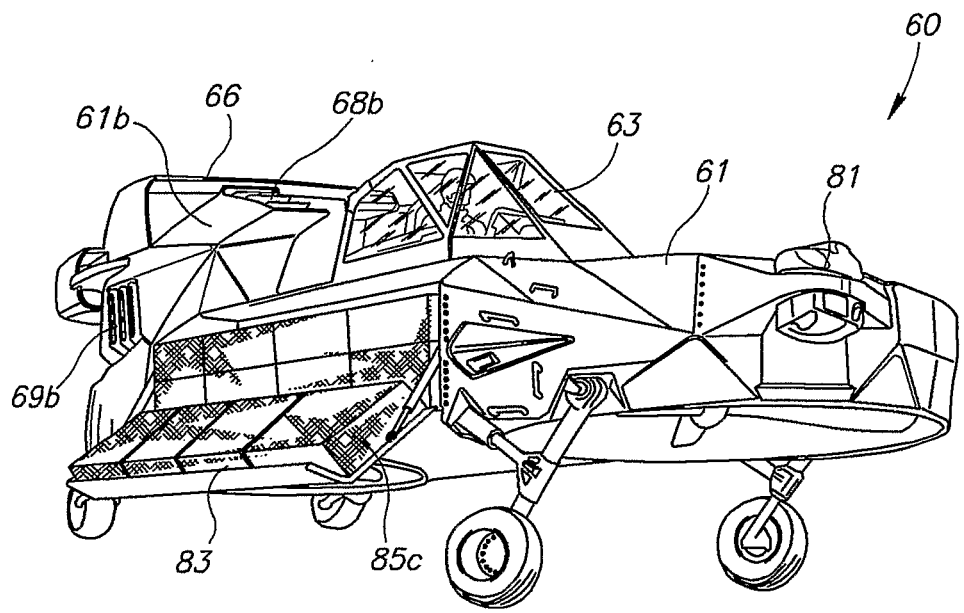
Figure 8D:
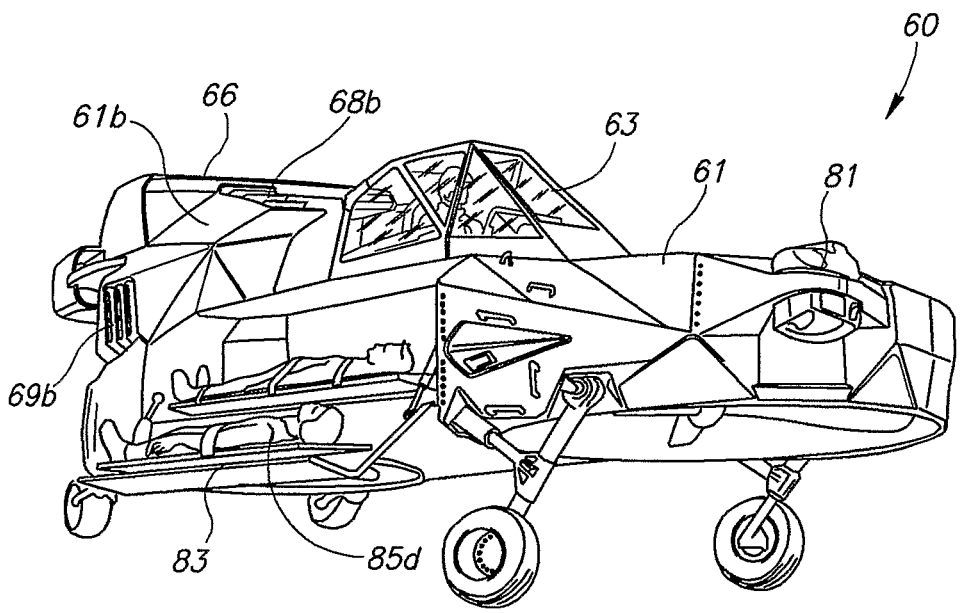

The latter feature is more particularly shown in FIGS. 8a-8d which illustrate various task capabilities of the vehicle as particularly enabled by the pivotal covers 83 for the two payload bays. Thus, FIG. 8a illustrates the payload bays used for mounting or transporting guns or ammunition 85a; FIG. 8b illustrates the use of the payload bays for transporting personnel or troops 85b; FIG. 8c illustrates the use of the payload bays for transporting cargo 85c; and FIG. 8d illustrates the use of the payload bays for evacuating wounded 85d. Many other task or mission capabilities will be apparent.

Figure 9A:
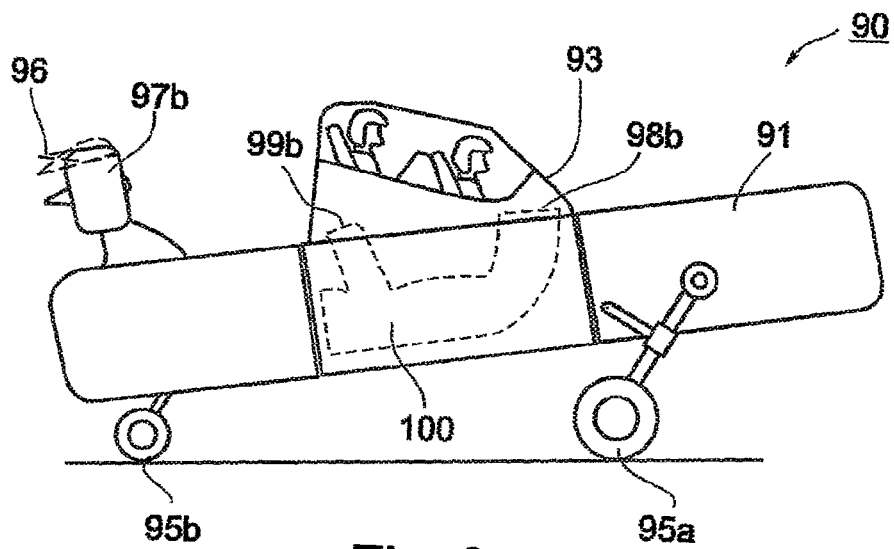
FIGS. 9a and 9b are side and top views, respectively, illustrating another VTOL vehicle constructed in accordance with the present invention.
Figure 9B:
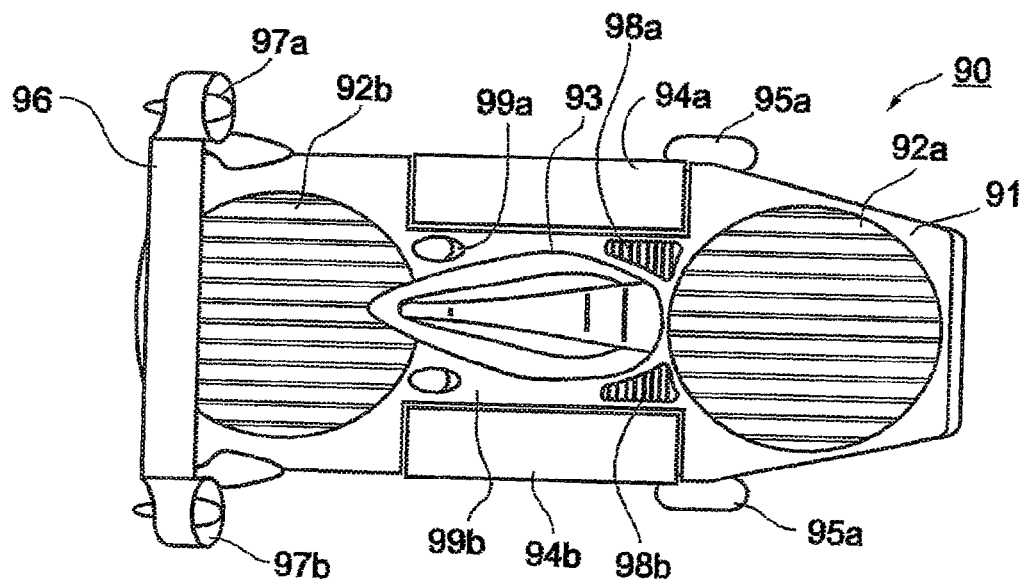

FIGS. 9a and 9b are side and top views, respectively, illustrating another vehicle, generally designated 90, of a slightly modified construction from vehicle 60 described above. Thus, vehicle 90 illustrated in FIGS. 9a and 9b also includes a fuselage 91, a pair of ducted-fan type lift-producing propellers 92a, 92b at the opposite ends of the fuselage, a pilot's compartment 93 centrally of the fuselage, and a pair of payload bays 94a, 94b laterally of the pilot's compartment 93. Vehicle 90 further includes a front landing gear 95a, a rear landing gear 95b, a horizontal stabilizer 96, and a pair of pusher propellers 97a, 97b, at the rear end of fuselage 91.

Figure 10:
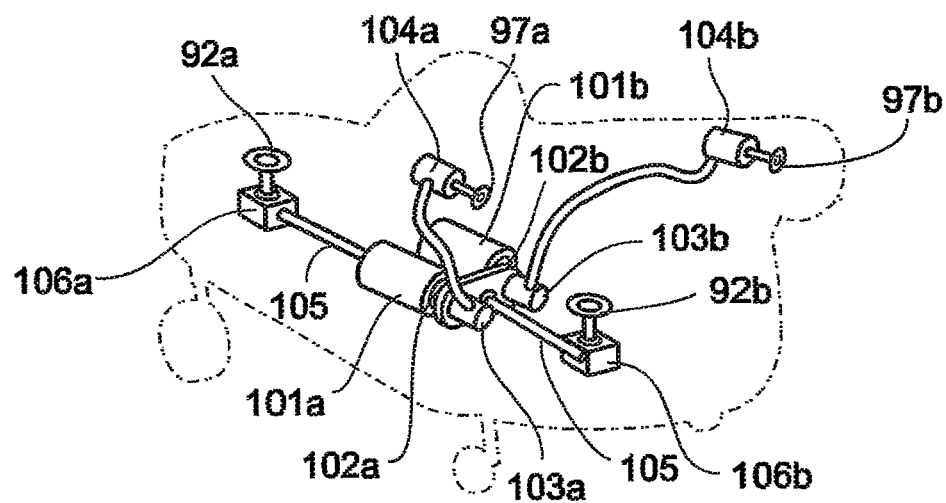
FIG. 10 is a diagram illustrating the drive system in the vehicle of FIGS. 9a and 9b.

FIG. 10 schematically illustrates the drive system in vehicle 90. Thus as shown in FIG. 10, vehicle 90 also includes two engines 101a, 101b for driving the two ducted fans 92a, 92b and the two pusher propellers 97a, 97b, respectively, as in vehicle 60. However, whereas in vehicle 60 the two engines are located in separate engine compartments in the two pylons 61a, 61b, in vehicle 90 illustrated in FIGS. 9a and 9b both engines are incorporated in a common engine compartment, schematically shown at 100 in FIG. 9a, underlying the pilot's compartment 93. The two engines 101a, 101b (FIG. 10), may also be turbo-shaft engines as in FIG. 7. For this purpose, the central portion of the fuselage 91 is formed with a pair of air inlet openings 98a, 98b forward of the pilot's compartment 93, and with a pair of air outlet openings 99a, 99b rearwardly of the pilot's compartment.

As shown in FIG. 10, the two engines 101a, 101b drive, via the over-running clutches 102a, 102b, a pair of hydraulic pumps 103a, 103b which, in turn, drive the drives 104a, 104b of the two pusher propellers 97a, 97b. The two engines 101a, 101b are further coupled to a drive shaft 105 which drives the drives 106a, 106b of the two ducted fans 92a, 92b, respectively.

Figure 11A:
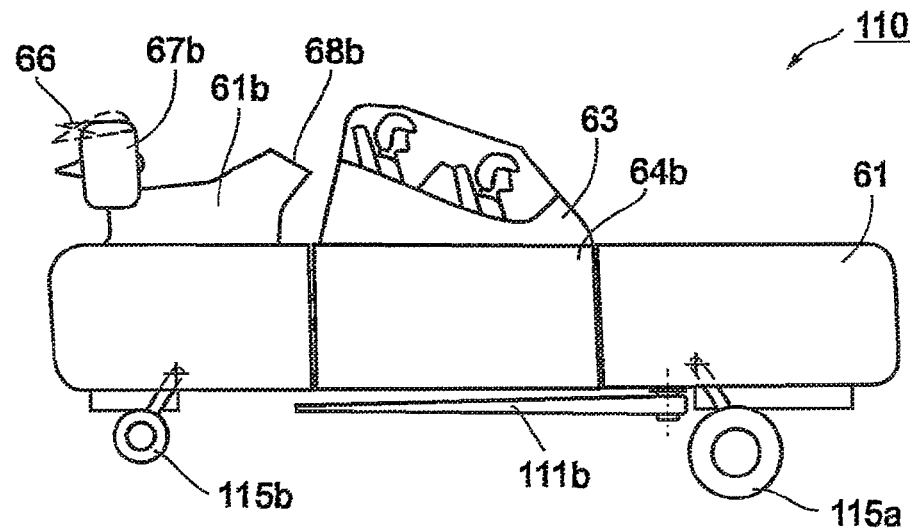
FIGS. 11a and 11b are side and top views, respectively, illustrating a VTOL vehicle constructed in accordance with any one of FIGS. 6a-10 but equipped with deployable stub wings, the wings being shown in these figures in their retracted stowed positions.
Figure 11B:
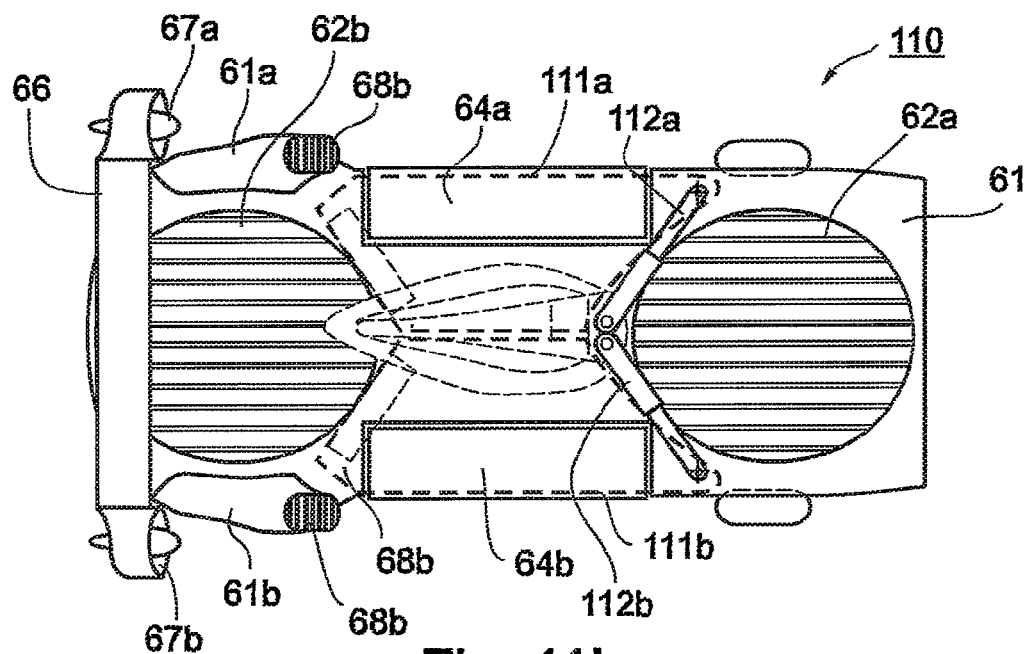
Figure 11C:
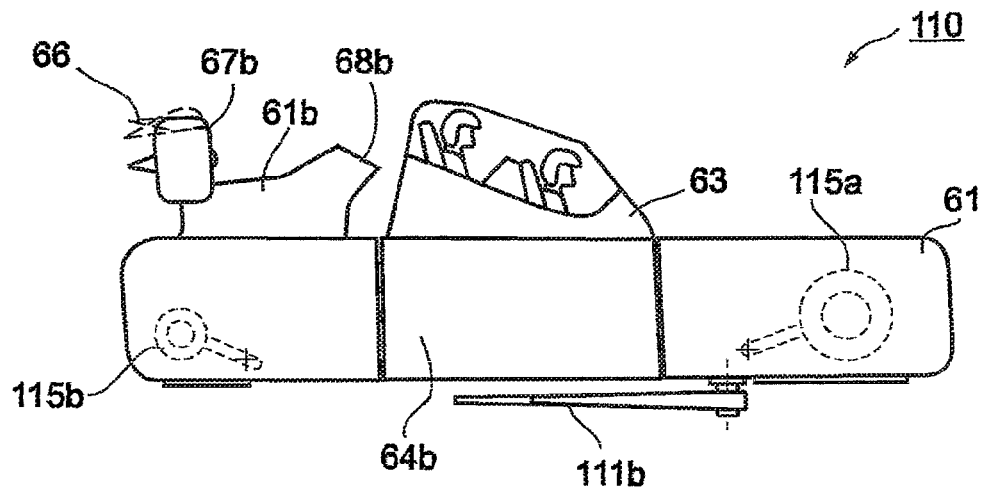
FIG. 11c and 11d are views corresponding to those of FIGS. 11a and 11b but showing the stub wings in their deployed, extended positions.
Figure 11D:
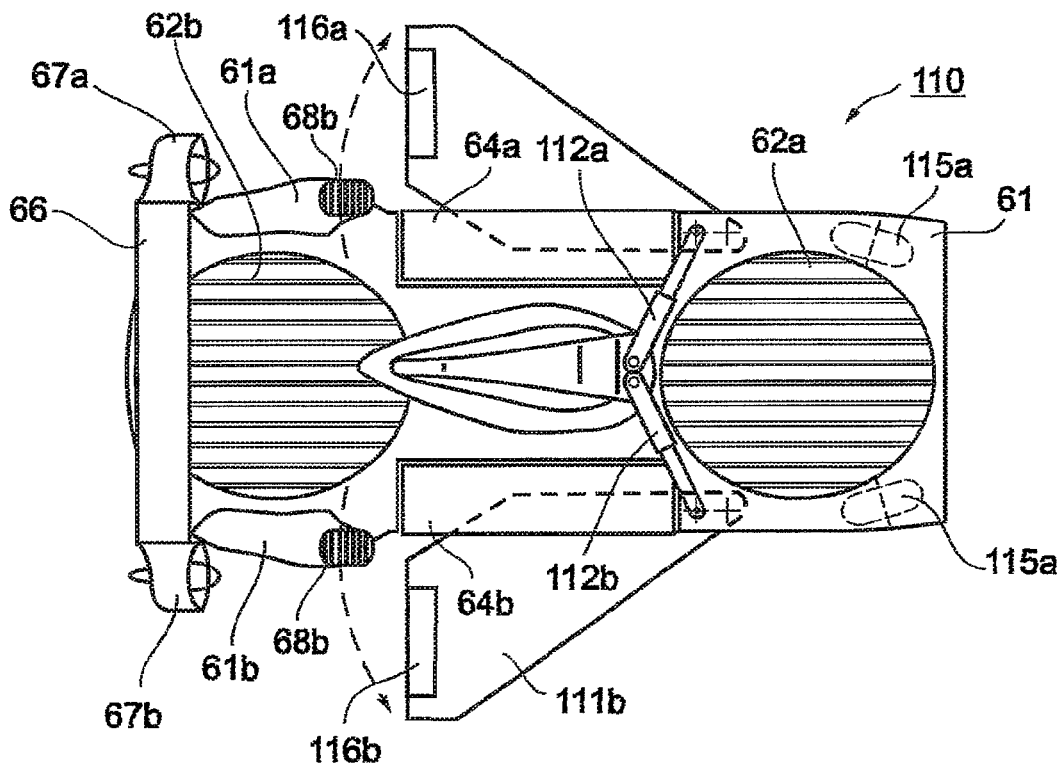

FIGS. 11a-11d illustrate another vehicle, therein generally designated 110, which is basically of the same construction as vehicle 60 described above with respect to FIGS. 6a-6c, 7, 8 and 8a-8d; to facilitate understanding, corresponding elements are therefore identified by the same reference numerals. Vehicle 110 illustrated in FIGS. 11a-11d, however, is equipped with two stub wings, generally designated 111a, 111b, each pivotally mounted to the fuselage 61, under one of the payload bays 64a, 64b, to a retracted position shown in FIGS. 11a and 11b, or to an extended deployed position shown in FIGS. 11c and 11d for enhancing the lift produced by the ducted fans 62a, 62b. Each of the stub wings 111a, 111b is actuated by an actuator 112a, 112b driven by a hydraulic or electrical motor (not shown). Thus, at low speed flight, the stub wings 111a, 111b, would be pivoted to their stowed positions as shown in FIGS. 11a and 11b; but at high speed flight, they could be pivoted to their extended or deployed positions, as shown in FIGS. 11c and 11d, to enhance the lift produced by the ducted fans 61a, 61b. Consequently, the blades in the ducted fans would be at low pitch producing only a part of the total lift force.

The front and rear landing gear, shown at 115a and 115b, could also by pivoted to a stowed position to enable higher speed flight, as shown in FIGS. 11c and 11d. In such case, the front end of the fuselage 61 would preferably be enlarged to accommodate the landing gear when in its retracted condition. Vehicle 110 illustrated in FIGS. 11a-11d may also include ailerons, as shown at 116a, 116b (FIG. 11d) for roll control.

Figure 12:
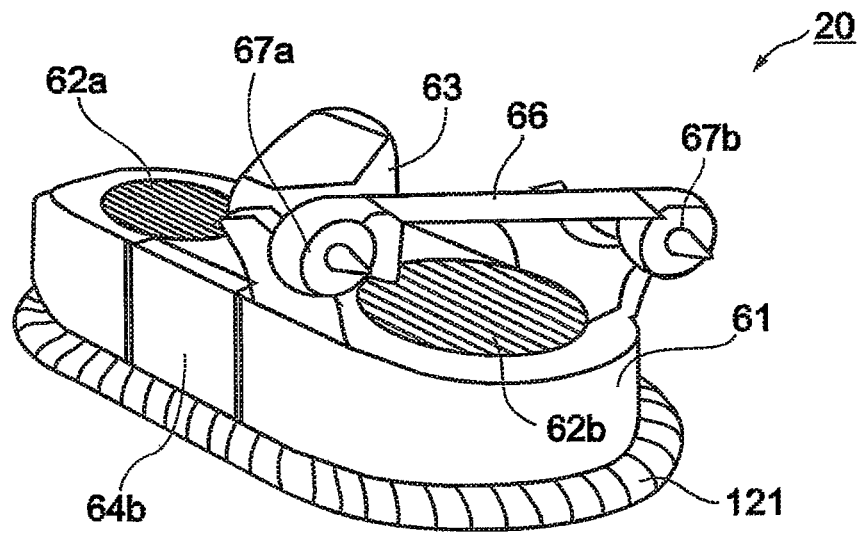
FIG. 12 is a perspective rear view of a vehicle constructed in accordance with any one of FIGS. 6a-10 but equipped with a lower skirt for converting the vehicle to a hovercraft for movement over ground or water.

FIG. 12 illustrates how the vehicle, such as vehicle 60 illustrated in FIGS. 6a-6d, may be converted to a hovercraft for traveling over ground or water. Thus, the vehicle illustrated in FIG. 12, and therein generally designated 120, is basically of the same construction as described above with respect to FIGS. 6a-6d, and therefore corresponding parts have been identified with the same reference numerals. In vehicle 120 illustrated in FIG. 12, however, the landing gear wheels (65a, 65b, FIGS. 6a-6d) have been removed, folded, or otherwise stowed, and instead, a skirt 121 has been applied around the lower end of the fuselage 61. The ducted fans 62a, 62b, may be operated at very low power to create enough pressure to cause the vehicle to hover over the ground or water as in hovercraft vehicles. The variable pitch pusher propellers 67a, 67b would provide forward or rear movement, as well as steering control, by individually varying the pitch, as desired, of each propeller.

Vehicles constructed in accordance with the present invention may also be used for movement on the ground. Thus, the front and rear wheels of the landing gears can be driven by electric or hydraulic motors included within the vehicle.

Figure 13:
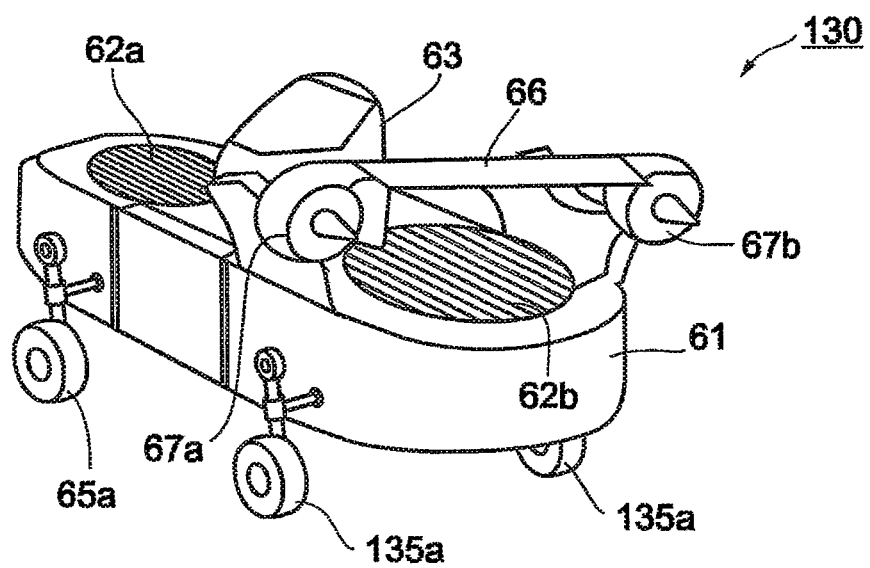
FIG. 13 is a perspective rear view of a vehicle constructed in accordance with any one of FIGS. 6a-10 but equipped with large wheels for converting the vehicle for ATV (all terrain vehicle) operation.

FIG. 13 illustrates how such a vehicle can also be used as an ATV (all terrain vehicle). The vehicle illustrated in FIG. 13, therein generally designated 130, is basically of the same construction as vehicle 60 illustrated in FIGS. 6a-6d, and therefore corresponding parts have been identified by the same reference numerals to facilitate understanding. In vehicle 130 illustrated in FIG. 13, however, the two rear wheels of the vehicle are replaced by two (or four) larger ones, bringing the total number of wheels per vehicle to four (or six). Thus, as shown in FIG. 13, the front wheels (e.g., 65a, FIG. 6c) of the front landing gear are retain, but the rear wheels are replaced by two larger wheels 135a (or by an additional pair of wheels, not shown), to enable the vehicle to traverse all types of terrain.

When the vehicle is used as an ATV as shown in FIG. 13, the front wheels 65a or rear wheels would provide steering, while the pusher propellers 67a, 67b and main lift fans 62a, 62b would be disconnected but could still be powered-up for take-off if so desired. The same applies also with respect to the hovercraft version illustrated in FIG. 12.

It will thus be seen that the invention thus provides a utility vehicle of a relatively simple structure which is capable of performing a wide variety of VTOL functions, as well as many other tasks and missions, with minimum changes in the vehicle to convert it from one task or mission to another.

FIGS. 14a-14e are pictorial illustrations of alternative vehicle arrangements where the vehicle is relatively small in size, having the pilot's cockpit installed to one side of the vehicle. Various alternative payload possibilities are shown.

Figure 14A:
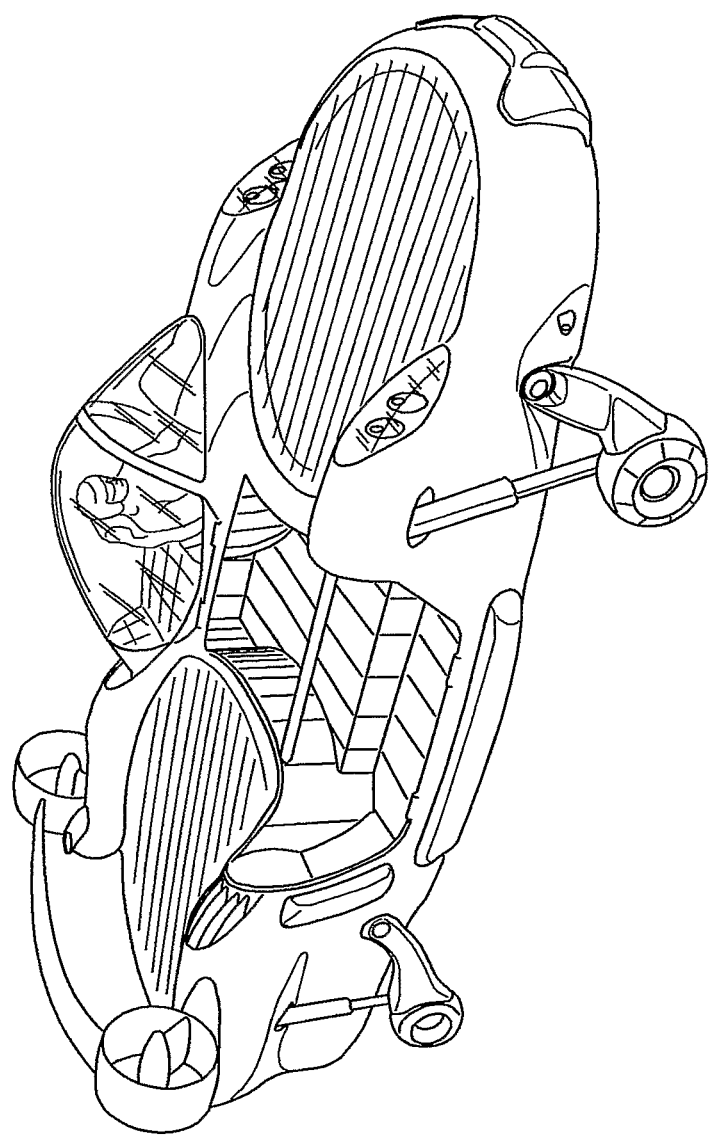
FIGS. 14a-14e are a pictorial illustration of an alternative vehicle arrangement wherein the vehicle is relatively small in size, having the pilot's cockpit installed to one side of the vehicle. Various alternative payload possibilities are shown.

FIG. 14a shows the vehicle in its basic form, with no specific payload installed. The overall design and placement of parts of the vehicle are similar to those of the 'larger' vehicle described in FIG. 8 with the exception of the pilot's cockpit, which in the arrangement of FIG. 14 takes up the space of one of the payload bays created by the configuration shown in FIG. 8. The cockpit arrangement of FIG. 14a frees up the area taken up by the cockpit in the arrangement of FIG. 8 for use as an alternative payload area, increasing the total volume available for payload on the opposite side of the cockpit. It is appreciated that the mechanical arrangement of engines, drive shafts and gearboxes for the vehicle of FIG. 14 may be that described with reference to FIG. 7.

Figure 14B:
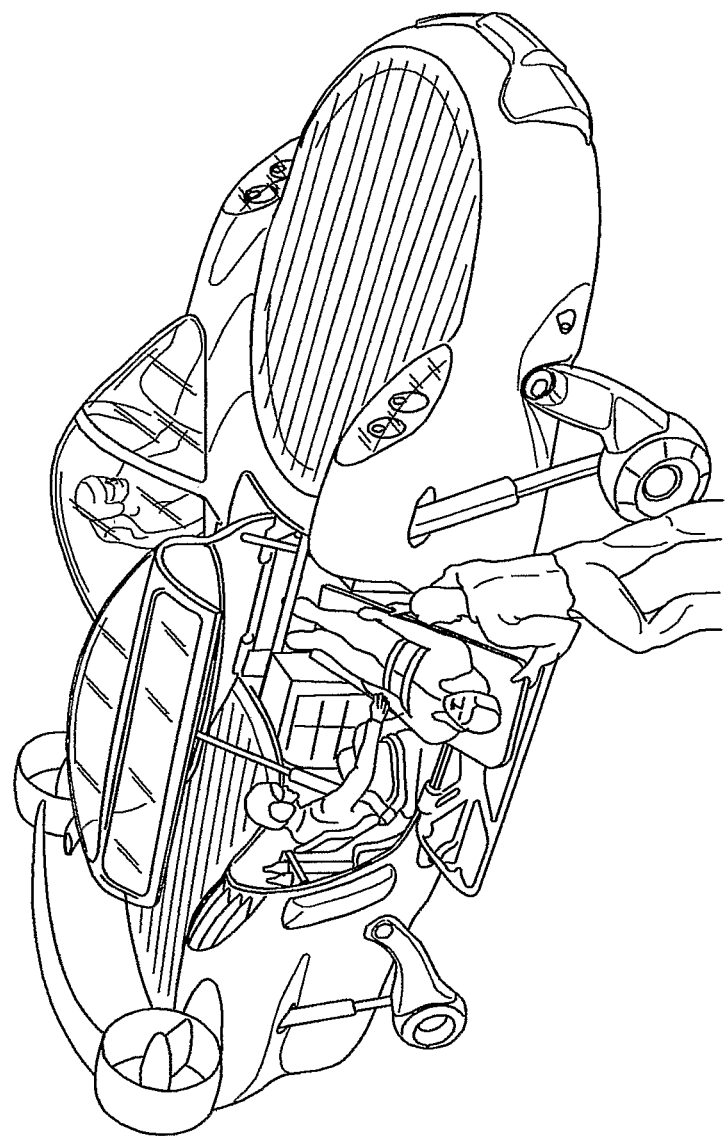

FIG. 14b illustrates how the basic vehicle of FIG. 14a may be used to evacuate a patient. The single payload bay is optionally provided with a cover and side door which protect the occupants, and which may include transparent areas to enable light to enter. The patient lies on a stretcher which is oriented predominantly perpendicular to the longitudinal axis of the vehicle, and optionally at a slight angle to enable the feet of the patient to clear the pilot's seat area and be moved fully into the vehicle despite its small size. Space for a medical attendant is provided, close to the outer side of the vehicle.

Figure 14C:
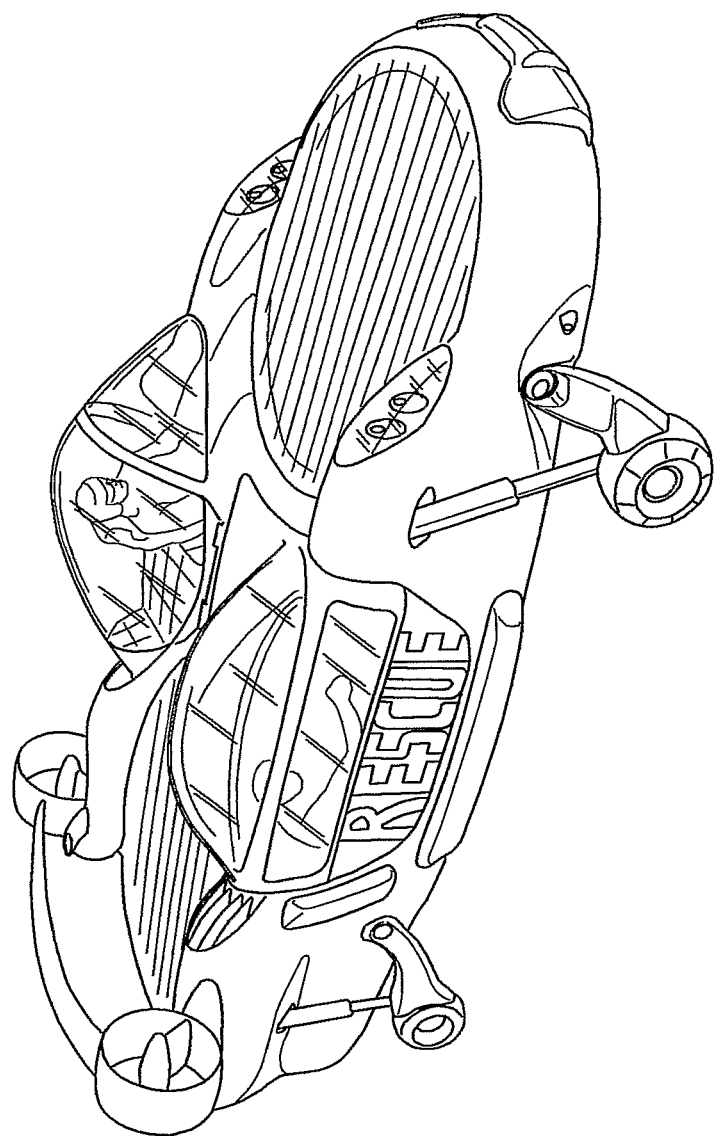

FIG. 14c shows the vehicle of FIG. 14b with the cover and side door closed for flight.

Figure 14D:
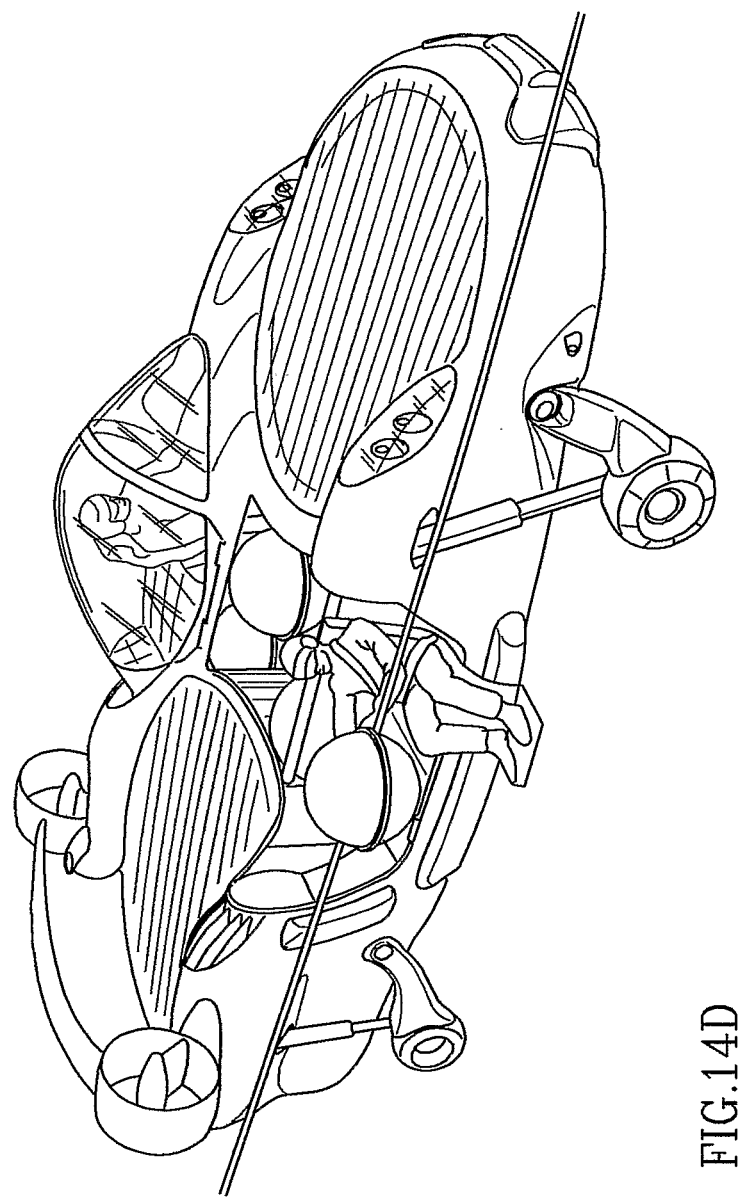

FIG. 14d illustrates how the basic vehicle of FIG. 14a may be used to perform various utility operations such as electric power-line maintenance. In the example shown if FIG. 14d, a seat is provided for an operator, facing outwards towards an electric power-line. For illustration purposes, the operator is shown attaching plastic spheres to the line using tools. Uninstalled sphere halves and additional equipment may be carried in the open space behind the operator. Similar applications may include other utility equipment, such as for bridge inspection and maintenance, antenna repair, window cleaning, and other applications. One very important mission that the utility version of FIG. 14d could perform is the extraction of survivors from hi-rise buildings, with the operator assisting the survivors to climb onto the platform while the vehicle hovers within reach.

Figure 14E:
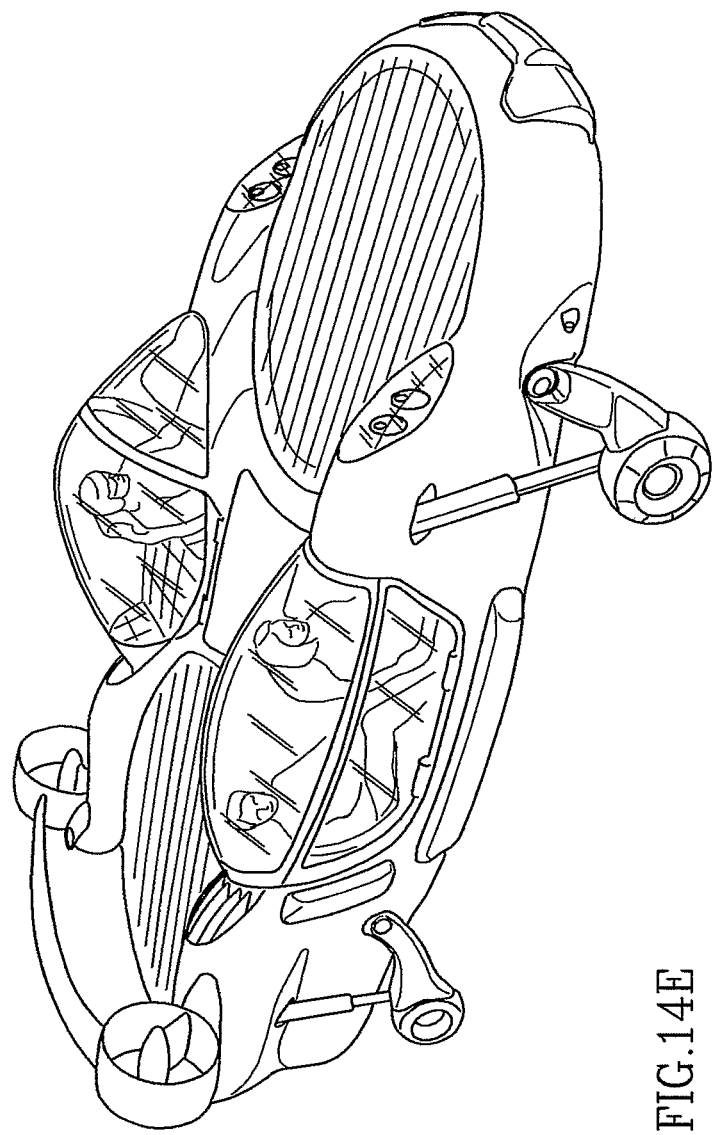

FIG. 14e illustrates how the basic vehicle of FIG. 14a may be used to carry personnel in a comfortable closed cabin, such as for commuting, observation, performing police duties, or any other purpose.

Figure 15:
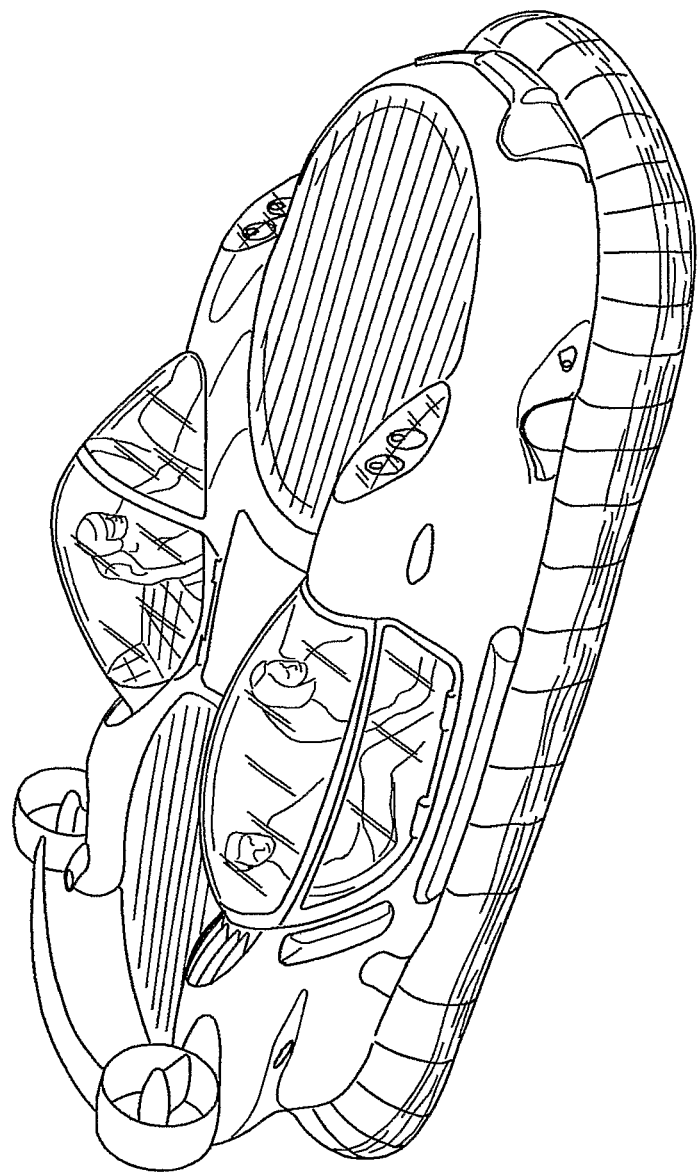
FIG. 15 is a pictorial illustration of a vehicle constructed typically in accordance with the configuration in FIGS. 14a-14e but equipped with a lower skirt for converting the vehicle to a hovercraft for movement over ground or water.

FIG. 15 is a pictorial illustration of a vehicle constructed typically in accordance with the configuration in FIG. 14 but equipped with a lower, flexible skirt for converting the vehicle to a hovercraft for movement over ground or water. While the vehicle shown in FIG. 15 is similar to the application of FIG. 14e, a skirt can be installed on any of the applications shown in FIG. 14.

While FIGS. 14-15 show a vehicle having a cockpit on the left hand side and a payload bay to the right hand side, it is appreciated that alternative arrangements are possible, such as where the cockpit is on the right hand side and the payload bay is on the left hand side. All the descriptions provided in FIGS. 14-15 apply also to such an alternative configuration.

Figure 16A:
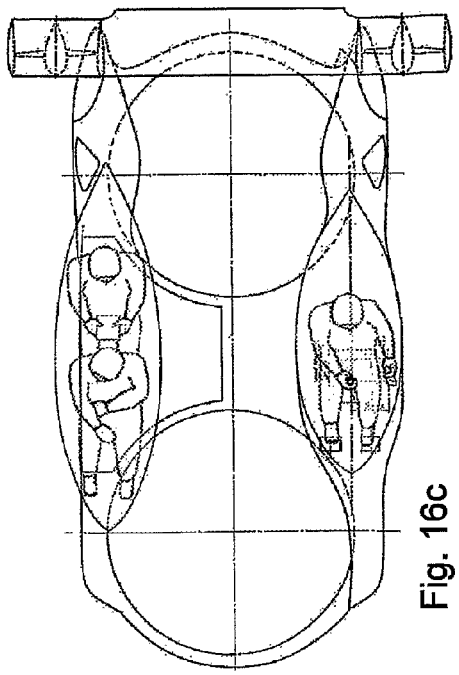
FIGS. 16a-16d show top views of the vehicle of FIGS. 14a-14e with several payload arrangements.
Figure 16B:
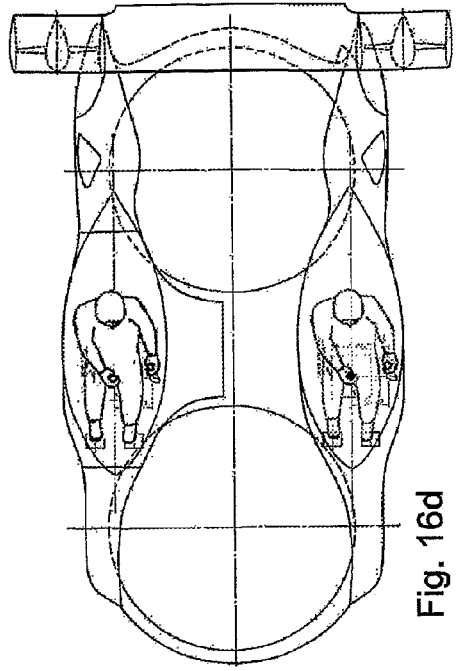
Figure 16C:
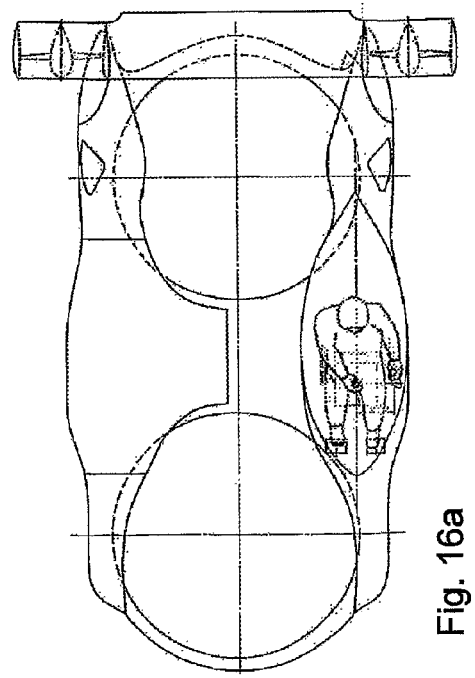
Figure 16D:
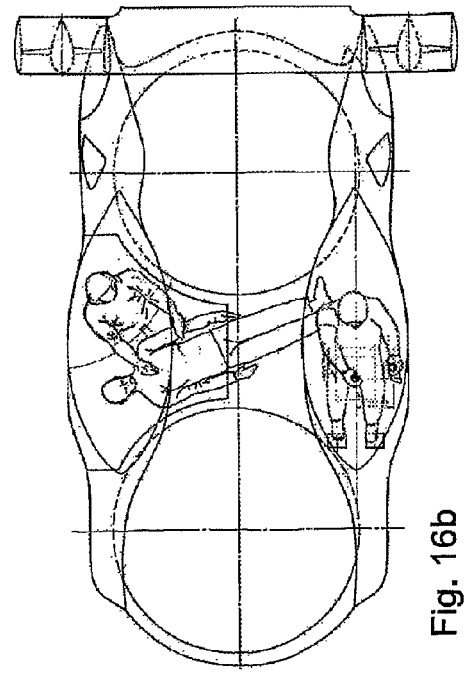

FIGS. 16a-d illustrate four top views of the vehicle of FIGS. 14a-14e with several payload arrangements:

FIG. 16a is the basic vehicle with an empty platform on the right hand side of the vehicle. FIG. 16b shows the arrangement of the right hand side compartment when configured as a rescue module. FIG. 16c shows the conversion of the RHS compartment for carrying up to two observers or passengers. FIG. 16d has two functional cockpits, needed mostly for pilot's instruction purposes. It should be emphasized that similar arrangements can be configured if so desired, with the pilot's compartment on the RHS of the vehicle, and the multi-mission payload bay on the left.

Figure 17:
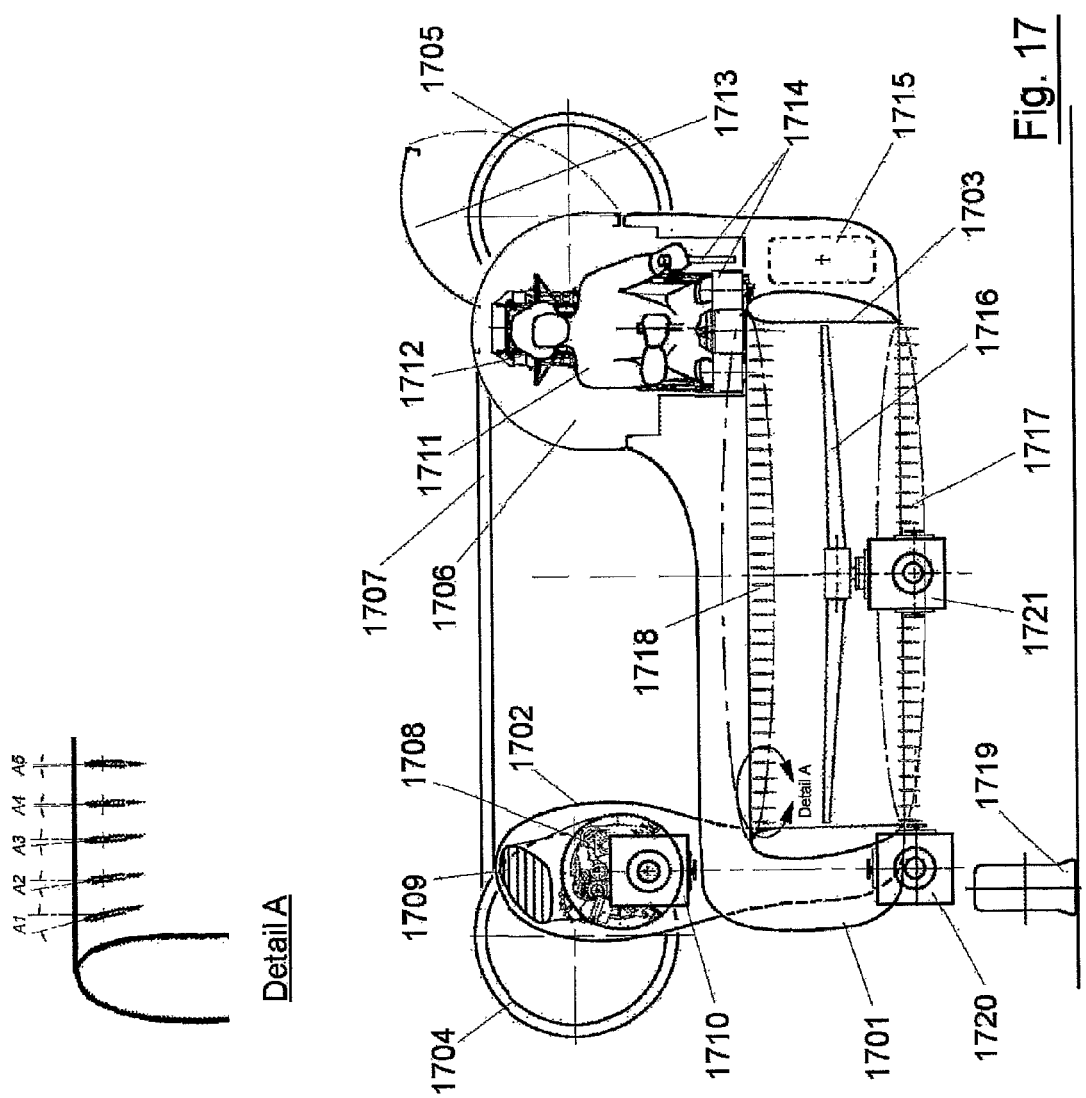
FIG. 17 is a see-through front view of the vehicle of FIG. 16a showing various additional features and internal arrangement details of the vehicle.

FIG. 17 is a see-through front view of the vehicle of FIG. 16a showing various additional features and internal arrangement details of the vehicle. The outer shell of the vehicle is shown in 1701. The forward ducted fan 1703 has a row of inlet vanes 1718 and a row of outlet vanes 1717 used together to maneuver the vehicle in roll and in horizontal side-to side translation. Detail A shows, as an example, the first five vanes being the closest to the RHS of the vehicle. These vanes are shown mounted at angles A5-A1 that are increasing progressively from nearly vertical mounting for vane 5 to some 15 degrees of tilt shown as the angle A1 in the figure. The progressive deflected mounting of the first rows of vanes align their chord line with the local streamlines of the incoming flow. This does not inhibit these vane's full motion to both directions of deflection around their basic mounting angles. It should also be emphasized, that a similar, anti-symmetric arrangement of the vanes is used on the opposite side of the duct shown (LHS of the vehicle). Similarly, the vanes attached at the inlet to the aft duct, are also tilted as required to orient themselves with the local inflow angle at each transverse position along the duct, where the angle is preferably averaged over the longitudinal span of each vane. This unique configuration of vanes can be varied in angles as a result of aerodynamic behavior of the incoming flow and due to engineering limitations. This configuration can be also used with any row of inlet vanes or outlet vanes installed on any single or multiple ducted fan vehicles.

The RHS engine of the vehicle 1708, is shown mounted inside its enclosure 1702, and below the air inlet 1709. It is connected to a 90 degree gearbox 1710, which is connected through a shaft (not shown) to a lower 90 degree gearbox 1720. From there, through a horizontal shaft, the power is transmitted to the main gearbox 1721 that also supports the lift producing rotor 1716. A similar arrangement for the LHS engine may be used (not shown). The pilot's compartment (cockpit) 1706 has a transparent top (canopy) of which the outer panel 1713 is hinged, to permit the pilot 1711 to enter and exit the cockpit. The pilot's seat 1712 may either be normal, or a rocket deployed ejection seat to facilitate quick egress of the pilot from the cockpit through the canopy, if the need arises. The pilot's controls 1714 are connected to the vehicles flight control system. The vehicle's RHS landing gear wheel 1719 is shown resting on the ground, and the LHS landing gear wheel 1715 is shown optionally retraced into the fuselage for reducing the drag in high speed flight. The vehicles two pusher fans 1704, 1705 are shown mounted on the aft portion, with the wing/stabilizer 1707 generally spanning above and between said fans.

Figure 18:
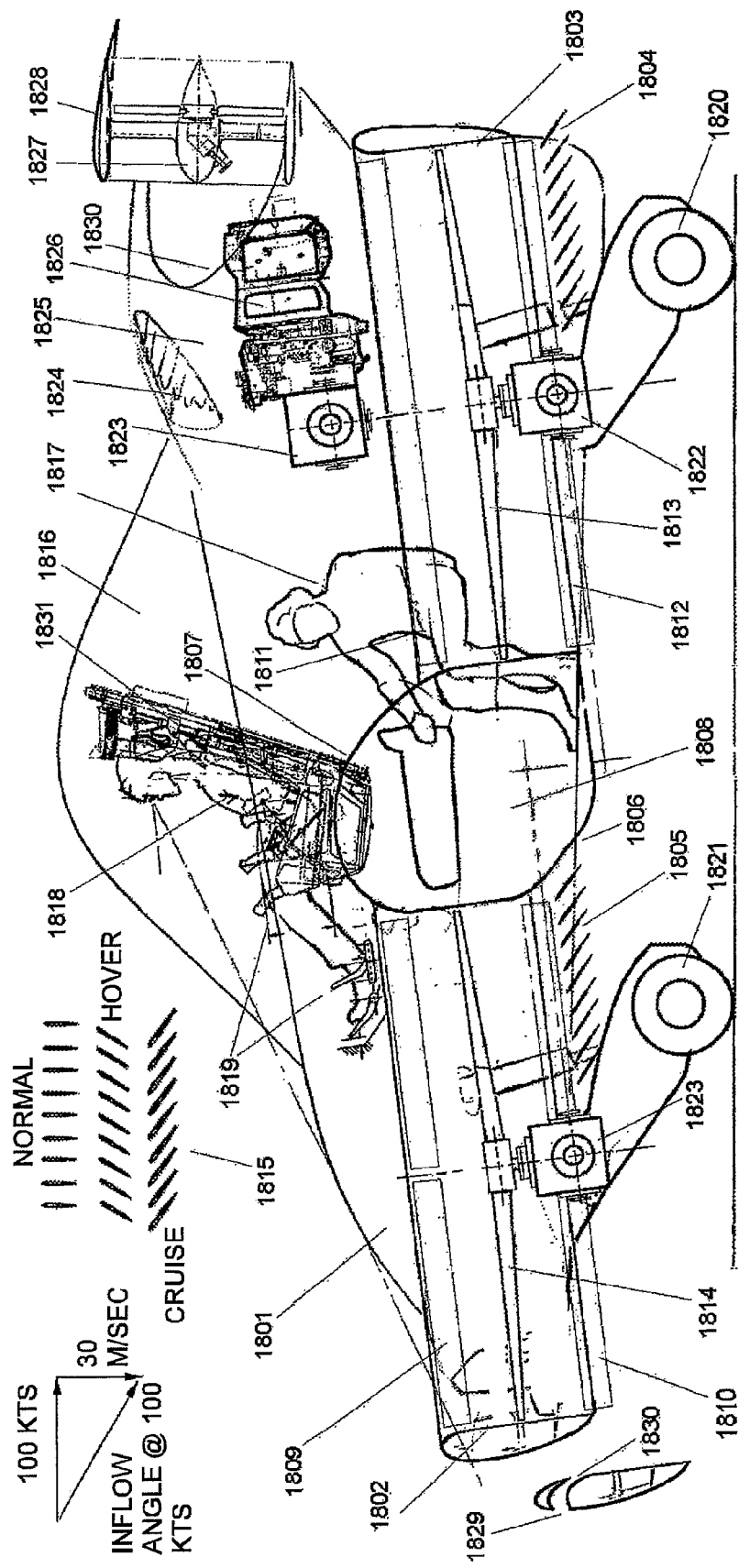
FIG. 18 is a longitudinal cross-section of the vehicle of FIG. 16b showing various additional features and internal arrangement details of the vehicle.

FIG. 18 is a longitudinal cross-section of the vehicle of FIG. 16b showing various additional features and internal arrangement details of the vehicle. The outer shell 1801 covers the whole of the vehicle, and transitions to the engine's enclosure 1825. Inside the shell, a forward duct 1802 and an aft duct 1803 are mounted, inside which a forward main lift propeller 1814 and an aft main lift propeller 1813 are respectively mounted. The ducts and propellers are preferably statically disposed within the vehicle such that they are inclined forward (generally between 5 and 10 degrees although other values may be used) with respect to the vertical and rotated along the transverse axis of the vehicle, to better accommodate the incoming airflow at high speed. The forward duct 1802 has rows of longitudinal vanes 1809 at its inlet, as well as rows of longitudinal vanes 1810 at the exit These vanes are predominantly used to control the vehicle in roll as well as lateral side-to-side translation. A similar set of longitudinally oriented vanes 1811 & 1812 are mounted at the entrance and exit of the aft duct 1803, respectively. Optionally, additional vanes, mounted in a transverse orientation may be mounted at the exit of the forward and aft duct, shown respectively as 1805 & 1804. These vanes are movable, and used to deflect the air exiting from the ducts, as shown schematically in 1815 for various flight regimes of the vehicle. FIG. 18 is generally a cross section through the center of the vehicle looking right, although it was decided to leave the pilot's compartment and LHS engine and pusher fan installation visible for reference. The lower area of the center fuselage section of the vehicle 1808 serves as the main fuel tank. The outer shape of this body to its fore-aft sides is molded to serve the geometrical needs of both ducts 1802 & 1803. The lower side of the center fuselage has a cutout 1806 to ease the flow exiting the forward duct 1802 to align itself with the overall air flow around the vehicle at high speed flight. The upper portion 1807 of the center fuselage 1808 is suitably curved for accelerating the air entering the aft duct 1803, and thereby creates a low pressure area on the top of the fuselage, relieving some of the lift production burden off the main lifting propellers 1813 & 1814. This upper portion 1807 of the center fuselage can also facilitate the mounting of a parachute/parafoil which will be used in emergency situations either to get to the ground safely or even to continue forward flight with the pusher fans thrust. The pilot 1818 is shown seated on his seat 1831 which may either be normal, or a rocket deployed ejection seat to facilitate quick egress of the pilot from the cockpit through the canopy, if the need arises. The pilot's controls 1819 are connected to the vehicle's flight control system. Also shown in FIG. 18 is one of the two the engines used in the vehicle shown as 1826 mounted inside its outer shell 1825 and below the air intake 1824. The 90 degree gearbox 1823 transmits the rotational power from the engine 1826 to the lower gearbox through a shaft. This lower gearbox (gearbox, shaft not shown) then connects to the main aft lifting propeller gearbox 1822, which also supports the propeller 1813. An interconnect shafting mechanism (not shown) further distributes the power to the forward gearbox 1823 that also supports the forward main lifting propeller. Also visible in FIG. 18 is one of the pusher fans 1827, and a cross section through the stabilizer 1828 mounted above and between the pusher fans. It can also be noticed that a curved line 1830 forms a break in the smooth lines of the engine enclosure 1825, and the forward boundary for a deep cutout into enclosure 1825. The cutout is used to direct outside air to the pusher fans. The general shape of the curved line 1830 can also be seen in any one of the top views of FIG. 16. The forward end of the forward duct 1802 may have an optional forward facing circumferential slot 1829 that runs generally across the forward ¼ circle of the duct 1802. The slot faces the incoming flow, in a region of the flow that is high (near stagnation) pressure. The air coming into the slot is accelerated due to the geometric internal shape that is generally contracting, and is channeled through a second, inner slot 1830, at an air velocity that is greater than the flow inside the duct, and generally tangentially with the inside wall of the duct 1802. The resulting low pressure area created by this fast airflow from the slot and into the duct, affects the air above it flowing over the outer (upper) lip of the duct and provides suction to attach the latter flow to the dues inner surface, and avoid flow separation at high speed. A second role played by the slots 1829 & 1830 is to direct some of the air flowing through duct 1802 through an additional opening, thereby reducing the amount of air flowing in above the duct's lip, and so also reducing the overall pitching moment (having an adverse effect on the vehicle) created by the forward duct at high speed flight. It should be noted that the slot 1829 may also have an optional door or doors to facilitate opening of the bypass airflow only as flight speed is increased. Such door/doors, if used, my be activated externally through an actor or mechanism, or alternatively rely on the pressure distribution and difference between the inside and outside of the duct, to self-activate a spring loaded door or doors, as required. The landing gear wheels 1821 & 1820 are shown in the landing gear's extended position. An option (not shown) exists for retracting all four landing gears into the fuselage shell 1801 to reduce drag in high speed flight.

Figure 19:
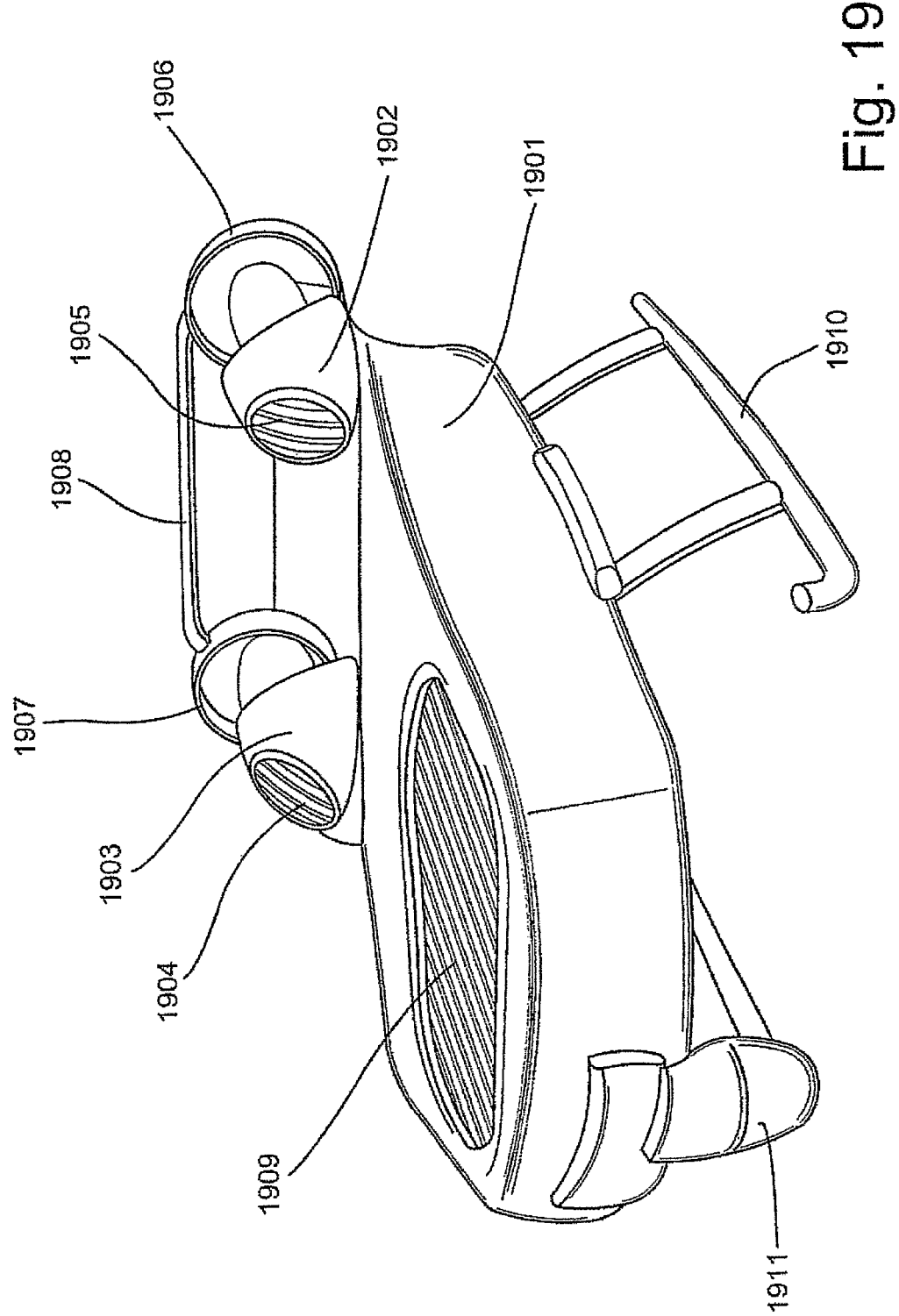
FIG. 19 is a pictorial illustration of an Unmanned application of the vehicle having similar design to the vehicle of FIGS. 16-18, but lacking a pilot's compartment.

FIG. 19 is a pictorial illustration of an unmanned application of the vehicle. Evident in the picture is the vehicles outer shell 1901 that is lacking any pilot's enclosure. Also visible is the forward duct 1909 with the rows of longitudinally mounted inlet vanes. The RHS engine enclosure 1903 is shown with an intake 1904 generally installed close to the top and to the front of the engine enclosure 1903. A similar arrangement can be seen for the LHS engine enclosure 1902 and the LHS engine intake port 1905. Two pusher fans 1906 & 1907 are shown, with a stabilizer 1908 spanning between them. The vehicle's fixed skid type landing gear is shown in 1910, and a typical pictorial installation of an observation system in 1911.

Figure 20:
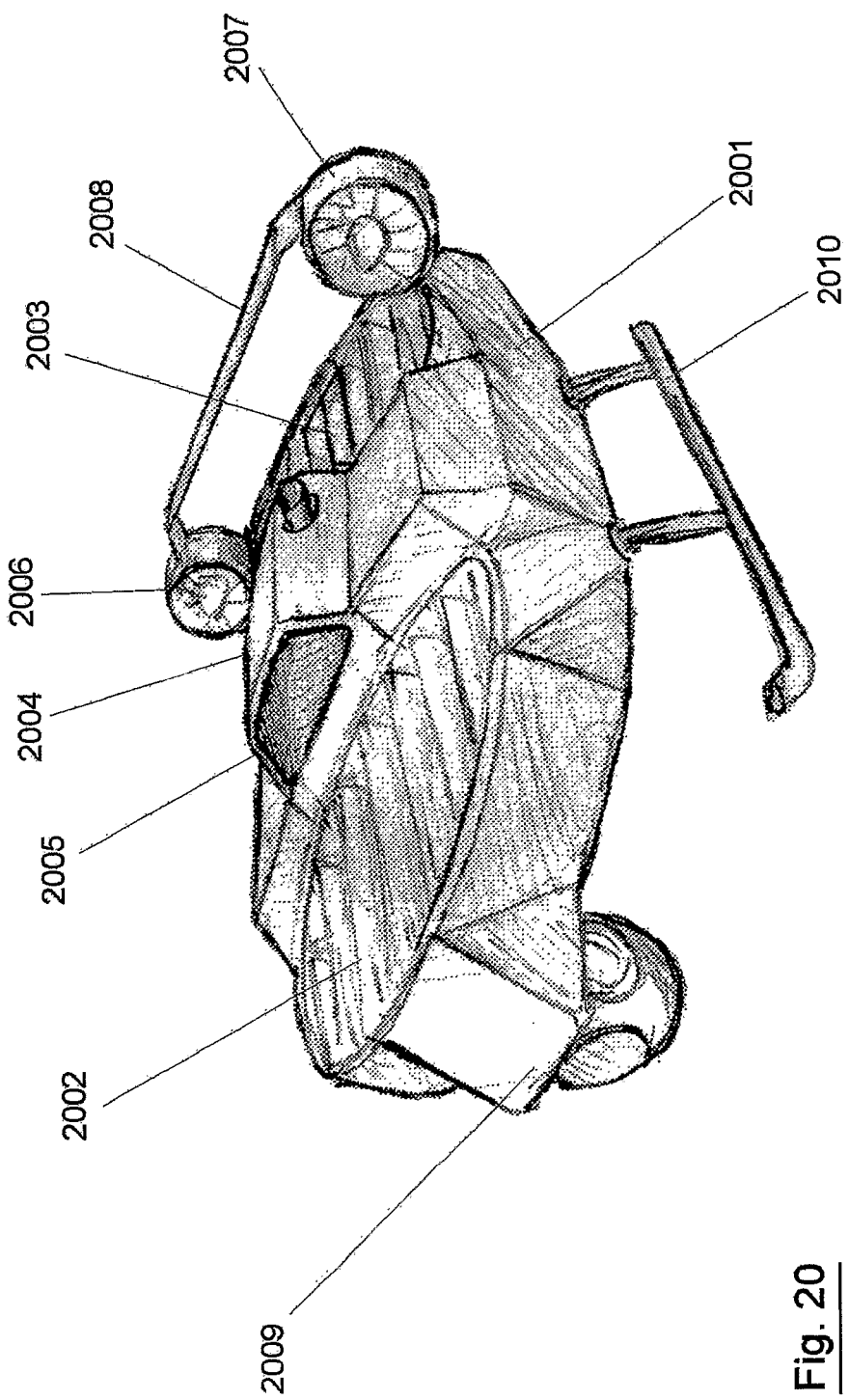
FIG. 20 is a further pictorial illustration of an optional Unmanned vehicle, having a slightly different engine installation than that of FIG. 19.

FIG. 20 is a further pictorial illustration of an optional unmanned vehicle, having a slightly different engine installation than that of FIG. 19. Here, in a manner similar to that of FIG. 19, the fuselage outer shell 2001 is also lacking a pilot's compartment. However, the vehicle's engine is mounted inside the fuselage in the area schematically shown as 2006. An air intake 2005 supplies air to the engine. Two pusher fans 2006 & 2007 are used, as well as a stabilizer 2008. The forward duct 2002 and aft duct 2003 have longitudinally mounted vanes. A typical pictorial installation of an observation system is shown in 2009. The vehicle's fixed skid type landing gear is shown in 2010.

Figure 21:
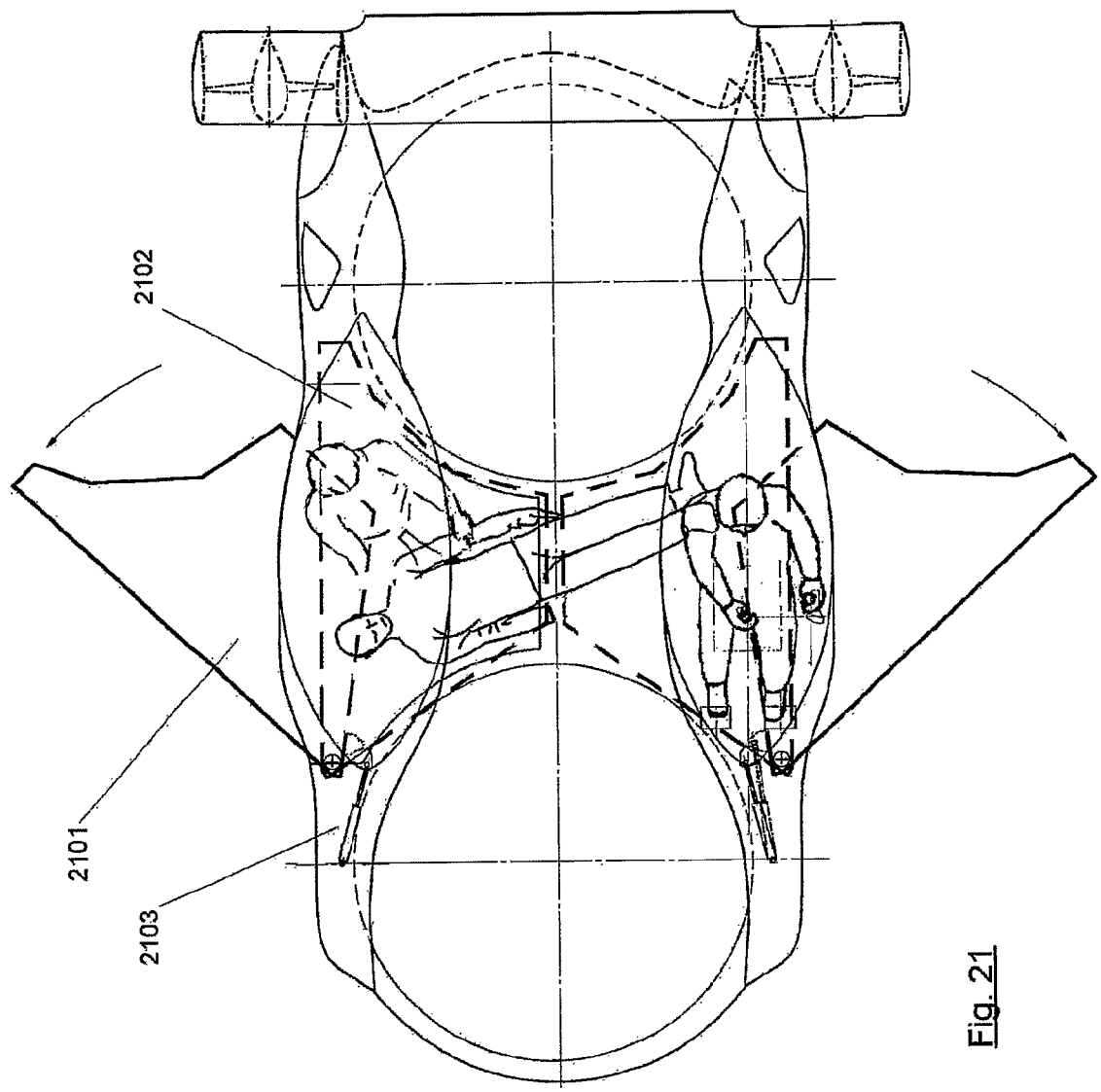
FIG. 21 is a top view showing the vehicle of FIG. 16b as equipped with a extendable wing for high speed flight.

FIG. 21 is a top view showing the vehicle of FIG. 16*b* equipped with an extendable wing for high speed flight. The RHS wing is designated 2101 in the extended position and 2102 when folded under the fuselage. An actuator 2103 is used for extending and retracting the wing as desired. The LHS wing is similar, as evident in the drawing.

Figure 22:
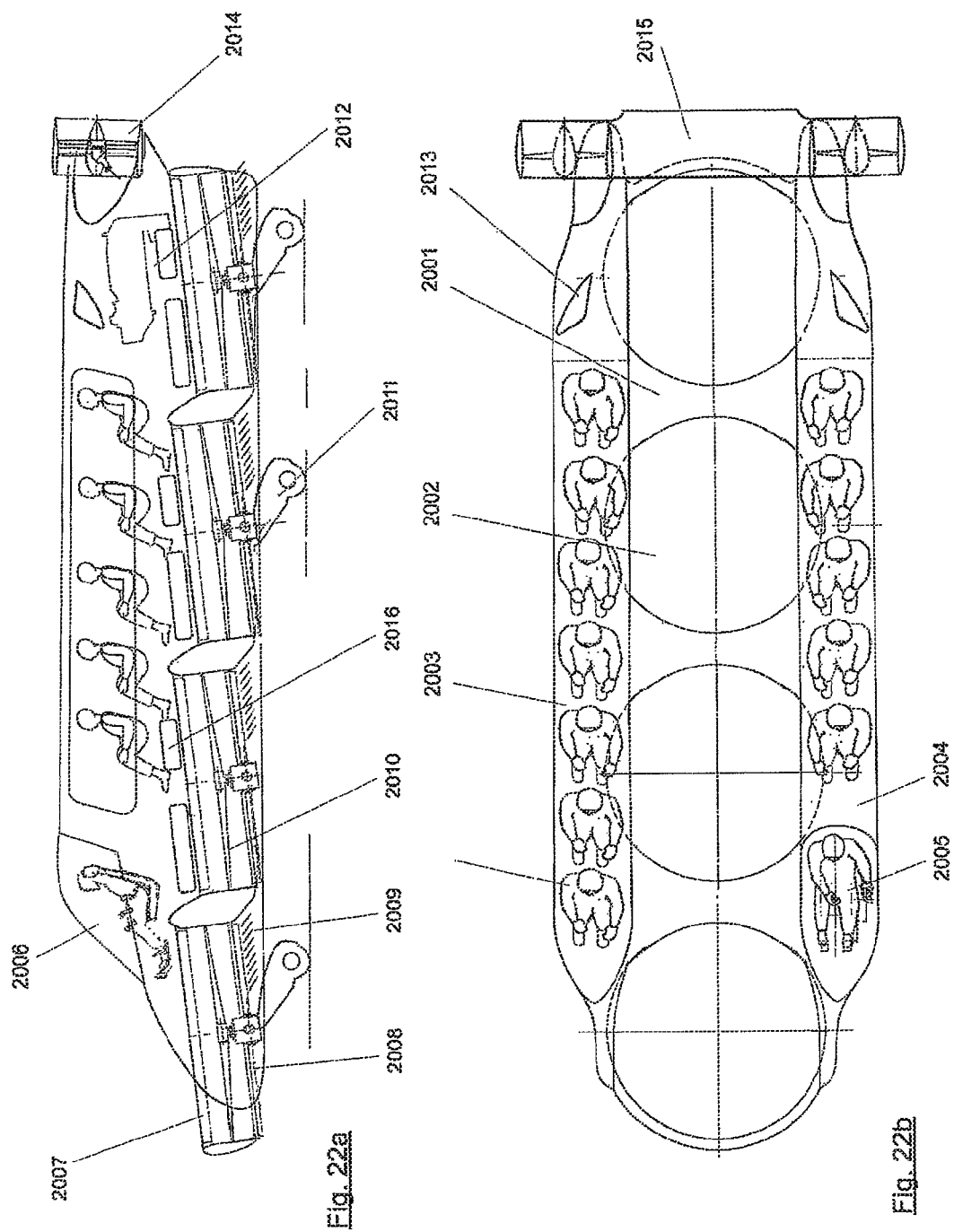
FIGS. 22a and 22b are side and top views, respectively, illustrating a VTOL vehicle having a plurality of lifting fans to facilitate increased payload capability.

FIG. 22*a*-22*b* are side and top views, respectively, illustrating a VTOL vehicle that employs a plurality of lift generating fans, arranged one behind the other, all connected to a common chassis, for the purpose of carrying an increased payload over that which is possible with two lifting ducted fins. A chassis designated 2001 houses a number of ducted fans 2002 for generating lift. The fans may be tilted slightly forward as shown in FIG. 22*a* to achieve higher speed in cruise. Two elongated cabins 2003 and 2004 are preferably located on both sides of the ducted fins to accommodate passengers or other cargo. A pilot 2005 may be seated in a cockpit 2006 at the front end of one of the cabins, such as the left cabin 2004. Two engines 2012 are located to the aft of the cabins and have air intakes 2013. Two variable pitch pusher fans 2014, enclosed in shrouds, are mounted to the rear of the cabins. A stabilizer 2015 is mounted between the pusher fans to facilitate nose-down trimming moments in forward flight. Multiple inlet roll, yaw and side force control vanes 2007 are preferably mounted longitudinally in all ducts, supplemented by similar vanes 2008 at the ducts exits. Transversally mounted guide vanes 2009 may also be mounted to reduce friction losses and flow separations of the flow exiting from the ducts. Side openings 2016 may be optionally installed to enable outside air to be mixed with inflow from above, reducing the impact that the cabins may have on thrust augmentation of the ducted fans as well as the control effectiveness of the vanes installed in the inlets to these ducted fins. A variable pitch fan (rotor) 2010 is mounted in each duct. Preferably, one half of the fans (or as close to half as possible, such as in the case of a vehicle similar to that shown in FIG. 22 but having an odd number of lifting ducted fans) turn in the opposite direction as the other half. A plurality of landing gears 2001 support the vehicle on the ground and serve to attenuate the landing impact. Some of the wheels employed in the landing gear may be powered, or alternatively, forward ground movement can be accomplished through the use of the variable pitch pusher fans.

Figure 23:
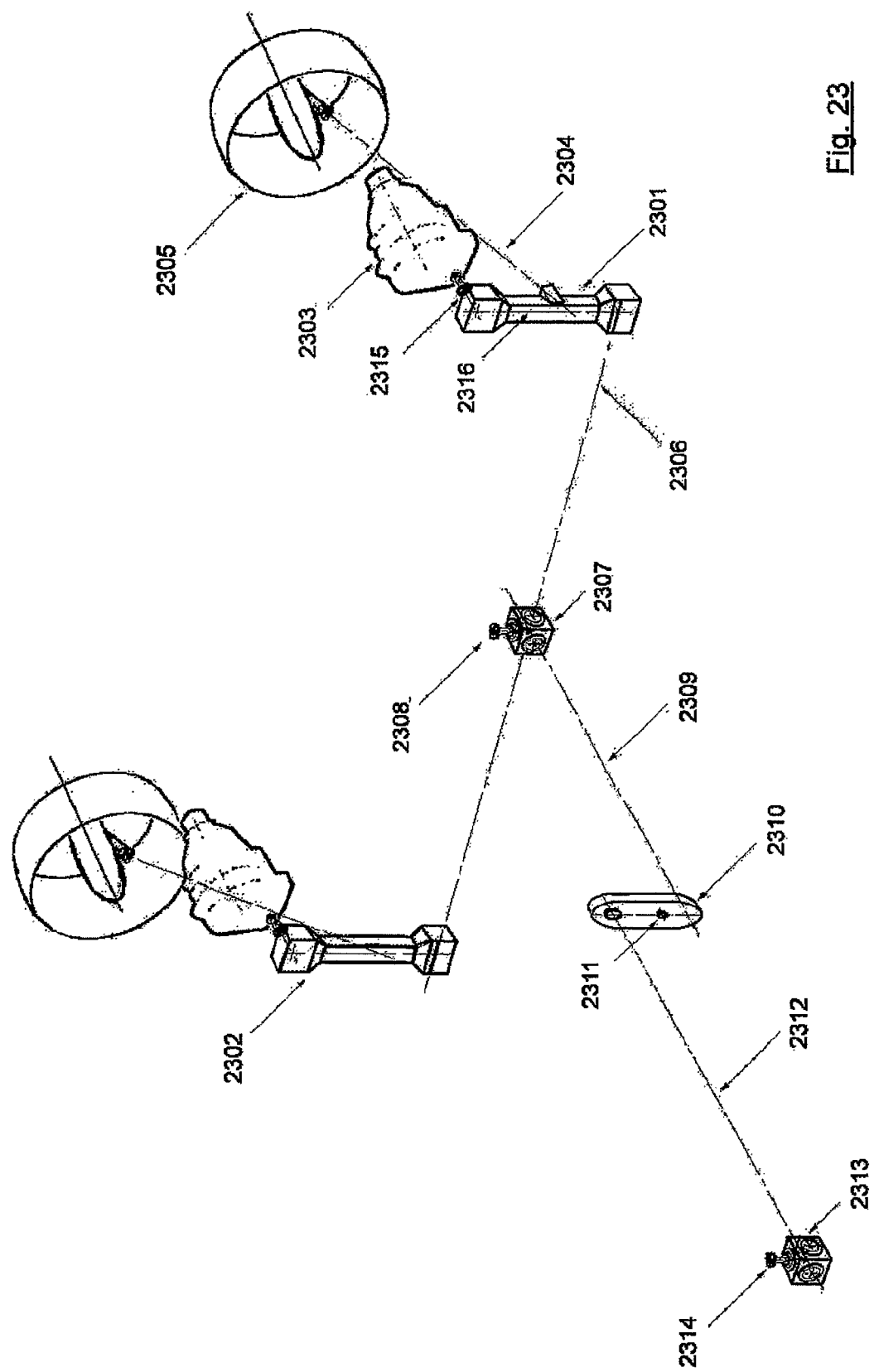
FIG. 23 is a schematic view of the power transmission system used in the vehicles of FIGS. 14-19.

FIG. 23 shows an optional arrangement of a power distribution system for transmitting the power from each of the rear mounted engines to the two lifting fans and two pusher fans such as found in the vehicles shown in FIGS. 14-19. As can be seen, two engines 2303 are preferably used to drive the two main lift rotors and the two pusher fans through a series of shafts and gearboxes. The power takeoff (PTO) of each engine is connected through a short shaft 2315 to the RHS and LHS Aft Transmissions designated 2302 and 2301 respectively. From these transmissions, the power is distributed both to the aft pusher props through diagonally oriented shafts 2304 as well as to the Aft Rotor Gearbox 2307 through two horizontally mounted shafts 2306. The two main lift rotors are connected to their respective gearboxes through prop flanges 2308. The shaft interconnecting both main lift rotors is divided into two segments designated as 2309 and 2312, connected by a Center Gearbox 2310 through flexible joints. This center gearbox serves mainly to move the rotation center in parallel and connect both shafts 2309 and 2312 without affecting the direction of rotation (i.e. employing an uneven number of plane gears mounted along its length). At least one of the intermediate gears in Center Gearbox 2310 has a shaft that is open to the outside designated as 2311, enabling power for accessories on either side of the face of Gearbox 2310, resulting in opposing directions of rotation (rotors not shown). The rotors preferably turn in opposite directions to eliminate torque imbalance on the vehicle.

Figure 24:
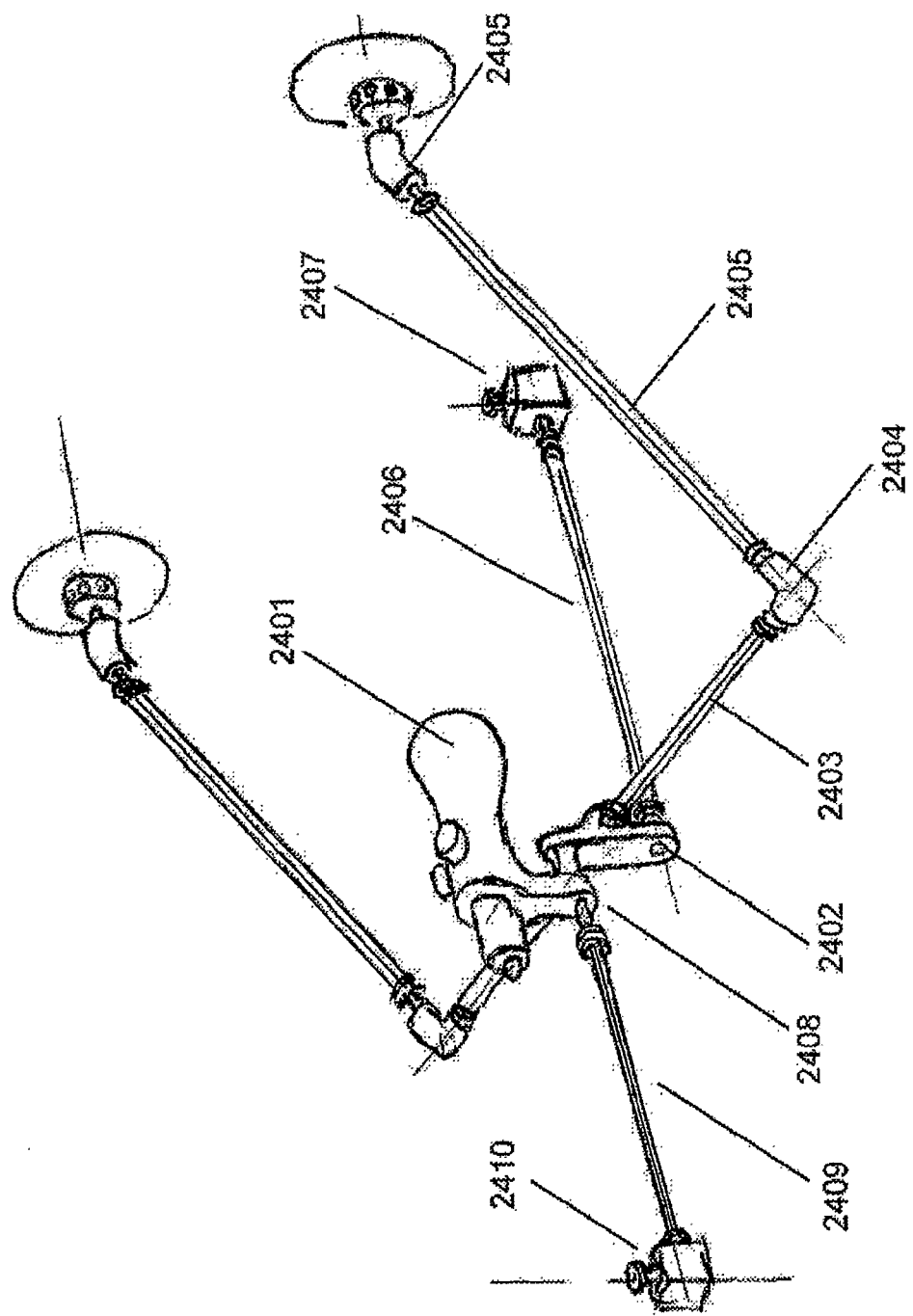
FIG. 24 is a schematic view of the power transmission system used in the vehicle of FIG. 20.

FIG. 24 shows an optional arrangement of a power distribution system for transmitting the power from a centrally mounted engine, or from two engines forming a 'twin-pack', to the two lifting fans and two pusher fans such as found in the vehicles typical of FIG. 9 and FIG. 20. As can be seen, the engine, designated as 2401 is used to drive the two main lift rotors and the two pusher fans through a series of shafts and gearboxes. The power takeoff (PTO) of the engine designated as 2408 is connected through a short shaft to a central Transmission designated 2402. An extension of the same shaft designated as 2409 transmits power directly to the forward lift tan gearbox designated as 2410. From the central transmission 2402, the power is distributed both to the aft lift fan gearbox through a shaft designated as 2406 as well as to two angled gearboxed such as 2404 through two horizontally mounted shafts 2403. From the angled gearboxes, two diagonal shafts 2405 transmit power to the aft pusher prop gearboxes 2405. The central transmission 2402 may also have an additional shaft that is open to the enabling power for accessories (rotors not shown). The rotors preferably turn in opposite directions to eliminate torque imbalance on the vehicle.

Figure 25A:
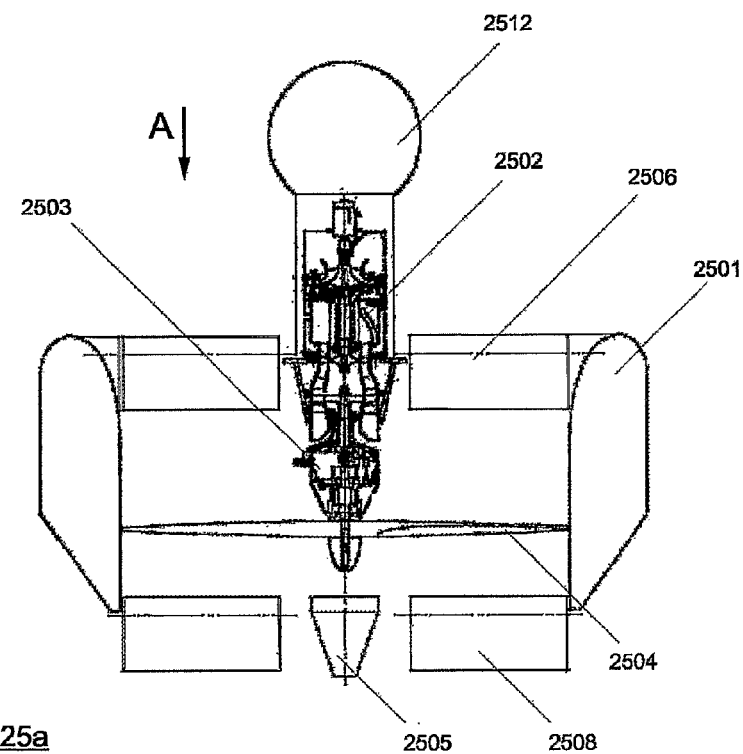
FIGS. 25a-25c show schematic cross sections and design details of an optional single duct Unmanned vehicle.

FIG. 25a shows a schematic cross section and design details of an optional single duct unmanned vehicle. The vehicle includes a powerplant designated as 2502, which may be based on turboshaft technology as shown schematically in FIG. 25a, although other means of propulsion are possible. A circumferential duct designated as 2501 surrounds the rotor (lifting fan) designated as 2504. The duct 2501 may also serve to house the flight control and communication equipment as well as the fuel for the duration of the mission. A fuel sump with pump is designated as 2505. A gearbox designated as 2503 is used to reduce the rotational speed of the engine's shaft to match that required by the fan 2504. Two layers of vanes (2506 and 2508) are used to control the vehicle in roll, pitch, yaw and lateral and longitudinal translations. The vanes layers are preferably oriented in multiple planes as will be explained with reference to FIG. 25c. A payload typically consisting of a video camera may be housed in the clear spherical compartment designated by 2512.

Figure 25B:
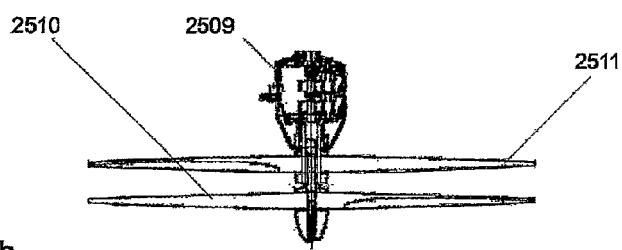

FIG. 25b shows an alternative lifting fan arrangement where two rotors 2510 and 2511 rotate in opposite direction to cancel the torque effect that one fan, such as 2504, would have on the vehicle. A slightly larger gearbox designated as 2509 is used to rotate the two rotors in opposite directions through concentric shafts.

Figure 25C:
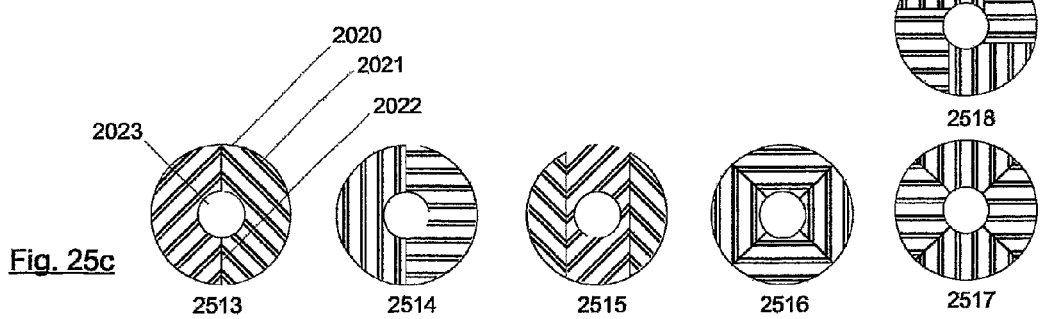

FIG. 25c shows different arrangements of vanes in the inlet to the duct, generally designated as view "A" in FIG. 25a, but also typical for the bottom (exit) layer of vanes 2508. While the arrangements of FIG. 25c show a number of possibilities, many additional arrangements are possible. The common principle in the in-plane vanes arrangements of FIG. 25b designated 2513 thru 2519 is that typically one half of the vanes are oriented at an angle (typically 90 degrees but other angles are possible) to the other half, so as to produce any combination of force components that will result in a single equivalent force in any direction and magnitude in the plane of the vanes, be it the inlet vanes designated as 2506 in FIG. 25a or the exit vanes designated as 2508 in FIG. 25a. Various vane configurations are possible, such as the square pattern in FIG. 2516, the cross pattern in FIG. 2517, and the weave pattern in FIG. 2518.

Figure 26:
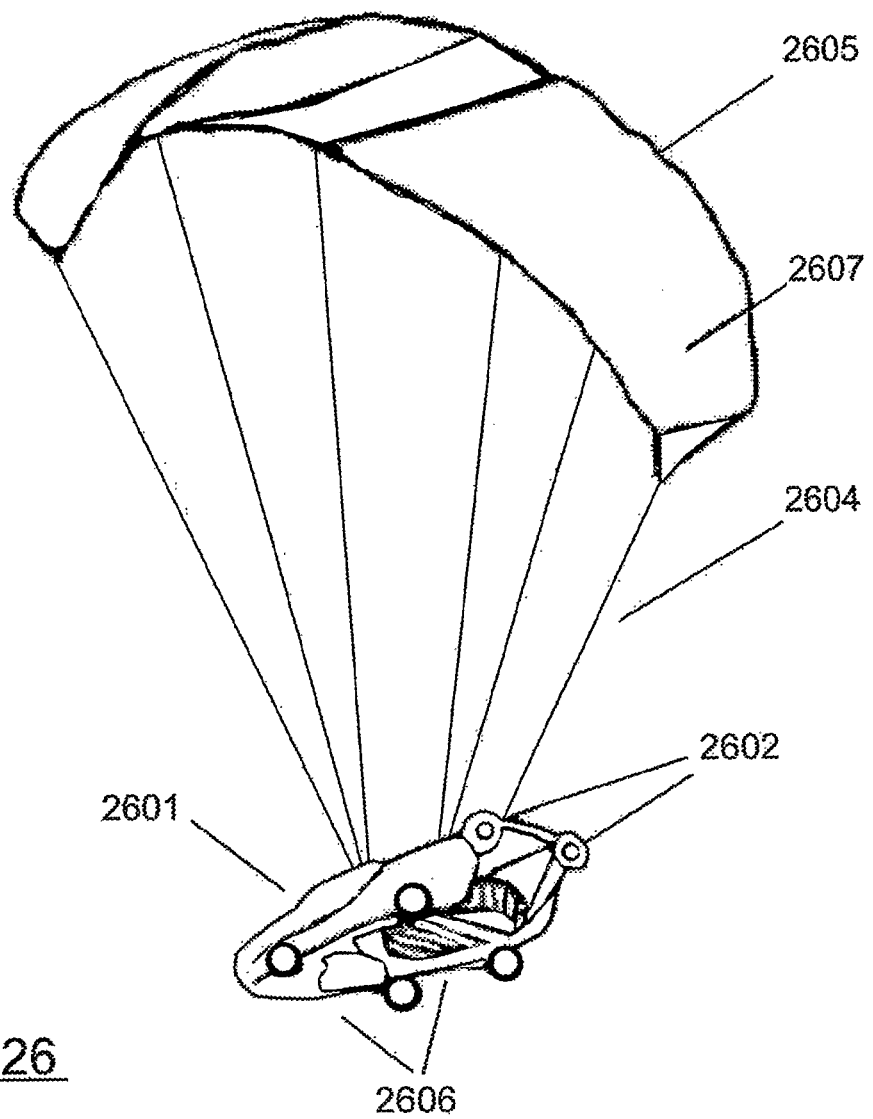
FIG. 26 is a pictorial illustration of a ram-air-'parawing' based emergency rescue system.

FIG. 26 is a pictorial illustration of a ram-air-'parawing' based emergency rescue system. In an emergency, or for other purposes such as extended range, the ducted fan vehicle (manned or unmanned) designated as 2601 need not rely on its lifting fans (2606) to generate lift, but may instead release a lift generating ram-air 'parawing' shown pictorially and designated as 2605. Optionally, the 'parawing' may be steered through the use of steering cables shown schematically and designated as 2607. In the event that the vehicle's pusher fans designated as 2602 are operative, the vehicle can carry on in level flight to its destination. Upon reaching its destination, the vehicle can release the 'parawing' (2605) and continue flying using its lift fans (2606), or may elect to land using the 'parawing' (2605) still attached to the vehicle. Alternatively, if the pusher fans (2602) are not producing sufficient thrust, the 'parawing' (2605) will glide the vehicle down to land, preferably extending its glide ratio significantly over a spherical 'standard' parachute.

Figure 27:
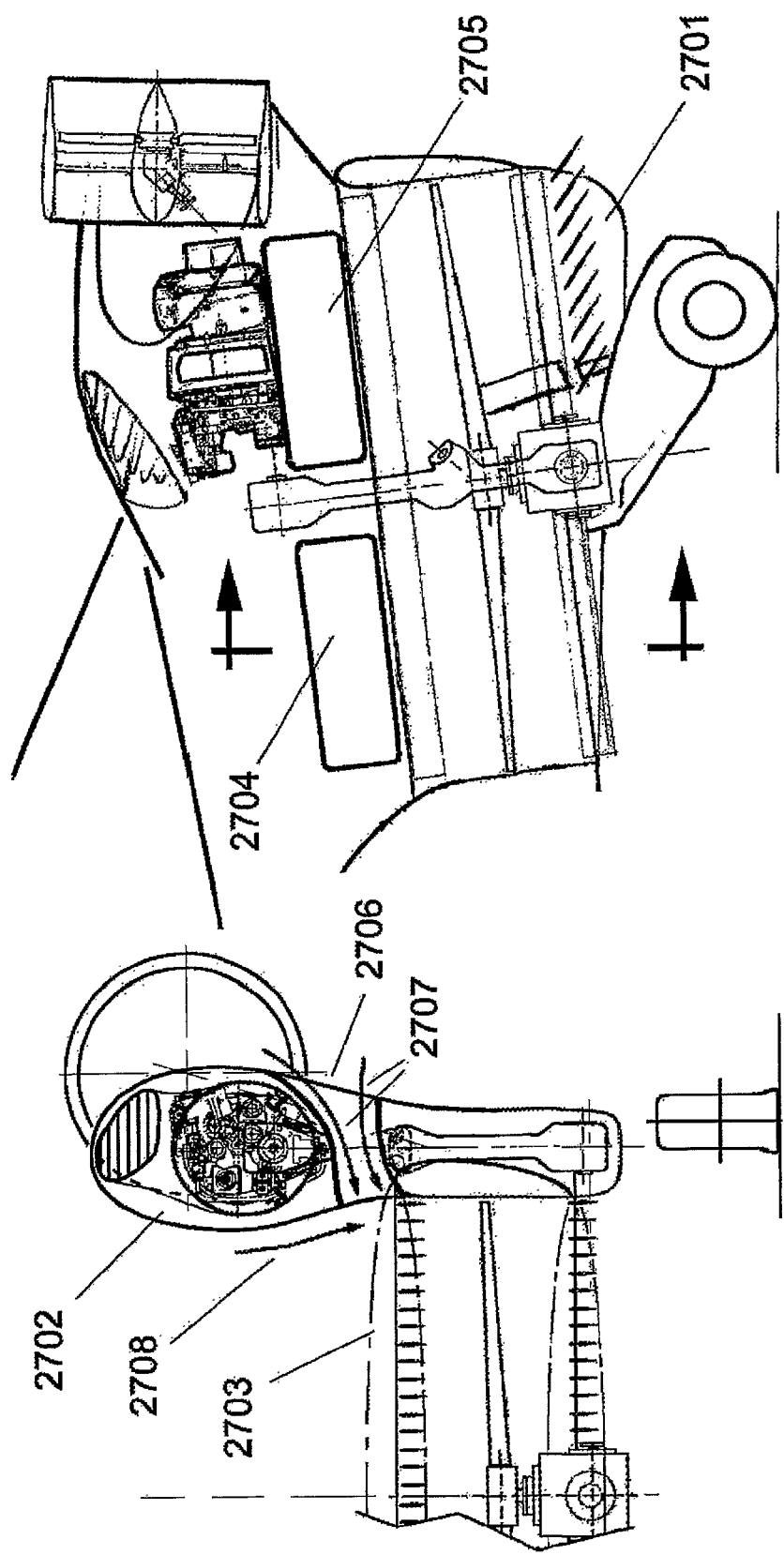
FIG. 27 illustrates optional means of supplying additional air to lift ducts shielded by nacelles from their sides.

FIG. 27 illustrates optional means of supplying additional air to lift ducts shielded by nacelles or aerodynamic surfaces from their sides, typical of the aft lift fans of the vehicles described in FIGS. 1, 5, 6, 8, 9 and 11-22. In FIG. 27, a lift generating ducted fan designated as 2703 is preferably partially shielded from the air around it by a nacelle 2702. Openings for the air, designated as 2704 and 2705, permit outside air to flow (2707) in through a channel (2706) from the sides and combine with the inflow from above (2708) to create relatively undisturbed flow conditions for the ducted fan (2703). With the openings 2704 and 2705 in place, the impact of the nacelle on thrust augmentation of the ducted fan as well as the control effectiveness of the vanes is minimized. Preferably, the exit portions of openings 2704 and 2705 meet and is substantially aligned with an upper lip of the duct of ducted fan 2703.

Figure 28A:
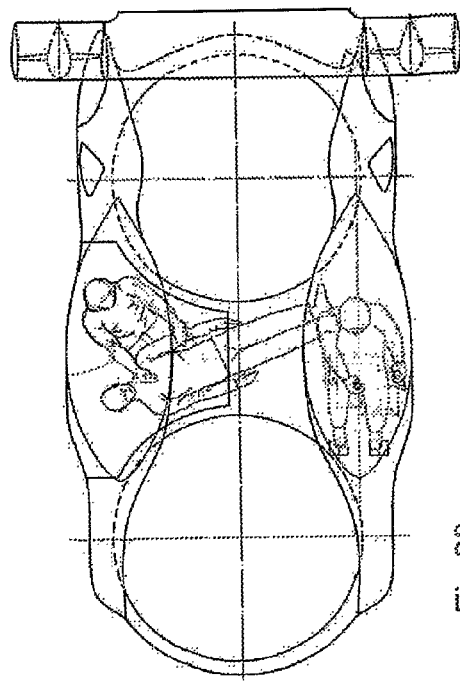
FIGS. 28a-28e are more detailed schematic top views of the medical attendant station in the rescue cabin of the vehicle described in 14b, 14c and 16b.
Figure 28D:
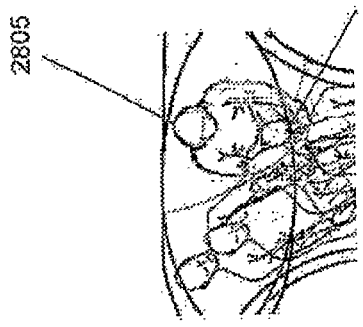
Figure 28C:
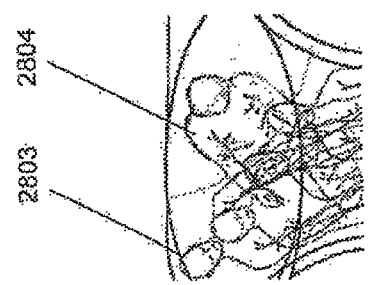
Figure 28E:
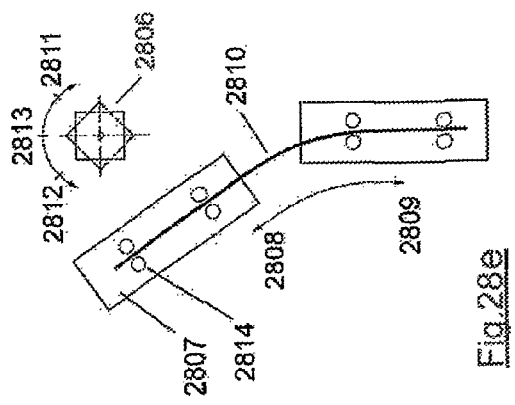
Figure 28B:
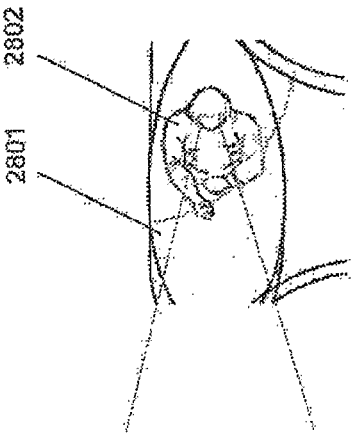

FIGS. 28a-28e are more detailed schematic top views of the medical attendant station in the rescue cabin of the vehicle described in 14b, 14c and 16b. FIG. 28a shows schematically how the cabin is laid out with respect to the vehicle. FIG. 28.b illustrates the medical attendant designated as 2802 seated facing forward, resting his/her arms on table 2801. FIG. 28c shows the medical attendant in seat's intermediate position, enabling medical attendant to reach comfortable the chest and abdomen area of patient designated as 2803, lying on a litter/stretcher that is free to move along a rail on table 2801, and can be locked in place in any intermediate position. FIG. 28.d shows the medical attendant in extreme rotated position (2805), and patient litter moved to extreme 'inside cabin' position, to enable medical attendant to reach patient head from behind, necessary for performing procedure of clearing patients airways. FIG. 28e is a schematic depiction of a swiveling seat 2806 that can be used by medical attendant 2802. Also shown schematically in FIG. 28e is patient's litter 2807 that is able to move along guiding rail 2810 guided by four wheels or rollers 2814, although a different number of wheels or rollers can be used. When the attendant is facing forward, as 2802 in FIG. 28b, and for example when there is no patient on board, the seat 2806 in FIG. 28e swivels to its rightmost position as schematically shown in 2811. When the liter is loaded it is normally placed as shown pictorially in FIG. 28a, and schematically as 2808 in FIG. 28e. In this position, the attendant 2802 swivels on seat 2806 to intermediate position 2813 and has access to patients chest and abdomen. This seat position corresponds to attendant's position shown pictorially in FIG. 28c as 2804. When need arises for attendant to reach the head of patient 2803 from behind, the litter 2807 is moved along track 2810, while attendant now shown in FIG. 28c as 2805 swivels seat 2806 to leftmost position, shown schematically in FIG. 28e as 2812.

Figure 29:
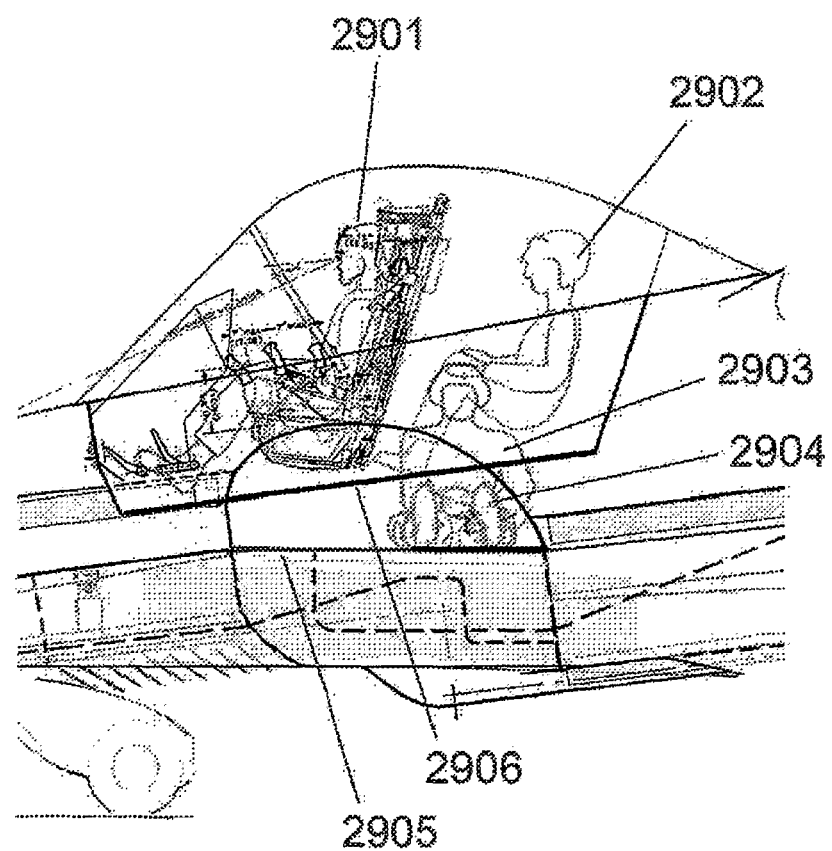
FIG. 29 illustrates in side view some optional additions to the cockpit area of the vehicles described in FIGS. 14-18.

FIG. 29 illustrates in side view various optional additions to the cockpit area of the vehicles described in FIGS. 14-18. The pilot designated as 2901 is shown together with optional room for a crew member or passenger 2902 behind the pilot. Also shown are the medical attendant 2903, and the patient lying in an extreme 'inside cabin' position 2904 on the cabin table 2905. The cockpit floor designated as 2906 may be sealed to separate the pilot's compartment from the cabin.

FIGS. 30a-d show a vehicle that is generally similar to that shown in FIG. 18, but which shows alternative internal arrangements for various elements including cabin arrangement geometry to enable carnage of 5 passengers or combatants. FIG. 30a is a top view schematically showing the position of each occupant FIG. 30b is a longitudinal cross section showing placement of equipment and passengers inside the vehicle, and FIGS. 30c and 30d are local lateral sections of the vehicle. A typical passenger or combatant 3002 is shown in FIG. 30c. The top of the cabin 3001 is raised above that of FIG. 18 to accommodate passengers or combatants in center section of vehicle. A single main transmission unit (3004) is shown that is an alternative power transmission scheme to that of FIG. 18. Power is transmitted from engine 3003 to main transmission unit 3004. One angled shaft 3005 transmits power to the aft pusher fan 3009, and a second, generally horizontal shaft 3006 transmits power to the aft lift rotor gearbox 3010. The shaft 3006 is housed inside airfoil shaped housing 3008 that also supports mechanically the aft lift rotor gearbox 3010. A center fuselage secondary transmission 3007 is connected to each of the main lift rotor gearboxes 3010, 3011, and also houses attachment for auxiliary equipment.

Figure 31:
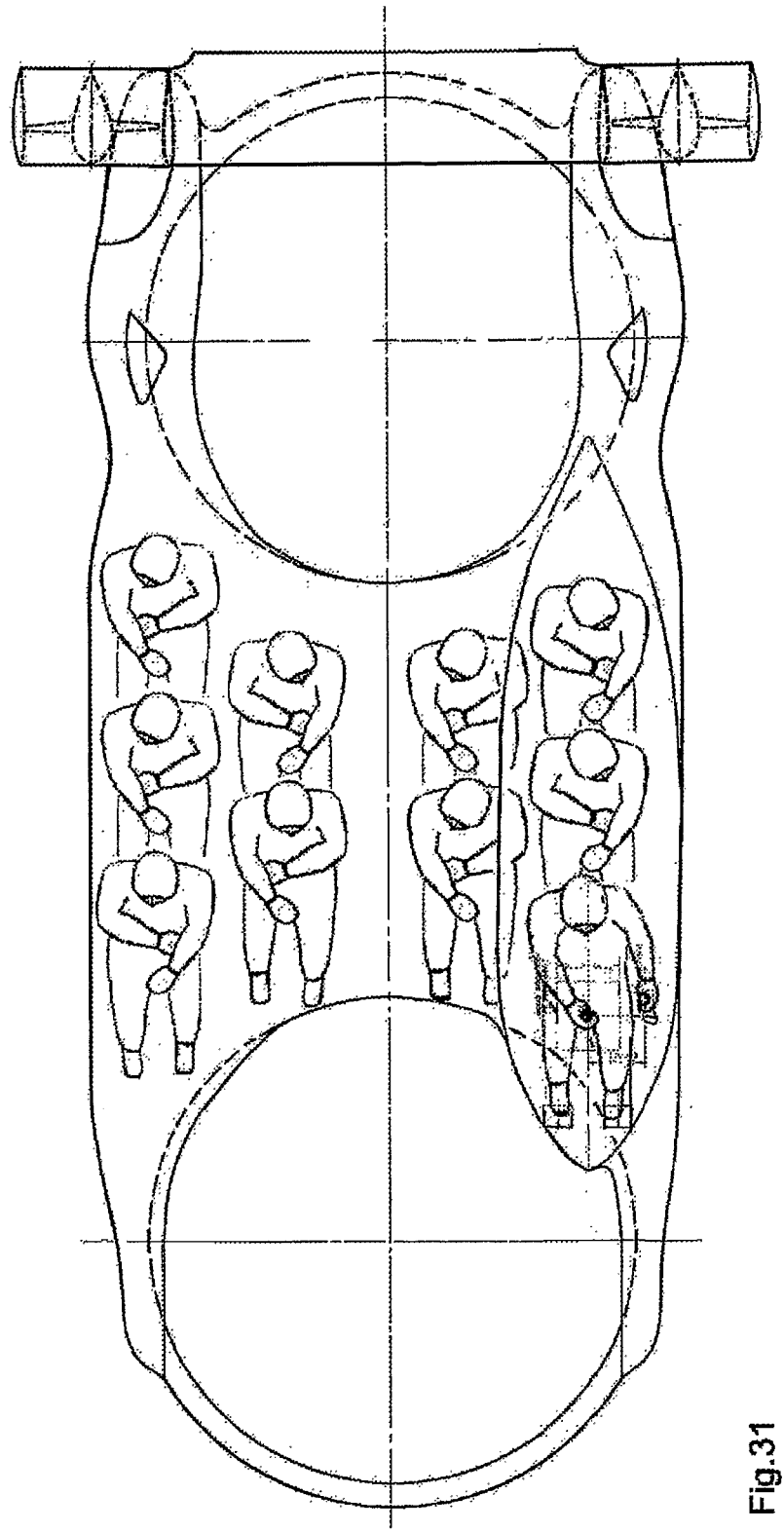
FIG. 31 shows a top view of vehicle generally similar to that shown in FIG. 30a-d, however the fuselage is elongated to provide for 9 passengers or combatants.

FIG. 31 shows a top view of vehicle generally similar to that shown in FIG. 30a-d, but where the fuselage is elongated to provide for 9 passengers or combatants.

FIGS. 32a-g illustrate means for enabling the external airflow to penetrate the forward facing side 3201 of the forward ducted fan of the vehicles described in FIGS. 1-21 and FIGS. 30-31 while in forward flight. One configuration that may be used to obtain such airflow penetration is shown in FIG. 32b and generally also shown at the forward end of FIG. 32a. Rows of generally vertical open slots 3204 for enabling through flow of air are shown, with remaining duct structure including an upper lip 3202 and a lower ring 3205. Airfoil shaped vertical supports 3203 serve to stabilize the structure and provide protection for the fan inside the duct. The slots 3204 remain open at all times. A second configuration for obtaining such airflow penetration is shown in FIG. 32c where the whole forward wall of the forward duct is cut to obtain two generally rectangular openings 3206 with an optional center support 3207. An additional option, which is an expansion of the method of FIG. 32b, is shown in FIGS. 32d and 32e where externally actuated rotating valves 3208 are mounted inside each slot 3204. When the vehicle is hovering, the slots are closed by the valves as shown in FIG. 32e. When the vehicle is in forward flight and flow of air into the duct is desired, the externally actuated valves 3208 rotate to the 'open' position shown in FIG. 32d, where the airflow 3209 is free to flow through the slots. An alternative to the concept of FIGS. 32d-e, is shown in FIGS. 32f-g where each of the vertical supports 3203 is attached to upper lip 3202 and lower ring 2305 by hinges that enable multiple vertical supports to pivot around multiple vertical axes 3210 and assume the position shown in FIG. 32g, where the multiple slots 3204 are closed to the external airflow.

FIGS. 33a-e illustrate alternative means for enabling the internal airflow to exit through the walls of the aft ducted fan of the vehicles described in FIGS. 1-21 and FIGS. 30-31, while in forward flight. One configuration for obtaining such airflow exit is shown in FIG. 33b and generally also shown at the aft end of the vehicle shown in FIG. 33a. Rows of generally vertical open slots 3304 for enabling exit of air are shown, with remaining duct structure including upper lip 3302 and lower ring 3305. Airfoil shaped vertical supports 3303 serve to stabilize the structure and provide protection for the fan inside the duct. The slots 3304 preferably remain open at all times. A second possible option of obtaining such airflow exit is shown in FIG. 33c where the whole rear wall of the aft duct is cut to obtain two generally rectangular openings 3306 with an optional center support 3307. An additional option, which is an expansion of the method of FIG. 33b, is shown in FIG. 33d and FIG. 33e where externally actuated rotating valves 3308 are mounted inside each slot 3304. When the vehicle is hovering, the slots are closed by the valves, as shown in FIG. 33e. When the vehicle is in forward flight and exit of air through the duct wall is desired, the externally actuated valves 3308 rotate to the 'open' position, as shown in FIG. 33d, where the airflow 3309 is free to flow through the slots. An alternative to the concept of FIGS. 33d-e is shown in FIGS. 33f-g where each of the vertical supports 3203 is attached to upper lip 3202 and lower ring 2305 by hinges that enable multiple vertical supports to pivot around multiple vertical axes 3210 and assume the position shown in FIG. 33g, where the multiple slots 3204 are closed to the external airflow.

FIGS. 34a-c illustrate alternative means for directing the internal airflow to exit with a rearward velocity component for the purpose of minimizing the momentum drag of the vehicle in forward flight. As shown, the lower forward portion of the forward duct 3401 is curved back at an angle that increases progressively along the circle-shaped forward duct wall, reaching a maximum angle at the center section. The curvature may vary from vertical all around the duct, such as at hover, to 30-45 degrees from vertical inclined backwards at center and decreasing progressively to the sides of the duct. In a similar manner, the lower forward center fuselage 3402, the lower aft portion of the center fuselage 3403 and the lower aft portion of the aft duct 3404 are curved back to direct the flow exiting from the ducts to better align with the incoming flow when the vehicle is in forward flight. The above geometrical reshaping of the ducts exits may be fixed (i.e. built into the shape of the ducts) as in FIG. 34a, or alternatively, may be of variable geometry such as flexible lower portion of ducts as shown in FIG. 34b. Various means of obtaining change of geometry to said lower duct portion are available. One option, illustrated in FIG. 34b shows the upper, fixed part of the duct 3405, to which is attached a flexible or segmented lower part 3406. The outer sleeve 3408 of a flexible 'push-pull' cable 3407 is connected to bottom of the flexible or segmented lower part 3406, whereby an actuator 3409, or optionally two actuators shown schematically as 3409 and 3410, mounted inside the fuselage would pull the cable 3407, thereby affecting the geometry of the duct as desired. The lower aft portion of the center fuselage 3404 is moved back in a manner similar to the lower forward portion of the forward duct 3401 as explained, but with the difference that moving the aft duct lower part backwards involves pushing a flexible 'push-pull' cable rather then pulling by the actuator/s from inside the fuselage, as was the case in FIG. 34b.

FIGS. 35a-c illustrate additional alternative means for enabling the external airflow to penetrate the walls of the forward duct and the internal airflow to exit through the walls of the aft ducted fan of the vehicles described in FIGS. 1-21 and FIGS. 30-31, while in forward flight, for the purpose of minimizing the momentum drag of the vehicle. As shown in FIG. 35a, the forward part of the forward duct has an upper section 3501, an opening for incoming airflow 3502 and a lower ring 3503. Similarly, the aft portion of the aft duct has an upper section 3504, an opening for incoming airflow 3505 and a lower ring 3506. Optional center supports 3509, 3510 are provided at the forward and aft ducts respectively for supporting the lower rings 3503 and 3506. FIGS. 35b and 35c show an enlarged cross-section through the forward duct with an optional flow blocker 3507. Flow blocker 3507 is preferably a rigid, curved barrier that slides up into the upper lip when in forward flight, and slides back down to block the flow when in hover.

FIG. 35c shows how the flow blocker 3507 is mechanically lowered, such as by actuators or other means not shown, to engage ring 3506 or other similar means on lower ring to block the external airflow, and preserve the straight cylindrical shape of the ducts down to the duct exits, while the vehicle is in slow flight or hover. A similar arrangement can be applied to the aft end of the aft duct. It is appreciated that flow blocker 3507 can either be one piece for each duct, or divided into two segments, such as where the option of adding vertical supports 3509 and 3510 is used.

The vehicle illustrated in FIGS. 36-41 is a VTOL aircraft carrying a ducted fan lift producing unit 3601 at the front and a second similar lift producing unit 3602 at the rear. In addition, the vehicle features two ducted-fan thrusters 3603 and 3604 located at the rear, and a horizontal stabilize 3605 for providing pitch stability to the vehicle, that also features movable flaps 3606 for creating additional lift through flap deflection. The stabilizer 3605 may also be optionally pivoted as a unit around pivots shown at 3707. Alternatively or in addition to the movable flaps and pivotal stabilizer, there may be other aerodynamic means of flow control such as air suction or blowing, piezoelectric, or other actuators or fluidic controls. The vehicle of FIGS. 36-41 also features a compartment, such as a passenger cabin 3608, occupying the central portion of the vehicle, being below and substantially to the side of the pilot's compartment 3609. A longitudinal cross section, designated as A-A is marked on FIG. 36 and is shown in FIG. 42 (but with the landing gear omitted).

Figure 36:
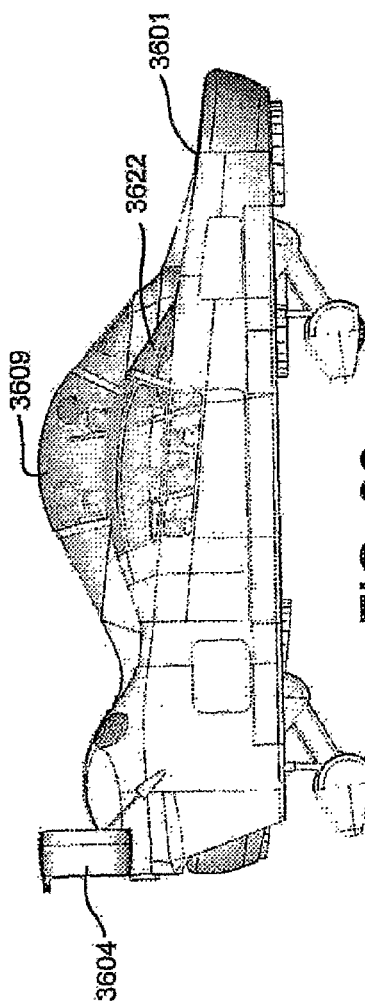
FIG. 36 is a side elevation of one form of two-duct VTOL aircraft vehicle constructed in accordance with the present invention.

FIG. 39 shows the longitudinal cross section A-A from FIG. 36, illustrating the forward lift fan duct 3610, the rear lift fain duct 3611 and the central cabin 3608 showing by way of example only a forward facing passenger at 3612, a rear facing passenger 3613 and the cabin height h at 3614, providing sufficient room and head clearance for the vehicle's occupants. The outer upper and lower boundaries of the cabin 3608 shown at 3615 and 3616 respectively are functionally configured to provide a substantially constant cabin height thereby featuring a relatively flat surface substantially aligned with the longitudinal axis of the vehicle, and preferably substantially parallel to the air flow lines during the flight in order to reduce drag, on both the roof 3615 and the floor 3616 of said occupant's cabin.

Figure 40:
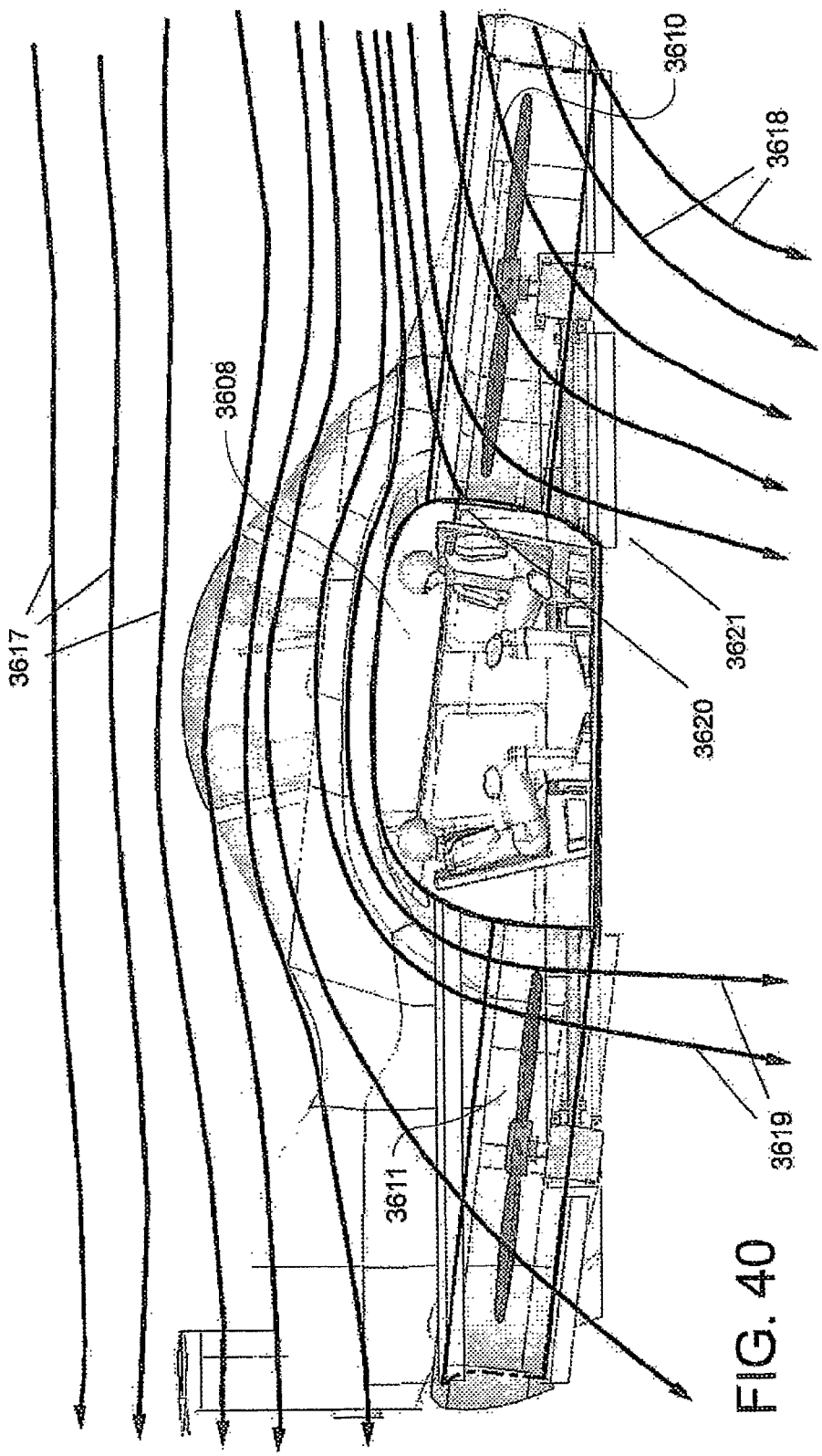
FIG. 40 illustrates the two dimensional airflow pattern around the cross-section outer boundaries of the vehicle of FIG. 36.

FIG. 40 illustrates the air flow around the cabin 3608 at forward cruise. While airflow that is distant from the vehicle shown schematically by the streamlines at 3617 is undisturbed by the vehicle, closer streamlines are affected by the vehicles shape and the action of the forward and rear lift fans. Those include the air entering the forward duct 3610 shown schematically at 3618, air flowing over the cabin 3608 and then entering the rear duct 3611 shown schematically at 3619. A stagnation point shown schematically at 3620 is always present, where all air below the streamline ending at this stagnation point flows over the cabin roof, with some of it continuing aft and some of it flowing into the rear lift duct 3611. It should be noted that due to the abrupt change in the vehicle's contour at the exit of the flow from the forward duct, the flow cannot make the turn and remain attached to the bottom of the cabin. Instead, in the region shown at 3621, the flow continues its downward motion, and only at a distance from the vehicle, turns gradually back to align itself with the incoming free-stream flow. This separation of flow from the bottom of the cabin 3608 causes considerable drag and especially momentum drag increase to the complete vehicle in forward cruise flight. It should further be explained that the flow patterns described in FIG. 40 are not limited to the center section A-A, but are generally prevailing across the width of the vehicle's cabin, creating essentially 2-dimensional flow with no spill-over to the sides of the vehicle. This is caused predominantly by the suction effect of the lift fans, with the rear fan being the major contributor. A secondary contributing factor to the absence of spill-over from the center section is the raised side canopies or cockpits 3609, 3622 shown in FIGS. 36-39. However, it will be emphasized that the 2-dimensional flow with no spill-over to the sides prevails also in vehicles which do not have raised or elevated side canopies or roof shape which resembles the vehicles shown in FIGS. 36-39, and the present invention applies also to such vehicles. Furthermore, the flow in FIG. 40 is shown fully attached to the surface even behind the cabin, with no separation which again would not be possible at high speed cruise without the rear fan acting to create the suction that attaches the flow to the vehicle's surface.

Figure 41:
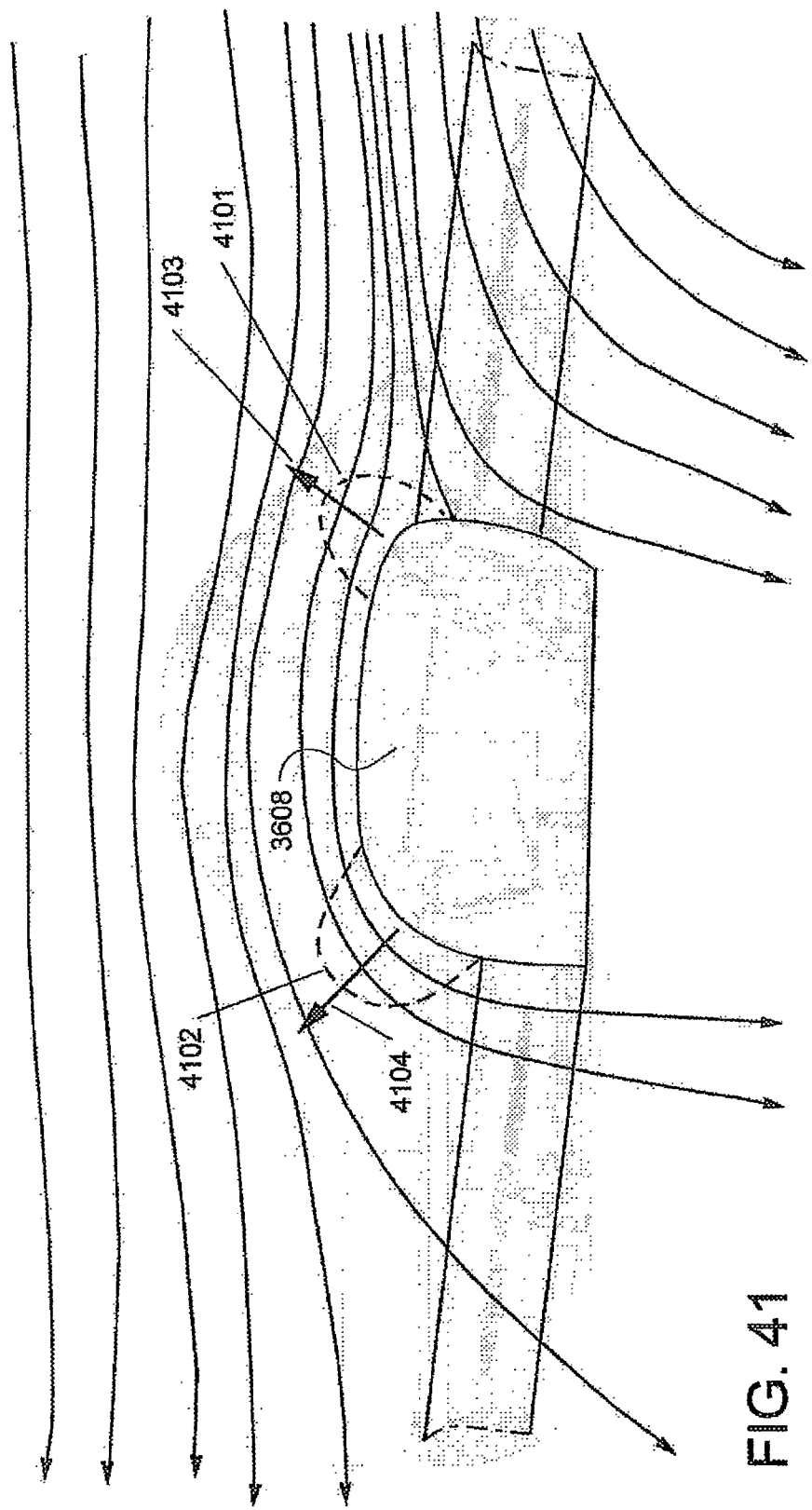
FIG. 41 illustrates how suction is formed on upper surface of the center portion of the vehicle of FIG. 36.
Figure 42:
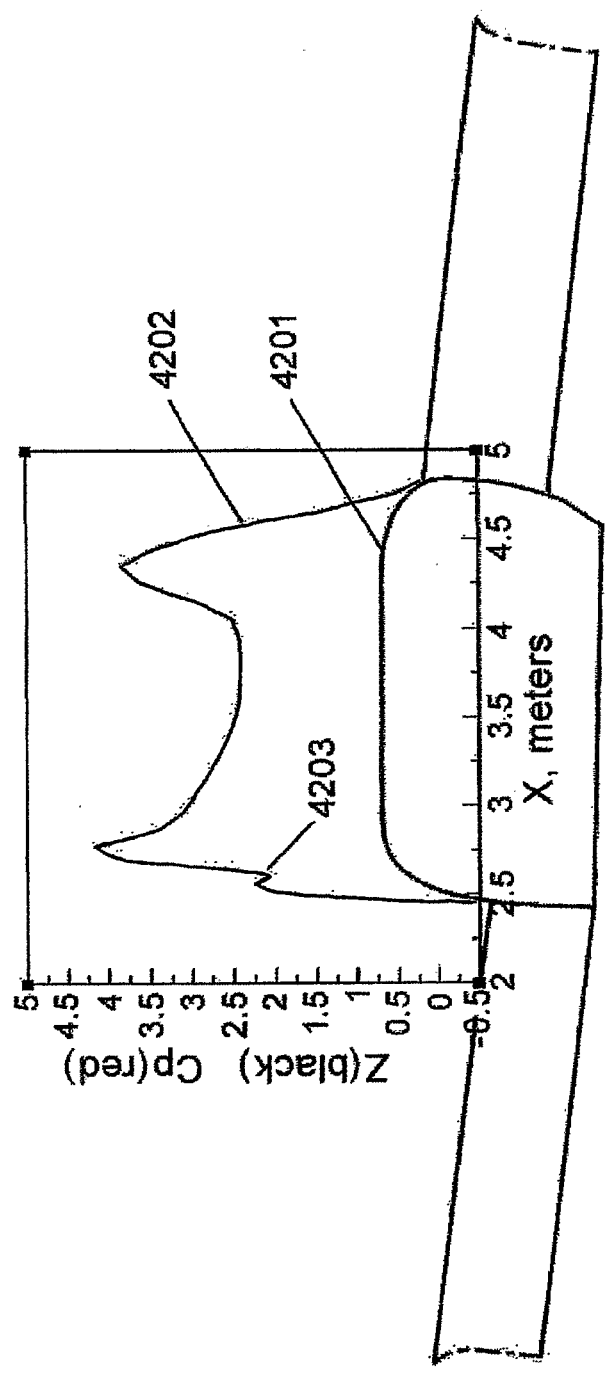
FIG. 42 illustrates the typical pressure coefficient distribution on an upper surface similar to the center portion of the vehicle of FIG. 36.

FIG. 41 illustrates the influence that streamlines flowing over the cabin roof have on the local air pressure adjacent to the vehicle's outer surface. Shown at 4101 and 4102 are two typical low pressure areas, created by the acceleration of the airflow over the forward curved end of the cabin 3608, and once more when the air accelerates as it goes around the curved rear end of the cabin. Because the roof of the cabin is substantially flat, the area directly above the cabin does not experience substantial changes in air pressure. As a result of the low pressure areas 4101 and 4102, two resultant suction forces develop, shown schematically at 4103 and 4104, that act by the air on the vehicles outer surface, with the net effect of some additional aerodynamic lift.

FIG. 42 illustrates the results of Navier-Stokes analysis of the pressure coefficient distribution on a flat upper surface shown at 4201 similar to the top of the center portion of the vehicle of FIG. 36. As can be seen, a low negative pressure peak shown in absolute values at 4202 is formed on the front end of the upper surface, reducing to moderate pressure on the flat surface, and increasing back to high suction Cp as the flow makes the rear curve of the roof, down towards the lift fan. A slight disturbance in the smoothness of the Cp curve is noticeable at 4203, caused by local flow separation, which is however quick to re-attach to the surface of the vehicle before entering the rear lift fan.

Figures 43, 44:
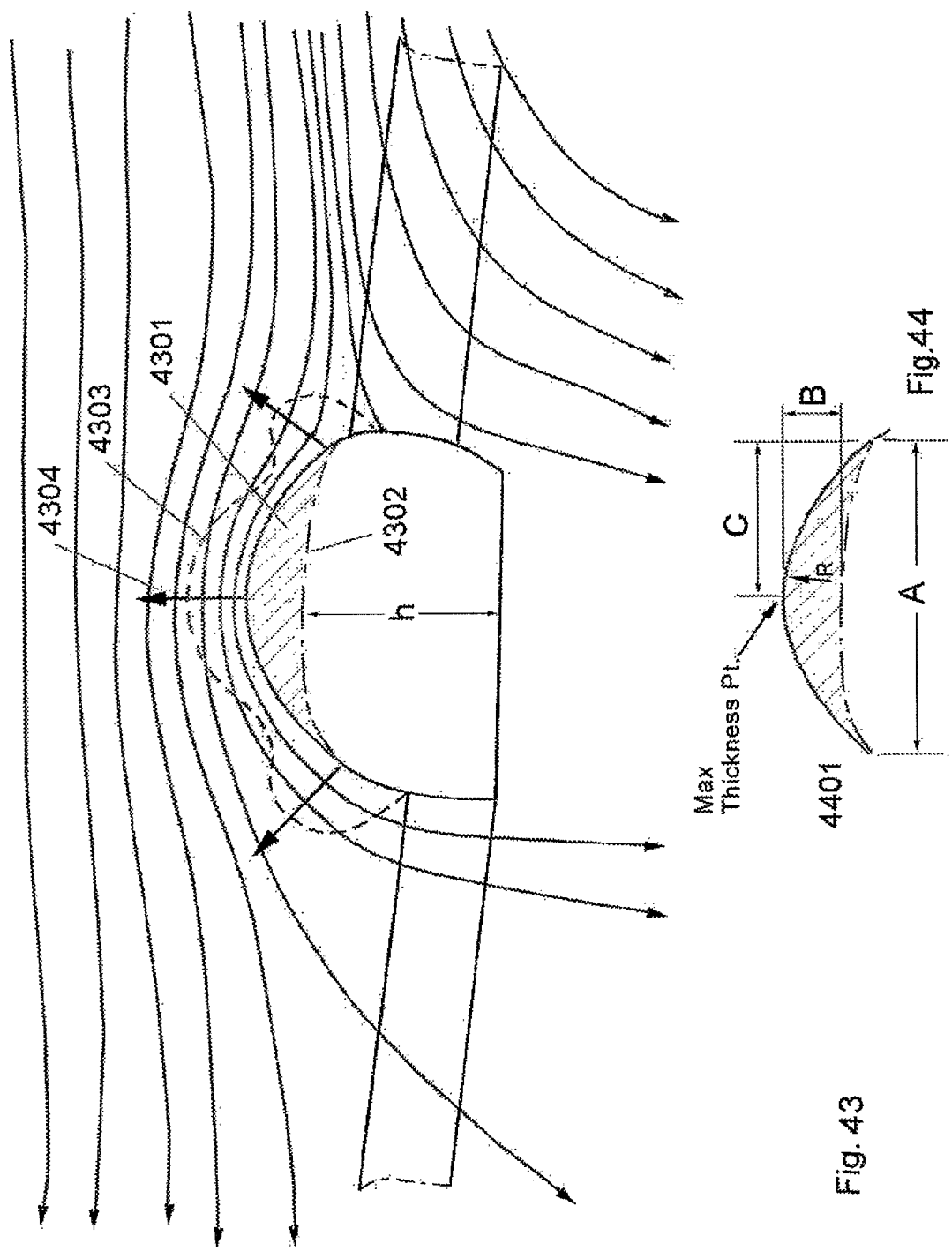
FIG. 43 illustrates how an external aerodynamic blister can provide additional suction and provide extra lift to the vehicle at high speed.
FIG. 44 illustrates exemplary dimensional relationships for the blister shown in FIG. 43.

FIG. 43 illustrates a modification to the outer roof line where a convex surface configuration, or "blister" 4301 is added on top of the substantially flat roof contour 4303. (Roof contour 4302 has the identical or substantially identical shape of roof 3615 of FIG. 39) Due to the presence of the blister and continuous convexness obtained on the outer surface, a new low pressure region is now created shown schematically as 4303, with an additional suction force 4304 providing additional lift to the vehicle. It should be noted that the low pressure area 4303 and all resultant forces are shown schematically merely to illustrate the mechanism by which additional lift is obtained through the addition of blister 4301 on the cabin roof. Shown at 4401 in FIG. 44 are some characteristics relating to the geometry of the blister 4301. Shown is substantially constant upper circular arc with radius R, with maximum thickness occurring substantially at midpoint so that C~=1/2 A, and value of R to obtain a ratio between maximum thickness B and longitudinal measure A substantially in the range of B/A~=0.20-0.40.

Figure 45:
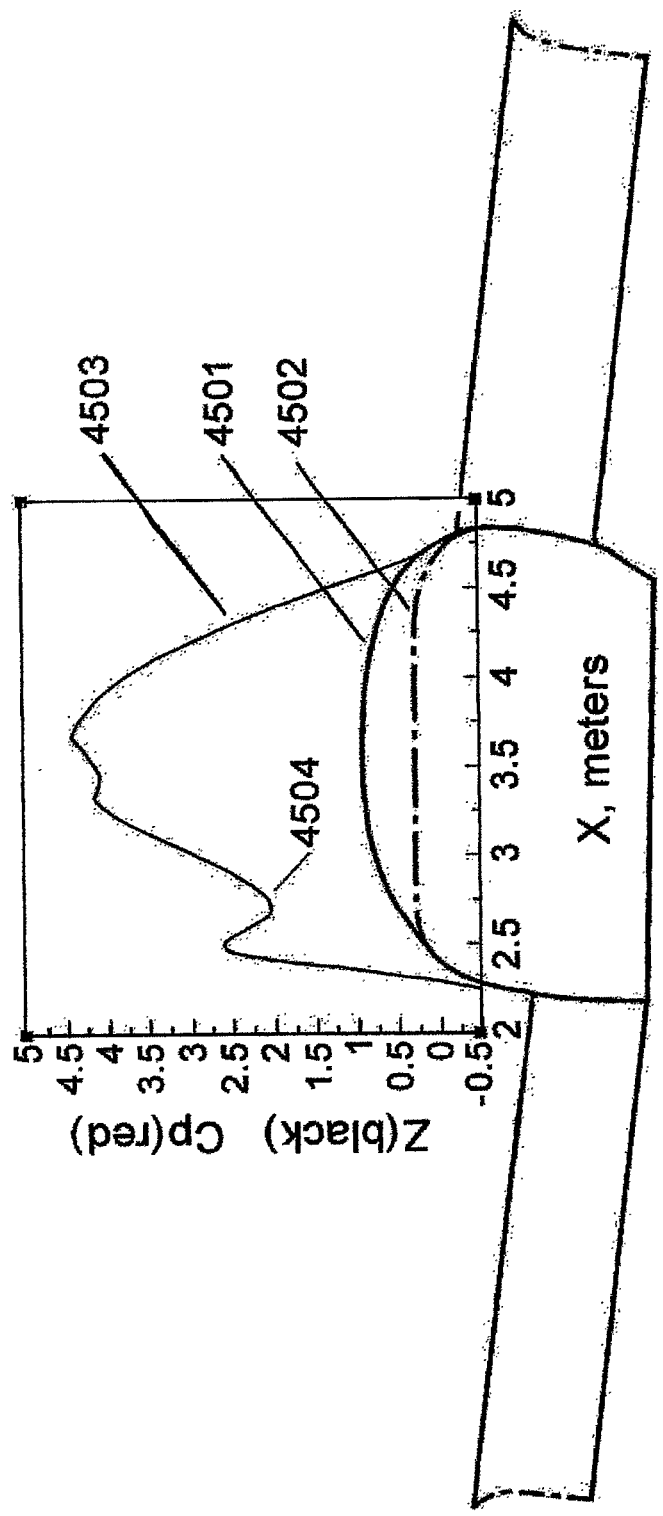
FIG. 45 illustrates the typical pressure coefficient distribution on a blister added to the upper surface of the center portion of the vehicle of FIG. 36.

FIG. 45 illustrates the results of Navier-Stokes analysis of the pressure coefficient distribution on a curved upper surface shown at 4501 similar to the top of the blister 4301 of FIG. 43. The original flat cabin roof is shown for reference at 4502. As can be seen, a low negative pressure shown in absolute values at 4503 begins to form on the front end of the upper surface, but unlike the pressure distribution of FIG. 42, the pressure keeps increasing to high suction Cp, reaching a maximum value approximately over the highest portion of the blister. As in FIG. 42, also here a slight disturbance in the smoothness of the Cp curve is noticeable at 4504, however more prominent than that of FIG. 42, also caused by local flow separation, which is however quick to re-attach also here to the surface of the vehicle before entering the rear lift fan.

Figure 46:
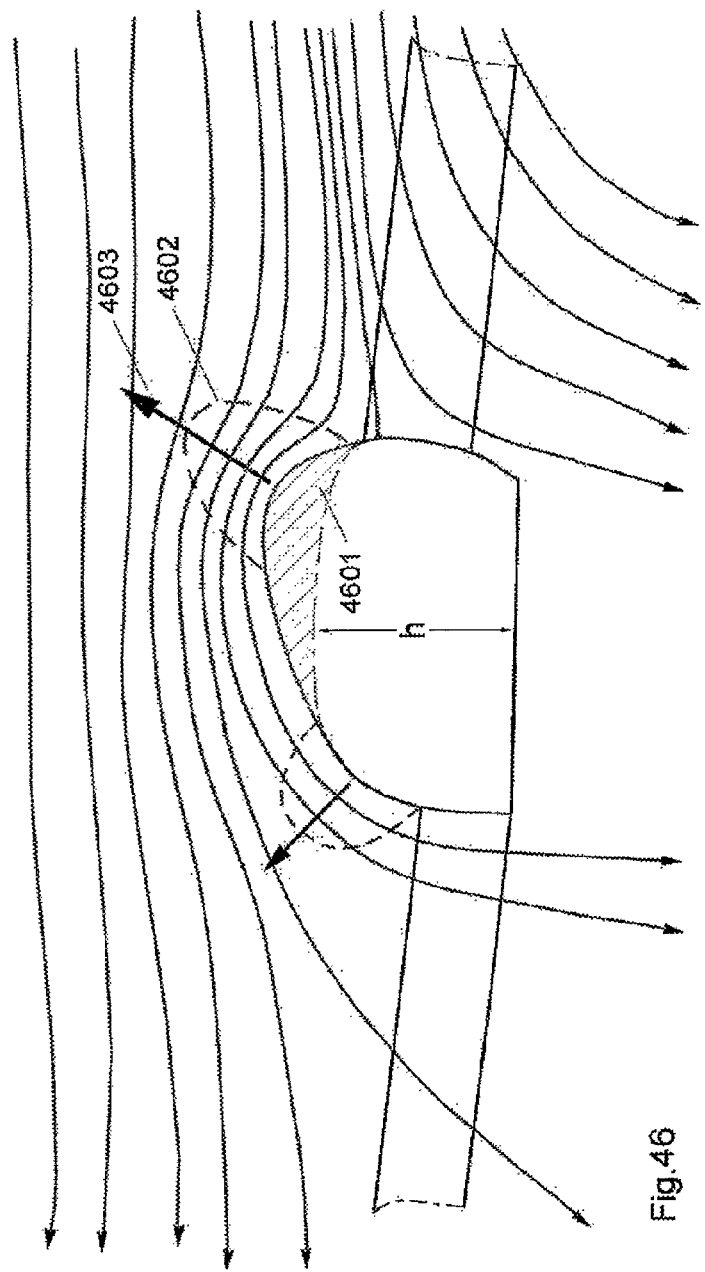
FIG. 46 illustrates how, by forming the blister to have a more pronounced forward end, the direction and magnitude of the resultant suction on the blister can be adjusted to obtain high lift with reduced drag.

FIG. 46 shows a modification on the shape of the blister, shown here at 4601, not being substantially symmetrical as blister 4301 of FIG. 43, but having an intentional forward inclination, where the radius of curvature of the blister outer surface that is closer to the incoming air is smaller, and thereby the front facing curvature of the blister 4601 is steeper and less gradual than the curvature of its rear portion. As a result, the acceleration of air over the forward part of blister 4601 is faster, and the low pressure area created shown at 4602 has lower pressures than on the standard flat roof while acting on a similarly sized portion of the vehicle's body, thereby creating a stronger lift force shown schematically at 4603, while, unlike for the symmetrical blister of FIG. 43, also having this resultant angled forward to create a positive propulsive force component in the direction of flight, in addition to the lift force component. It should again be emphasized that the shapes of the low pressure regions and size and direction of resulting forces are shown schematically merely to illustrate the mechanism by which additional lift is obtained through the low pressure field created by the presence of the blister on top of the substantially flat standard cabin roof.

Figure 47:
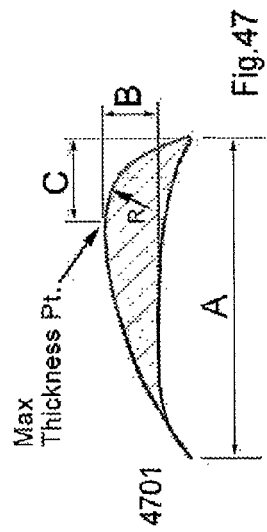
FIG. 47 illustrates exemplary dimensional relationships for the blister shown in FIG. 43.

Shown at 4701 in FIG. 47 are some characteristics relating to the geometry of the blister 4601. Shown is non-constant upper circular arc with smaller radius of curvature R at the forward area of the section, with typical values so as to obtain maximum thickness occurring substantially in the range of distances from the forward edge C~=0.2A-0.3A, while at the same time obtaining a desired ratio between maximum thickness B and longitudinal measure A, substantially in the range of B/A~=0.20-0.40.

Figure 48:
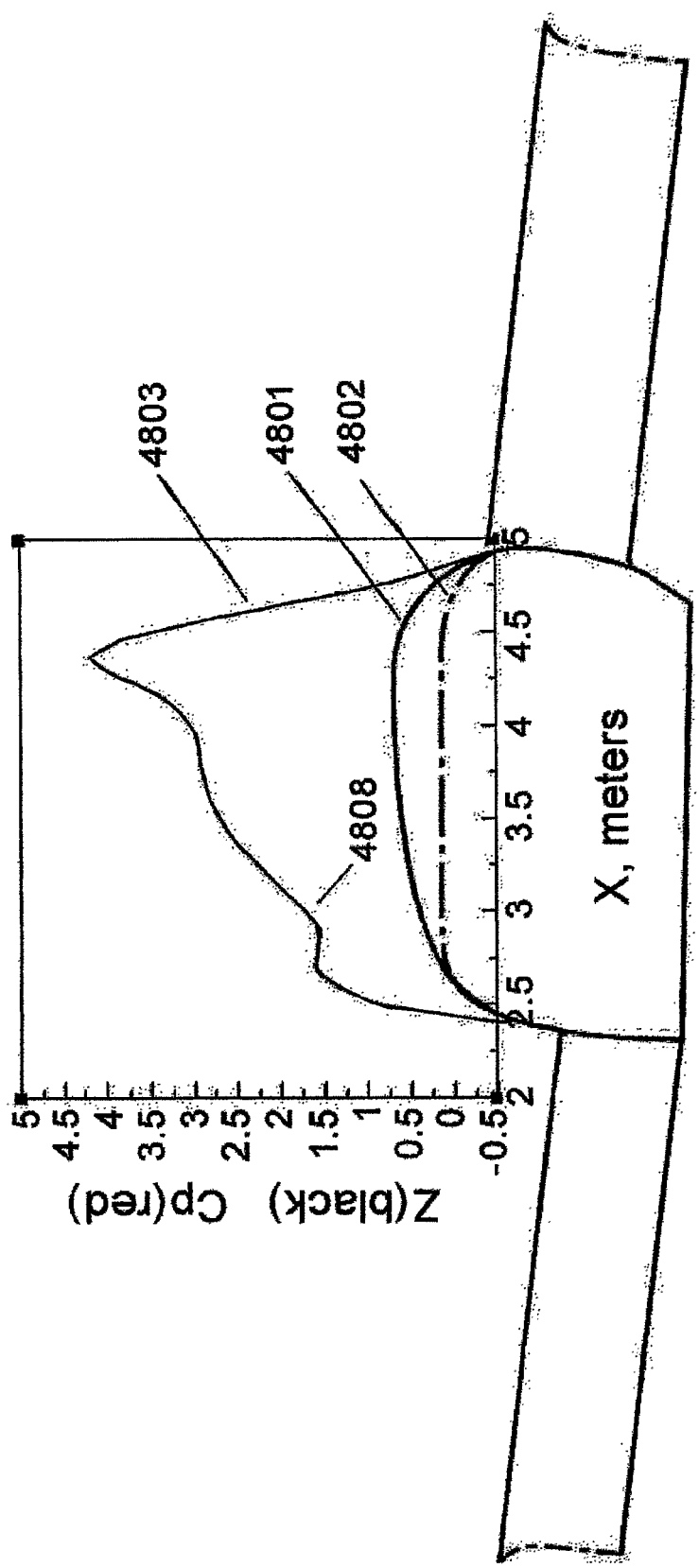
FIG. 48 illustrates the typical pressure coefficient distribution on a blister similar to that of FIG. 48, when added to the upper surface of the center portion of the vehicle of FIG. 36.

FIG. 48 illustrates the results of Navier-Stokes analysis of the pressure coefficient distribution on a curved upper surface shown at 4801 similar to the top of the blister 4601 of FIG. 46. The original flat cabin roof is shown for reference at 4802. As can be seen, a low negative pressure shown in absolute values at 4803 begins to form on the front end of the upper surface, rises steeply, and reaches a maximum value approximately over the highest portion of the blister. As in FIGS. 42 and 45, also here a slight disturbance in the smoothness of the Cp curve is noticeable at 4808, also caused by slight local flow separation, which is however quick to re-attach also here to the surface of the vehicle before entering the rear lift fan.

Figure 49:
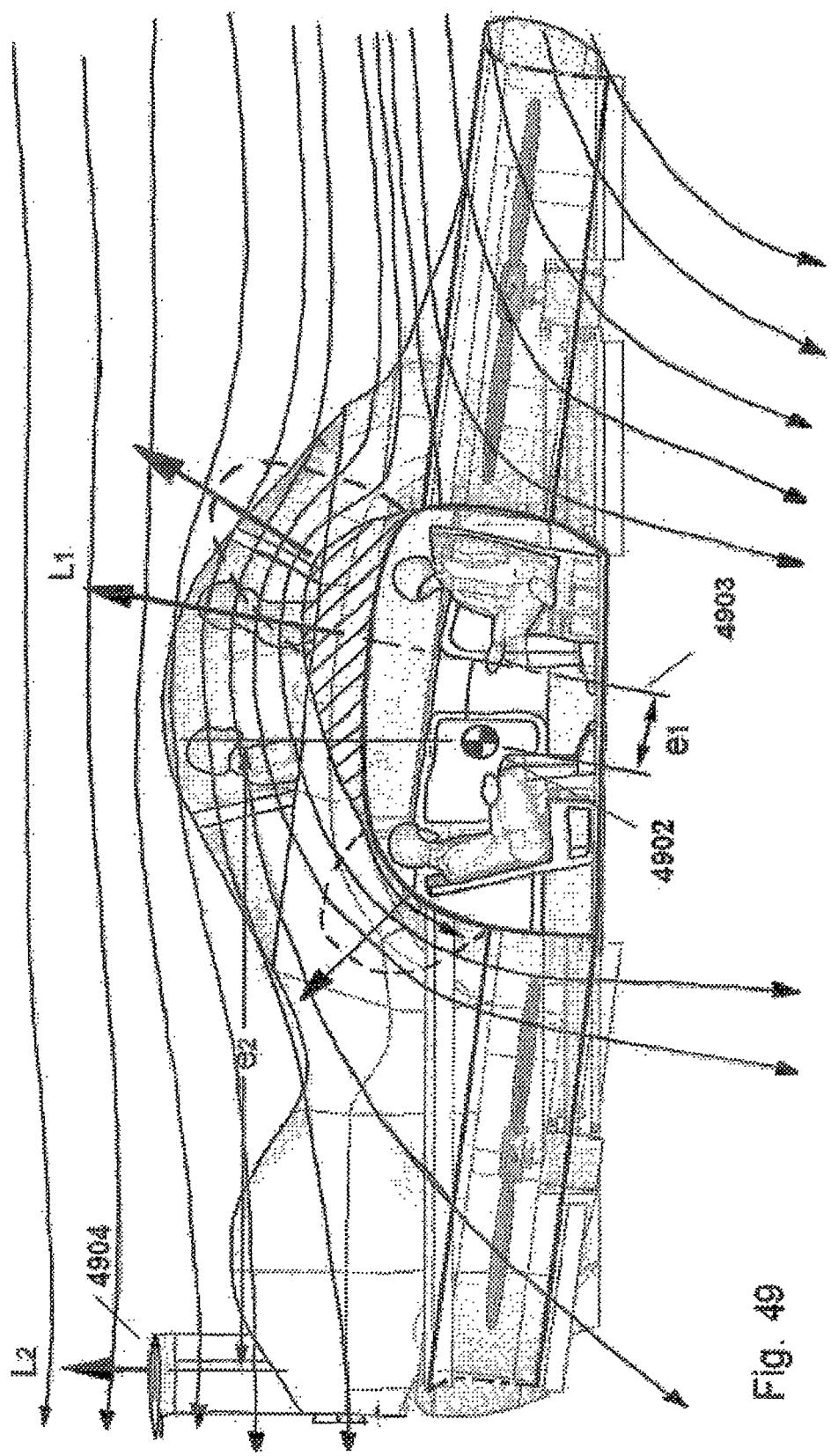
FIG. 49 illustrates how, by moving the resultant lift vector of the blister forward, it is possible to also combine additional useful lift from the vehicle's horizontal stabilizer.

FIG. 49 illustrates how a forward inclined blister similar to the one shown at 4601 in FIG. 46 also has the effect of moving forward the net lift force shown as L1 acting on the roof through the blister, relative to the substantially symmetric blister shape shown at 4301 on FIG. 43. Because the Center of Gravity of the vehicle, shown at 4902 around which the vehicle rotates as a free body, is located substantially at the center of the vehicle, an eccentricity shown as e1 develops between the lien of action of force L1, shown at 4903 and the Center of Gravity 4902. As a result, a positive, nose-lifting pitching moment develops as a result of the forward lift line location of the blister, which needs to be counteracted to maintain the balance of the vehicle in pitch. This is where additional lift shown as L2 can easily be generated by the horizontal stabilizer shown at 4904, that, together with eccentricity e2 of L2 relative to the Center of Gravity 4902, can counter-balance the pitching moment caused by L1. The beneficial result of this is that an additional lift force L2 is now acting on the vehicle, further increasing the lift at cruise, keeping in mind that the horizontal stabilizer 4904 could not have been used to create lift, had there been no counter such as the forward inclined blister 4601 maintaining the required balance of moment around the vehicle's Center of Gravity.

Figure 50:
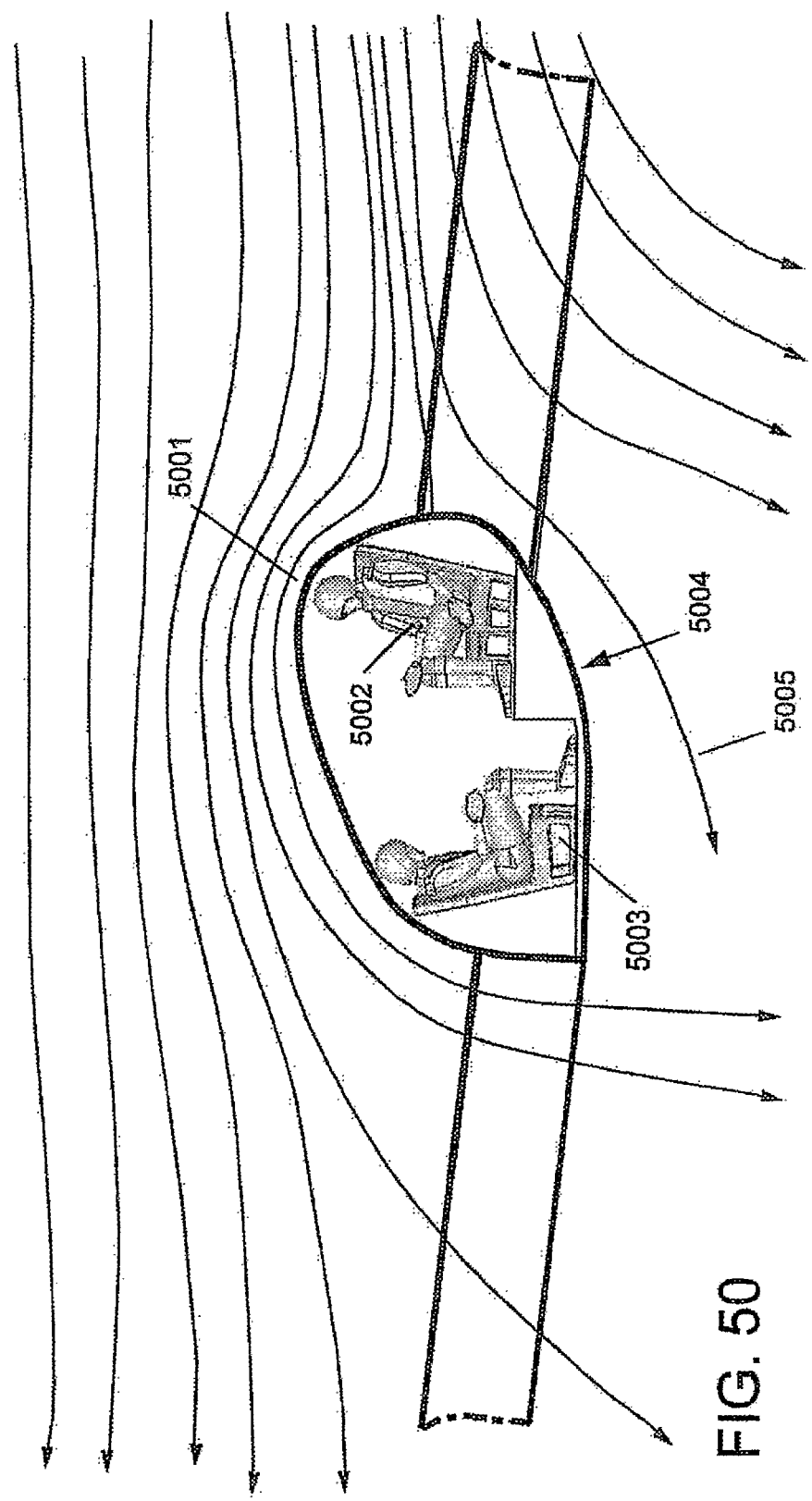
FIG. 50 illustrates an application where the internal cabin roof is raised to conform with the outer limit of the blister of FIG. 46, while also enabling re-shaping of the cabin floor to improve flow on lower side of vehicle.
Figure 51:
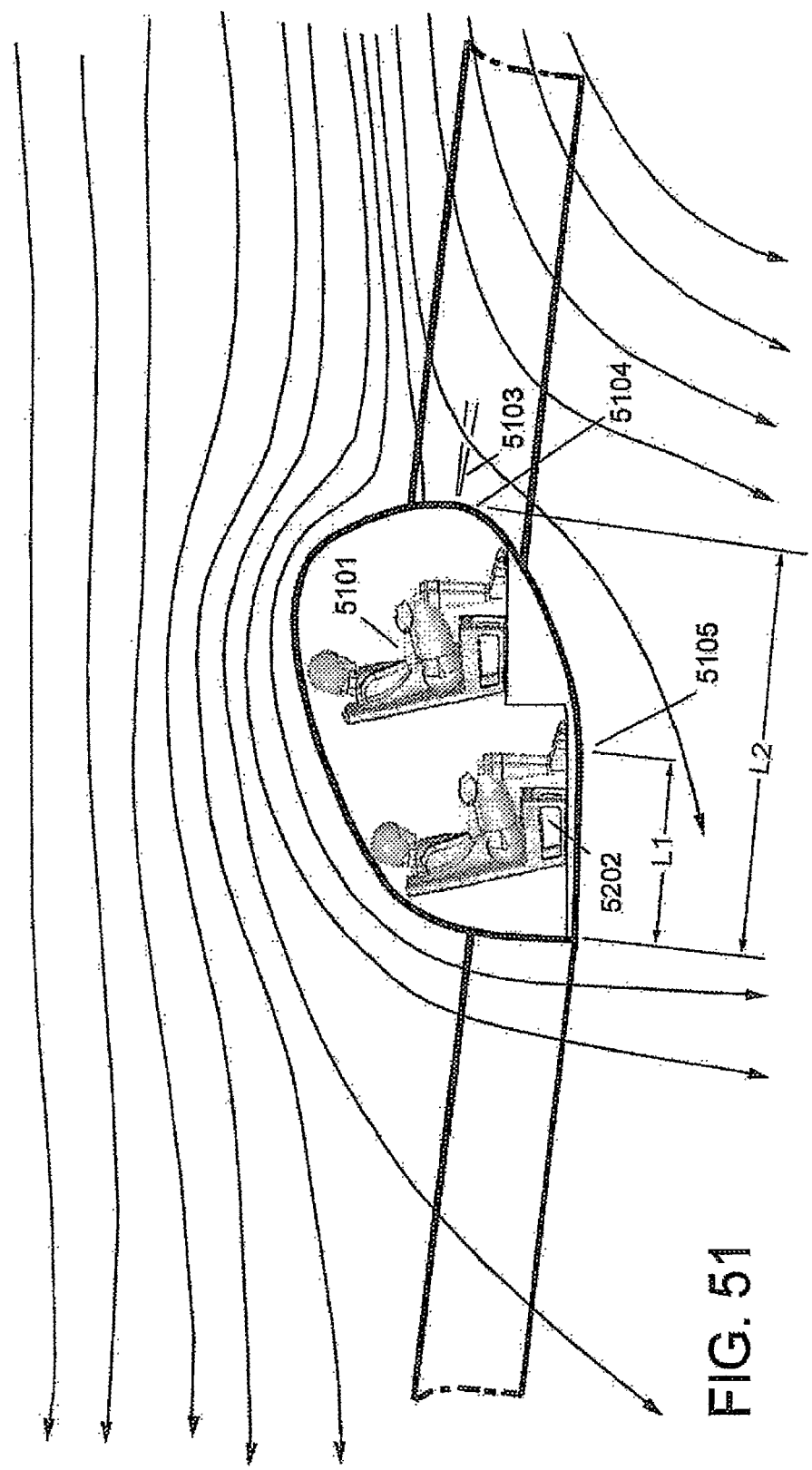
FIG. 51 illustrates a cabin arrangement alternative to that of FIG. 50, where both occupants are facing forward, with additional clarifications concerning the geometry of the re-shaped cabin floor.

FIG. 50 illustrates how, if the forward inclined blister shown at 4601 in FIG. 46 is made hollow to effectively create a modified cabin roof substantially in the shape of the blister shown at 5001, the rear facing occupant shown at 5002 can now be raised relative to the forward facing occupant 5003, yielding an added benefit of being able to reconfigure the floor of the cabin in a manner shown at 5004 and further explain in FIG. 51, thus providing smooth outflow of the air, shown schematically at 5005 from the exit of the forward duct, resulting in reduction of the drag and especially momentum drag of the vehicle in cruise.

FIG. 51 illustrates that the invention is not limited to rear facing occupants, and that both occupants shown at 5101 and 5102 can also be forward facing, or in fact be seated in any intermediate position in the cabin. It should be emphasized that the occupants herein described, by way of example only, can be replaced by cargo or by any other cabin or payload bay function or contents. Also further explained in FIG. 51 is the geometry of the reconfigured floor common to FIGS. 50 and 51. It can be seen that as soon as the forward duct inner surface clears the tip of the propeller blades shown schematically at 5103, the outer boundary of the cabin begins to curve backwards at point marked by 5104, and continues aft at a shallow angle, merging with the original flat cabin bottom at a point marked by 5105, which is substantially aft of the forward end of the cabin. It can be noticed that the radius of curvature at the start close to point 5104 is small (i.e., relatively sharp corner), followed by a relatively flat (large radius of curvature) slope down to point 5105. This relatively flat angled bottom, rather than a constant arc chosen for the cabin floor achieves two purposes: a. The relatively sharp curve in the contour close to point 5104 facilitates early separation of the flow from the forward bottom surface of the cabin when the vehicle is in hover, thereby not creating any flow distortion or unwanted interaction with the fuselage below the propeller 2. b. When in forward flight, with the flow attached, the relatively flat diagonal surface between points 5104 and 5105 avoids the build up of low pressure and suction on that surface which would have resulted in negative lift, had that contour been of substantially constant radius.

It should also be noted that the ratio L1/L2 is substantially in the range of 0.30-0.60, and that the reconfigured diagonal cabin floor line between points 5104 and 5105 is substantially longer than would be the case if only a local bend to avoid a sharp corner were introduced to the forward end of an otherwise flat cabin floor (i.e., L1/L2=1).

Figure 52:
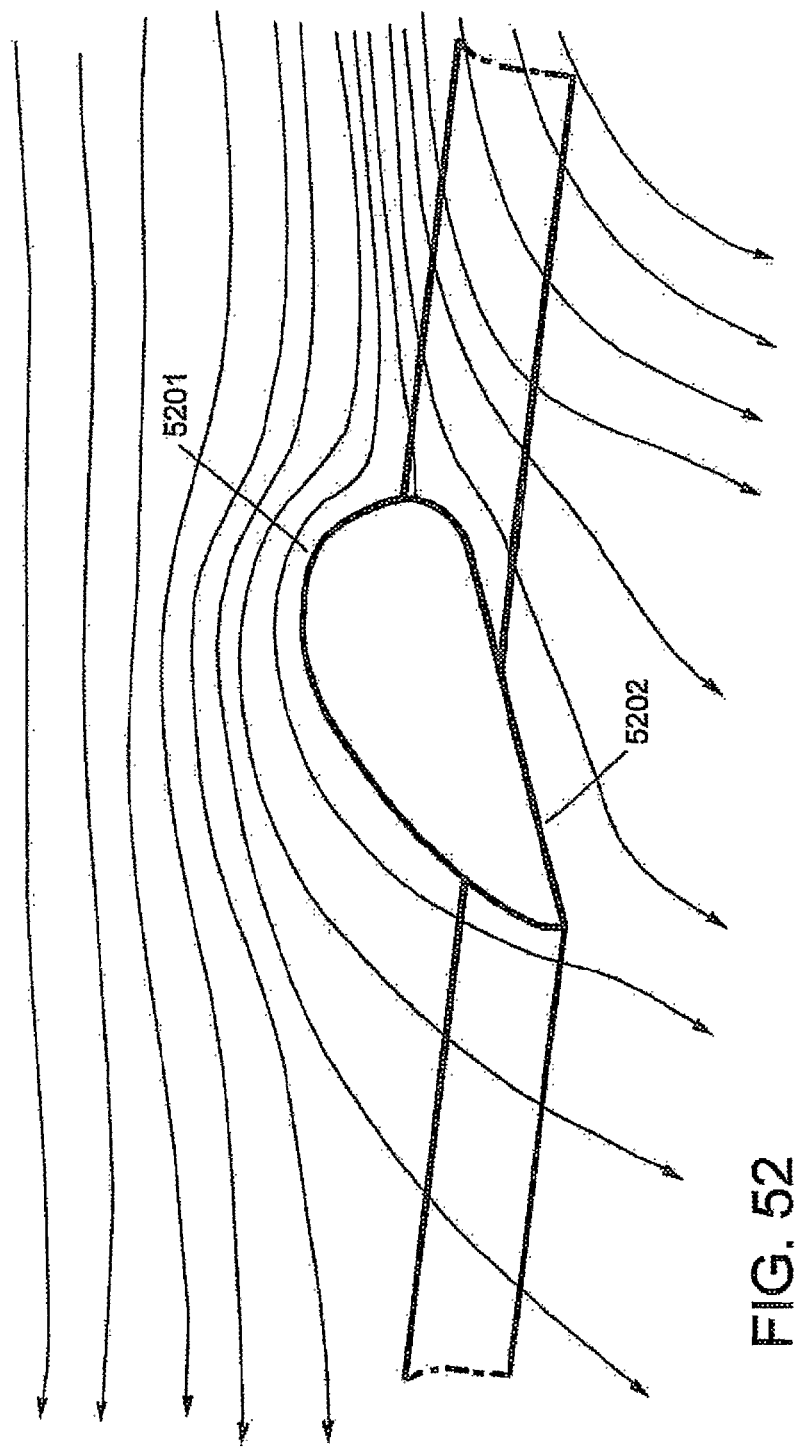
FIG. 52 illustrates an application where the entire center section of the vehicle of FIG. 36 is shaped in the form of an airfoil with a substantially flat lower surface.
Figure 53:
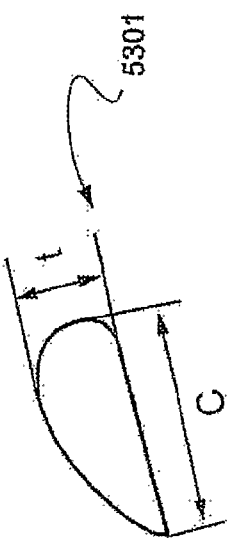
FIG. 53 illustrates exemplary dimensional relationships for the blister shown in FIG. 52.

FIG. 52 illustrates an alternative cabin shape, where the upper cabin roof at 5201 is still curved substantially in the form of FIG. 46, but where the bottom of the cabin area shown at 5202 is substantially flat. While not directly suitable to accommodate the occupants shown in FIGS. 50, 51, the flat bottom cabin shape could still be used for other applications such as cargo or unmanned applications of the vehicle, or alternatively—for larger size vehicles, where the cabin shape would still be high enough to provide headroom for human occupants. The geometry of the flat bottomed cabin is shown schematically at 5301 in FIG. 53, with the ratio of t/c substantially in the range t/c~=0.30-0.50. The main aerodynamic advantage of the flat bottom 5202 over the curved bottom shown at 5004 on FIG. 50 is the avoidance of downward suction forces, with better ratios of lift to drag obtained in forward cruise.

Figure 54:
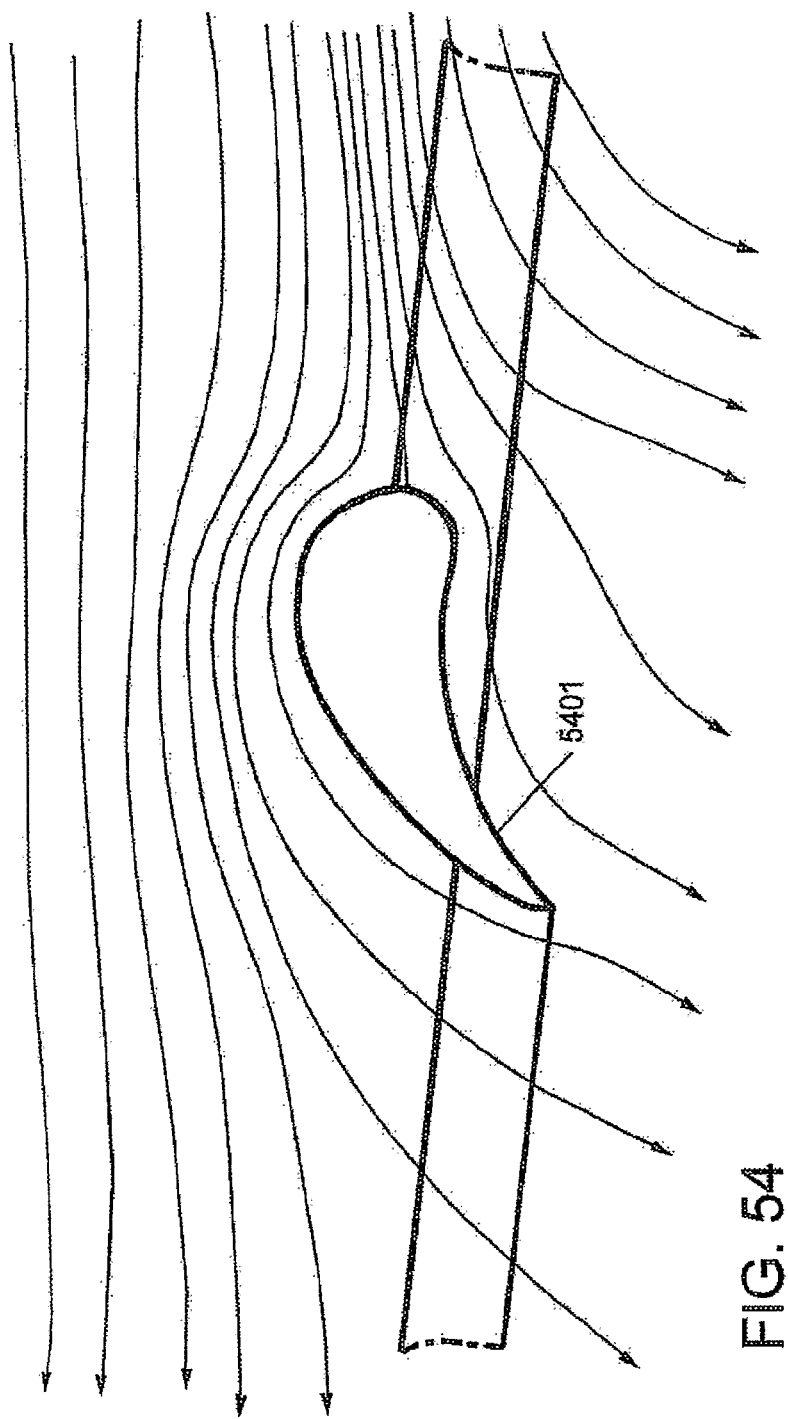
FIG. 54 illustrates an application where the entire center section of the vehicle of FIG. 36 is shaped in the form of an airfoil with a substantially concave lower surface.
Figure 55:
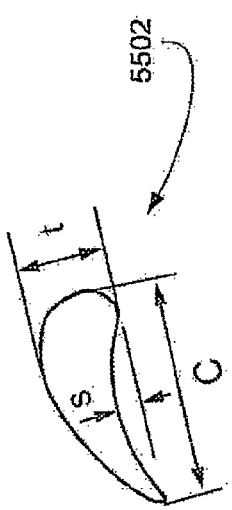
FIG. 55 illustrates exemplary dimensional relationships for the blister shown in FIG. 54.

FIG. 54 illustrates a further variation on the cabin floor shape, where the bottom is concave, shown at 5401. While the concavity of the floor has the disadvantage of further reducing the available cabin inner height and useful space, it has the aerodynamic advantage of increasing the positive pressure on the bottom of the cabin, and potentially further improving the lift to drag ratio over the flat bottom of FIG. 52. The geometry of the concave bottomed cabin is shown schematically at 5502 in FIG. 55, with the ratio of t/c as before, i.e., substantially in the range t/c~=0.30-0.50, and with the section's concavity ratio s/c substantially in the range s/c~=0.05-0.15.

FIG. 56 and FIG. 57 illustrate the influence of the magnitude of the induced velocity, relative to the free-stream velocity, on the shape of the streamlines flowing around the center section, as well as through and out of the lift fans of the vehicle, FIG. 56 representing the vehicle with cabin shape of FIG. 40 and FIG. 57 representing the vehicle with cabin shape of FIG. 52. Shown in FIG. 56 at 5601 is high induced velocity flowing through the blades shown schematically at 5602 of the rear fan shown schematically at 5603. A similar description is applicable to the forward fan of the vehicle. In FIG. 57, a smaller induced velocity shown at 5701 flows through the fan, as would for example result if additional lift on the cabin roof shown schematically at 5702 would occur at high speed, without a corresponding increase in the vehicle's weight, which would require the total lift to remain the same, necessitating in reduction of the lift contribution of the fans-hence a reduction in induced velocity through the fan blades. Because the change in induced velocity between FIGS. 56 and 57 is essentially at constant flight speed, one can see from the airspeed vector diagrams shown that while free stream velocity shown at 5604 and 5703 remains unchanged in magnitude, the vertical induced component shown respectively at 5605 and 5704 for the high and low induced velocity cases, causes the resultant flow angularity to assume a considerably more shallow angle in FIG. 56 relative to FIG. 57. This behavior of the flow in the vicinity of the vehicle has the beneficial effect of reducing the momentum drag component of the overall resistance that the vehicle experiences as it moves through the air, further illustrating the benefits of creation of cruise lift forces on the cabin roof and stabilizer, while off-loading some of the load carried by the fans, possible through the implementation of the provisions shown in FIGS. 43-55. It should be mentioned that the above-mentioned benefits with respect to streamline geometry and array area applicable also to other center section shapes beside that shown in FIGS. 56 and 57.

Figure 58:
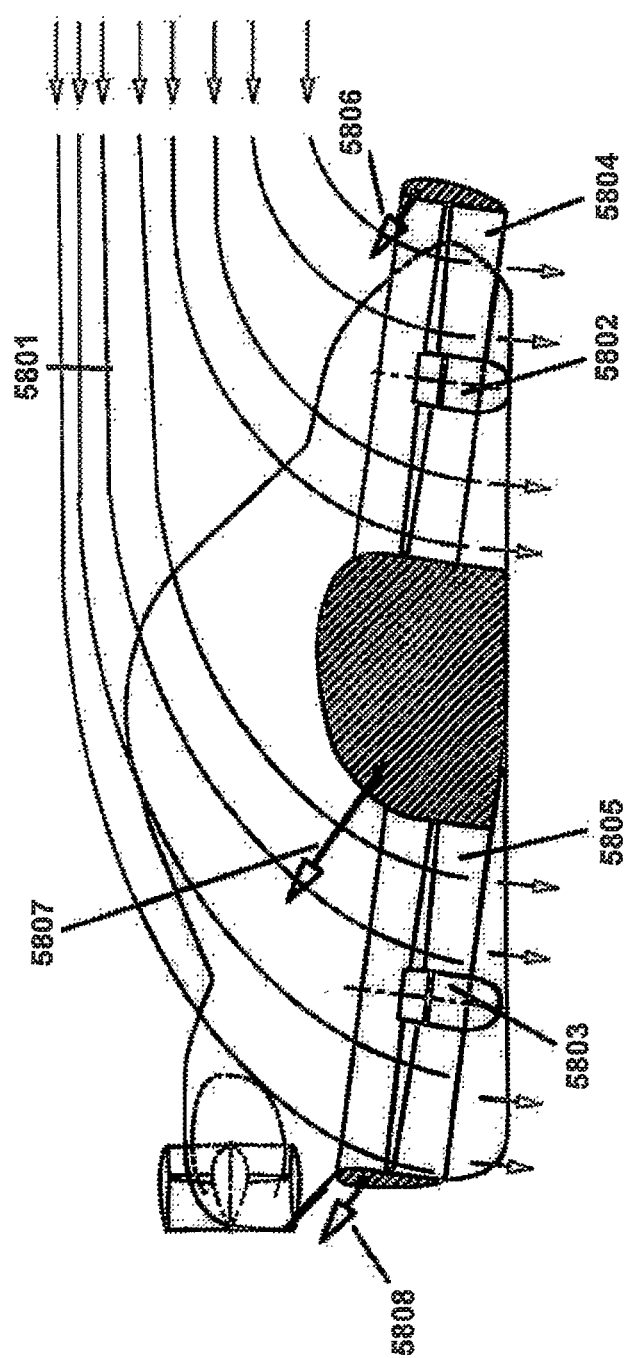
FIGS. 58 and 59 illustrate the general form of airflow streamlines, with and without provisions for enabling the flow to penetrate through the walls of the forward and aft ducted fans.

FIG. 58 shows in schematic form the airflow streamlines 5801 that are characteristically formed in the vicinity of vehicles such as those described in FIGS. 1-21 and FIGS. 30-31. Due to the dominant effect that the rotors 5802, 5803 and the ducts 5804, 5805 have on the flow, the streamlines leave the vehicle at an angle to the incoming flow. The resulting pressure distribution on the vehicle's surface results in considerable drag forces indicated by 5806, 5807, 5808 that are caused by the momentum change of the flow, hence termed 'momentum drag,' a phenomenon that negatively impacts in the forward speed capability of the craft.

Figure 59:
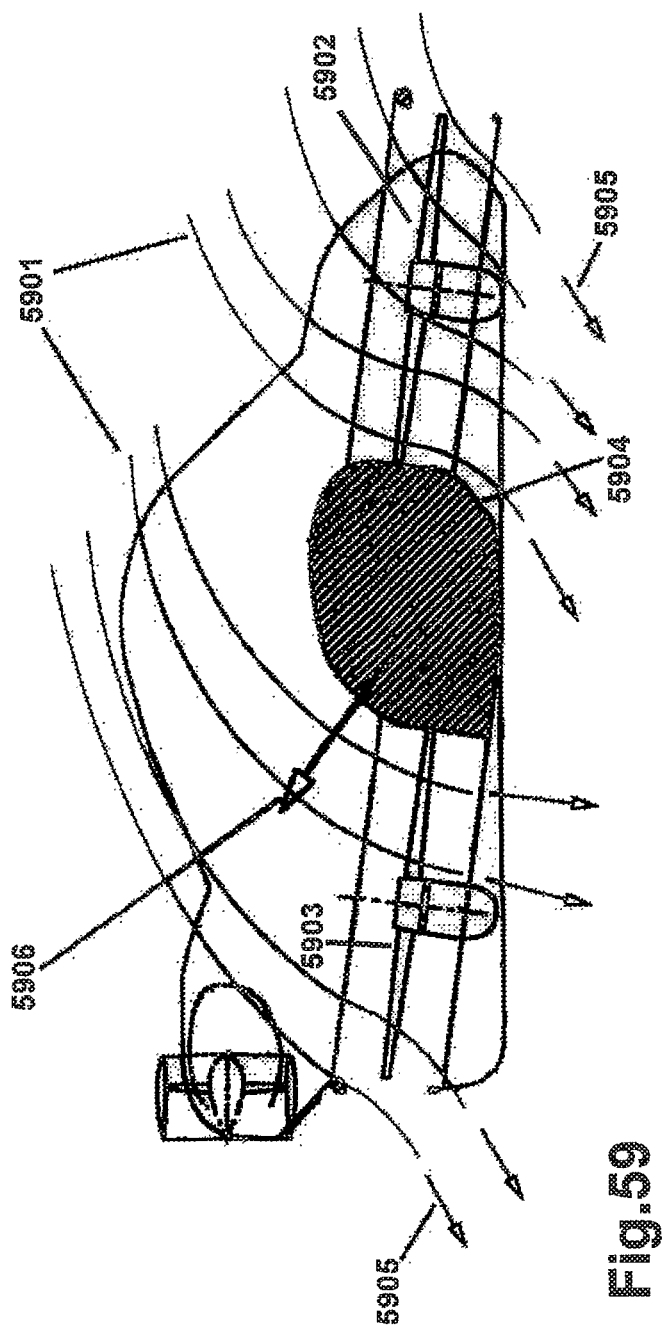

FIG. 59 shows in schematic form the airflow streamlines 5901 that are characteristically formed in the vicinity of vehicles such as those described in FIGS. 1-21 and FIGS. 30-31, contrary, however, to the flow field of FIG. 58, where both forward and aft lift creating ducted fans have rigid and sealed boundaries. In FIG. 59 means for enabling the external airflow to penetrate the wall of the forward duct 5902 and the internal airflow to exit through the walls of the aft duct 5903 are incorporated, for example as described in FIGS. 32-35. In addition, a curved cutout 5904 is also employed in the center body section, as suggested in 3402 in FIG. 34. As shown, the exiting flow 5905 now assumes a general direction that is similar to the direction it had prior to contacting the vehicle's surface; however, behind the center body section, the flow is still guided downwards, and a momentum drag component 5906 is still present on the center body.

Figure 60:
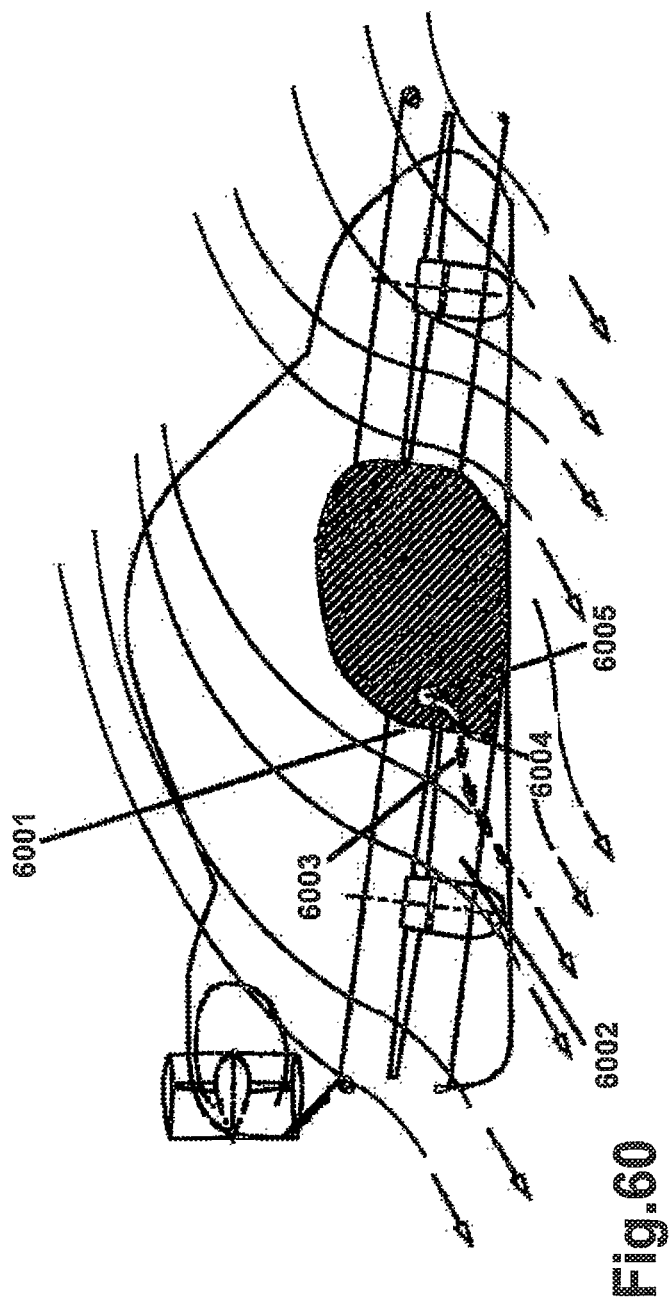

FIG. 60 shows a cross section of the vehicle with an alternative means of redirecting the exiting flow on the center body side 6001 of the aft ducted fan 6002. Such means is achieved by blowing auxiliary air 6003 backwards into the aft duct 6002 through slot 6004 arranged circumferentially on generally the forward half of the aft duct wall. The auxiliary air 6003 causes the flow inside aft duct 6002 to separate from center body side 6001 of the duct wall and exit the duct at a direction similar to the direction it had prior to contacting the vehicle's surface. Sources for auxiliary air are not shown in FIG. 60, but common to turbine powered vehicles, air may be provided by the turbine engine's compressors, and ducted to the slots 6004 through air ducts 6005 inside the vehicle's body. It should be emphasized that, while generally facing horizontally backwards, and while located between the plane of the rotor and the exit from the duct, the auxiliary air flow 6003 could be directed upward or downward, and slots 6004 could vary in geometry and vertical position along center body side 3703, as deemed necessary for creating the minimal amount of momentum drag on center body.

Figure 61:
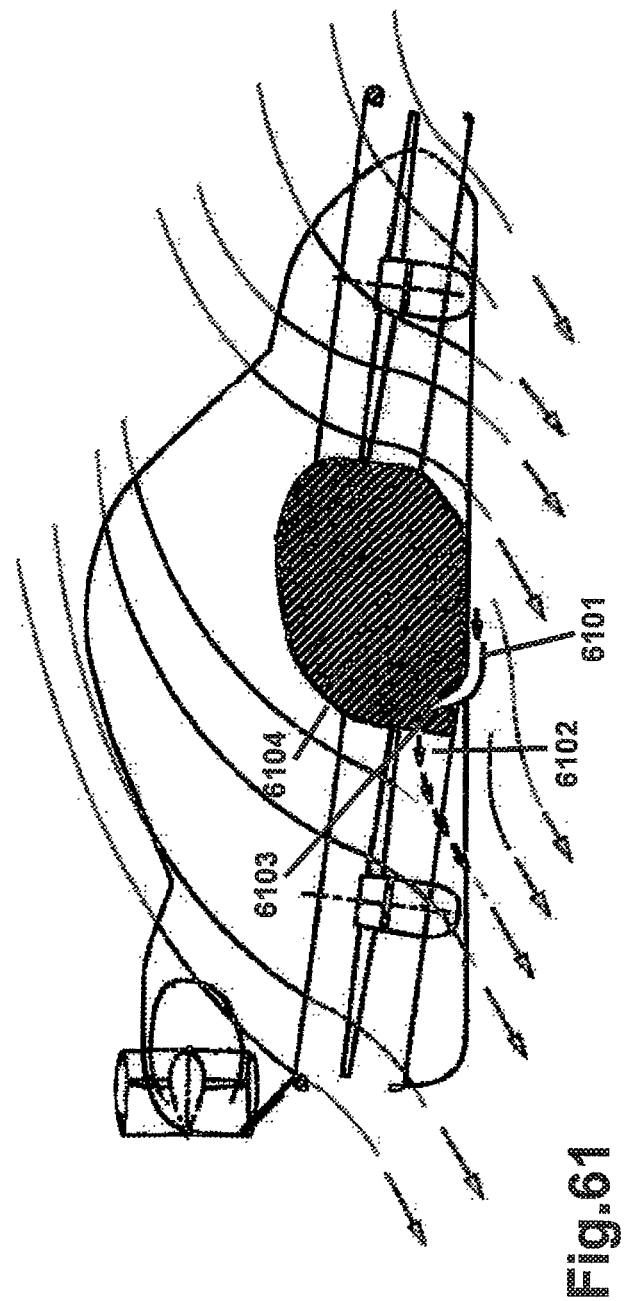

FIG. 61 shows an arrangement similar to FIG. 60, however the source of auxiliary air comprises scoops 6101 (one shown), either protruding from the surface of the vehicle as illustrated, or 'flush' with the surface as sometimes employed in air vehicle design. The scoops 6101 are connected to air duct 6102 transferring the air captured by said scoops to the slots 6103. In should be added that the scoops 6101, air duct 6102 and slots 6103 could optionally employ varying cross-sectional areas such as to cause the air to accelerate and exit at higher velocity through slots 6103 than the free stream velocity if entered through scoop(s) 6101. This increase in airspeed would be beneficial to facilitate desired flow conditions when air coming out of slots 6103 combines with relatively high speed air flowing inside ducted fan enclosure, especially in the vicinity of the center body 6104.

FIG. 62 shows an arrangement similar to FIG. 61, however auxiliary air pumps or compressors generally shown as 6201 are added in line with air ducts 6202 to further enhance air blowing through slots 6203 into the aft ducted fan 6204.

FIG. 63 shows an arrangement similar to FIG. 60, however, in addition to the auxiliary air 6300 injected into the duct 6301 through slots 6302, a re-shaping of the bottom of the fuselage shown schematically in 6303 enhances mixture of free stream air flowing below the vehicle into the new streamlines formed from the point of air injection into the duct. The re-shaping of the bottom of the fuselage as shown, may also be applied to FIGS. 61, 62. It should be mentioned that re-shaping of the bottom fuselage as shown in 6303 may in itself achieve sufficient reduction of the momentum drag, so that such re-shaping means as shown in 6303 may be employed independently in said duct, without reverting to any need for auxiliary air.

FIGS. 64a and 64b illustrate the clearances between the rotor blades and the duct wall and the vertical louvers of the forward duct configurations which were shown in FIG. 32f and FIG. 32g. It should be noted that in FIGS. 32f-g the vertical louvers are called vertical supports. It should be appreciated that the term vertical when used to describe the support or the louvers is presented as an example of one embodiment of the present invention and means substantially vertical with respect to eh transverse axis of the vehicle and aligned with the longitudinal axis of the duct, but there are other embodiments of the invention where the louvers are not vertical. FIG. 64a illustrates the vertical louvers 6401 in an open position allowing for external air inflow 6402 through slots 6403 at the opening in the side wall of the duct 6404. The forward position of the duct inner surface may be typically curved, for example circular. It should be noted that for realizing a better vehicle lift augmentation via the duct, it is desirable to have the clearance D1 between the tips of the rotor blade 6105 and the inner wall 6406 of duct as minimal as practicable, preferably approximately 1% of even less of the blade radius. Also, it is preferred that the tips or edges 6407 of the vertical louvers should be prevented from penetrating the inner duct wall surface line 6406 into the inner duct rotor area so that they will not get too close to, nor collide with the turning rotor blades. The position of the vertical louvers 6401 in the duct wall is influenced by the length of their respective chords C1, which is the distance between the front or leading edge and the aft or trailing edge of the louvers, and the position of their pivoting hinge or axis 6408. Normally, for louvers in shapes such as vanes, airfoils, stream lined struts or plates, whether flat or curved (as can be the case described herein), the location of the pivoting axis would preferably be within the cross section area of the louver and with distance at approx 25-30% of the chord when measured from the front or leading edge of the chord as shown at 6408. This is the location where the hinge moments and hence actuation loads required to rotate the louvers are minimal.

FIG. 64b illustrates the vertical louvers 6401 in a closed position after being rotated around their axes to the position shown, and not allowing external airflow between the vertical louvers. Due to the location of hinge axis 6408 in the duct wall, a cavity or recess with depth D2 is created between the wall line 6409 formed by the array of the closed vertical louvers and the duct inner wall surface line 6406. This cavity disturbs the smoothness of the airflow in the duct, with an increased clearance equal to D1+D2 between the tips of the rotor blades 6405 and the said cavity wall line 6409 formed by the closed louvers. This arrangement, however, has a detrimental effect on the lift augmentation provided by the duct entrance lip which is at the inlet to the duct above the area of said cavity due to higher than minimal rotor blade tip clearance which causes pressure losses and reduced rotor effectiveness and hence reduced suction of the air flowing in and over the duct lip above the cavity when the louvers are in the closed position.

FIG. 65a illustrates a different configuration of the vertical louvers shown in FIG. 64a whereas the pivotal axes 6508 of vertical louvers 6501 are positioned towards the trailing edges 6507 of the louvers and placed as close as practicable to the inner wall surface line 6506 of the duct, allowing for airflow 6502 through the opening and having the clearance D1 between the tips of the rotor blades 6505 and the inner wall 6506 of duct 6504. FIG. 65b illustrates the vertical louvers 6501 of FIG. 65a in a closed position, substantially not allowing external airflow through the opening. Due to shifting of the pivotal axes 6508 to their new position, the cavity with depth D2 which was shown in FIG. 64b is now substantially minimized or eliminated, providing a smoother and more uniform airflow as well as maintaining the minimal distance D1 to rotor blade tips and thus increasing the effectiveness of the rotor fan to create the necessary pressure differential to sustain the high speed flow into the duct in the area above said cavity thereby increasing the suction caused by the inflow to the duct over the duct entrance lip, and thereby improving the conditions for continued lift augmentation of the duct entrance lip at the inlet to the duct above the area of said vertical louvers.

FIG. 66a and FIG. 66b demonstrate an alternate method to that shown in FIG. 65a and 65b to achieve a similar 'no-cavity' and smooth flow effects as described hereinabove, in which the pivotal axes are located outside of the cross section area of the vertical louvers. FIG. 66a illustrates vertical louvers 6601 combined with extensions 6609, such as base levers or plates attached to the top and bottom sections of the vertical louvers such that the pivotal axes 6608 of the combined vertical louvers are located on the extensions and offset from the louver's chord line. Such offset hinge at 6608 is advantageous compared to the hinge located at the trailing edge of the vertical louver as shown at 6508 in FIG. 65a especially with respect to the extension providing more room to install the mechanical parts, such as, for example, the fastener or the pin which hold and pivot the hinge relative to the trailing edge axis location where the local thickness of the vertical louver, especially if airfoil shaped, may be insufficient to place and support the necessary mechanical parts. In an example of this embodiment the extensions are shaped as small and thin as practicable in order to minimize their drag and allow for bigger opening hence more space for air inflow between them. FIG. 66b illustrates the combined vertical louvers of FIG. 66a when rotated to closed position forming a wall substantially tangent to the inner wall surface line 6606 of the duct, minimizing or substantially eliminating the clearance D2 shown in FIG. 64b, so that the clearance D1 between the tips of the rotor blades 6605 and the duct inner wall surface line 6606 becomes substantially uniform over the circumference of the duct with similar advantages to those described hereinabove.

FIG. 67a illustrates a configuration similar to that shown in FIG. 65a used for the aft duct whereas the direction of the airflow 6702 is from the inside of the duct towards outside and the pivotal axes 6708 are located at the leading edge of the vertical louvers as close as practicable to the inner surface line 6706 of the duct. FIG. 67b describes the duct shown in FIG. 67a when the vertical support louvers 6701 are in closed position minimizing or substantially eliminating the clearance D2 described in FIG. 64b leaving the clearance D1 substantially small and uniform around the circumference of the inner duct surface 6706, with similar effects to those described for the forward duct of FIG. 65b.

Figures 68A, 68B:
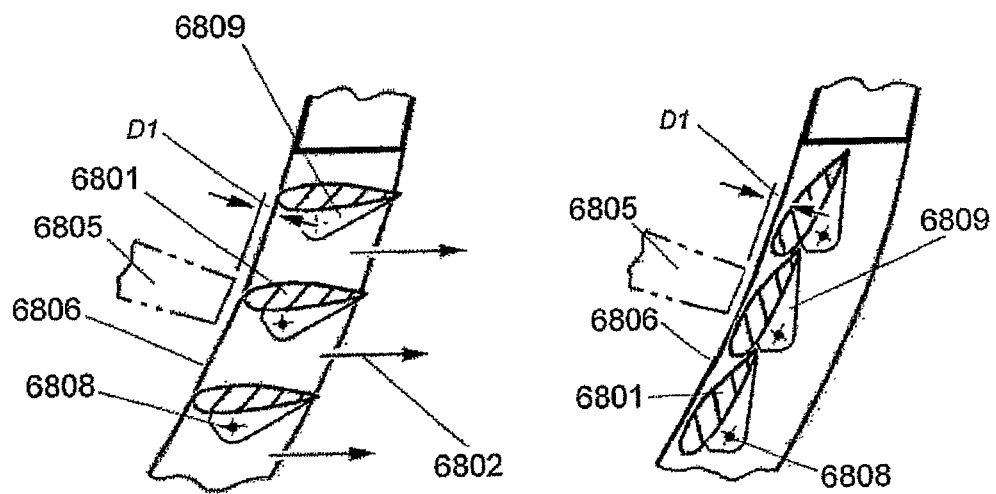
FIGS. 68a and 68b illustrate the configurations of FIG. 64a and FIG. 64b applied to the aft duct.

FIG. 68a illustrates a configuration similar to that shown in FIG. 66a used for the aft duct whereas the direction of the airflow 6802 is from the inside of the duct towards its outside and the pivotal axes 6808 are located on the extensions 6809 of the vertical louvers. FIG. 68b describes the duct shown in FIG. 68a when the vertical louvers are in closed position forming a wall substantially tangent to the inner wall surface 6806 of the duct minimizing or substantially eliminating the clearance D2 shown in FIG. 64b, so that the clearance D1 between the tips of the rotor blade 6805 and the duct inner wall surface line 6806 becomes substantially uniform around the circumference of the duct with similar minimal or substantially no cavity and smooth flow effects to those shown for the forward duct of FIG. 65b and FIG. 66b described hereinabove.

FIGS. 69a-g illustrate the use of the vertical louvers within the duct walls to produce control power which may complement, or partially substitute for, the control power of the main control vanes of the vehicle. Such main control vanes at both the inlet and exit sides of the ducts are shown as 1718 and 1717 of FIG. 17 and 1809 and 1810 for the forward duct and 1811 and 1812 for the aft duct of FIG. 18. When air flows through them the main control vanes can produce control powering roll yaw and lateral motion of the vehicle which magnitude is proportional to the square of the flow velocity through said vanes hence the quantity of air that passes through them. For each duct when the two cascades of control vanes in the inlet and exit sides of the duct are pivoted in opposite directions, they produce a rotary moment about the transverse axis of the duct in one direction; when they are pivoted in the same direction, they produce a side force in one direction. When the vehicle is in forward flight and air is flowing through the openings in the side walls of the ducts and in case their vertical louvers are rotated to 'open' position as described hereinabove the airflow through the main vanes in the vicinity of the said side walls openings is reduced since part of their total airflow through the duct bypasses the duct upper entrance and enters directly through the side openings and therefore the main upper control vanes have less air to work with, consequently exhibiting less control power than before the louvers were opened up.

FIG. 69a illustrates as an example a vehicle with two ducted fans with main control vanes 6930 in the upper inlet side of the forward duct and 6932 in the upper inlet side of the aft duct.

FIG. 69b illustrates a side view of the vehicle shown in FIG. 69a with main control vanes 6931 in the lower exit side of the forward duct and 6933 in the lower exit side of the aft duct.

FIG. 69c illustrates Section D-D of FIG. 69a with an area 6920 of reduced flow through main control vanes 6930 at the inlet side of the forward duct due to the airflow 6909 now entering through the opening in the side wall of the duct. FIG. 69d illustrates Section C-C of FIG. 69a with area 6922 of reduced flow through the main control vanes 6933 at the exit side of the aft duct due to the airflow 6909 now flowing through the opening in the side wall of the aft duct.

Figure 69G:
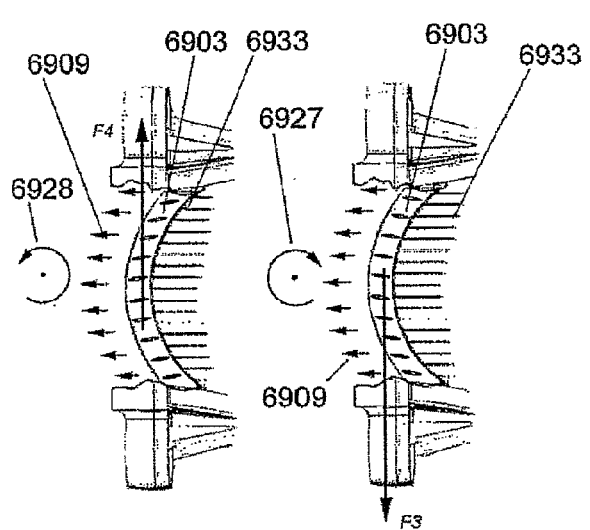
Figure 69F:
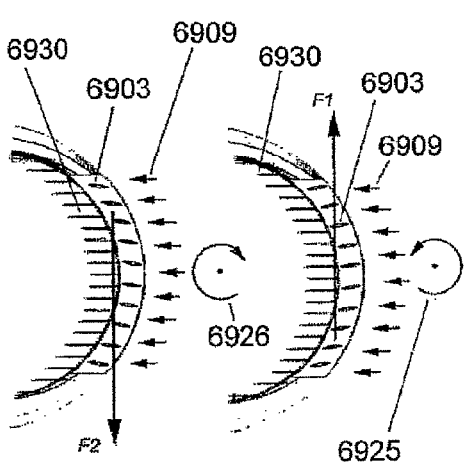
Figure 69E:
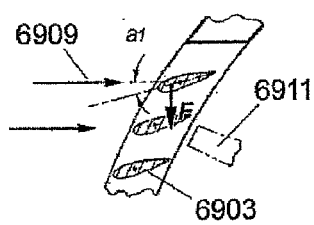

FIG. 69e illustrates the ability of the vertical louvers in the duct walls to produce control forces. Since vertical louvers such as described hereinabove have surface areas and rotation capability, they can generate control forces when in an open position with air is flowing through them. In forward flight, when the vertical louvers 6903 is rotated to angle a1 relative to the airflow 6909 a control force F is produced. It should be appreciated that in order to avoid fluid separation and stall situation, the vertical louvers are preferably rotated to angle a1 approximately up to 10-12 degrees to either side of the direction of the airflow 6909. The same principle of producing control force applies also to the aft duct when the vertical louvers are rotated to angle relative to the airflow through the opening in the side of the duct.

It should be further appreciated that the ability to generate control forces as shown in this example applies to vertical louvers with various shapes and hinge locations such for example as flat plates or with hinges located at the edge of the louvers.

FIG. 69f illustrates section B-B of FIG. 69b where the vertical louvers 6903 of the forward duct are pivoted in counter clockwise (CCW) direction 6925 about their respective axes. In this position, they produce a control force in the direction of F1. When they are pivoted in the opposite clockwise (CW) direction 6926 about their respective axes with same through airflow 6909, they produce a force in the direction of the F2 opposite to that of F1.

FIG. 69g illustrates section A-A of FIG. 69b and the same principles described for the forward duct in FIG. 69f exist also for the aft duct. Thus, the airflow 6909 through the vertical louvers 6903 when rotated in CW direction 6927 produce control force F3 and when rotated in CCW direction 6728, produce control force F4 opposite to F3.

Figure 70D:
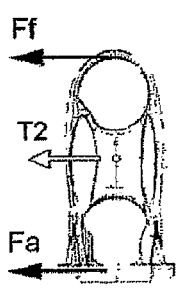
FIGS. 70a-d illustrate the effects of the vertical louvers control forces on the vehicle.
Figure 70C:
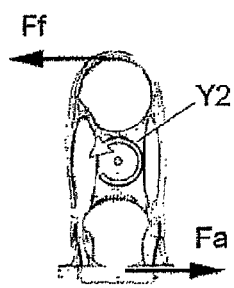
Figure 70B:
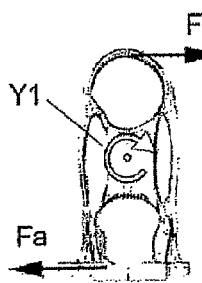
Figure 70A:
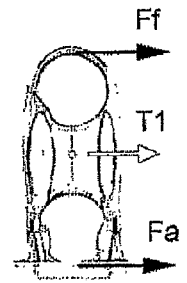

FIGS. 70a-e illustrate examples of resulting effects on the vehicle from various combinations of the forces generated by the vertical louvers at the forward and aft ducts as demonstrated in FIG. 69f and FIG. 69g. In FIG. 70a and FIG. 70d both forces of forward duct Ff and of aft duct Fa are in the same direction and therefore yield lateral or side control forces T1 and T2 respectively. In FIG. 70b and FIG. 70c the forces Ff and Fa are in opposite direction to each other and therefore yield yaw control moments Y1 and Y2 respectively.

It should be appreciated that the forces produced by the vertical louvers as described hereinabove can contribute to control two degrees of freedom, the substantially lateral movement and yaw of the vehicle, and by this they can assume and remove some of the burden of control in these two degrees of freedom from the main control vanes of which total control power was reduced due to the reduced airflow at the vicinity of the side wall openings, thus leaving the main control vanes enough power to substantially perform other control requirements such as pitch or roll. This use of the vertical louvers to substitute, add or complement control power can be used for either the forward or the aft ducts or for both.

Figure 71:
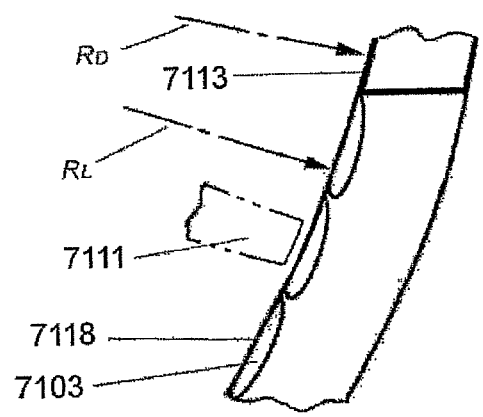
FIG. 71 illustrates an alternate shaping of the vertical louvers to improve airflow in the duct.

FIG. 71 illustrates the shaping of the surface of the vertical louvers 7103 facing the inside of the duct as a curve with radius R1 substantially same as radius Rd of the duct in order to align the inside facing wall 7118 created by the vertical louvers when rotated to closed position with the inside wall of the duct 7113, thereby further improving the uniform airflow in the duct hence the smoothness of the flow and the lift augmentation of the duct.

It should be further appreciated that the vertical louvers described hereinabove can rotate either individually or in groups or in arrays or partially and also they can be combined with nonpivotal means that are used to control flow. Such nonpivotal means may employ aerodynamic means other than rotation to modify the pressure field around the vertical louvers for creating a force, such as air suction or blowing through orifices on the surface of the vertical louvers or piezoelectric actuators or vibratory oscillators or other fluidic control means to induce steady or periodic pressure field changes to the flow around the vertical, all with the purpose of producing desired control force or rotary moment control force.

Figure 72A:
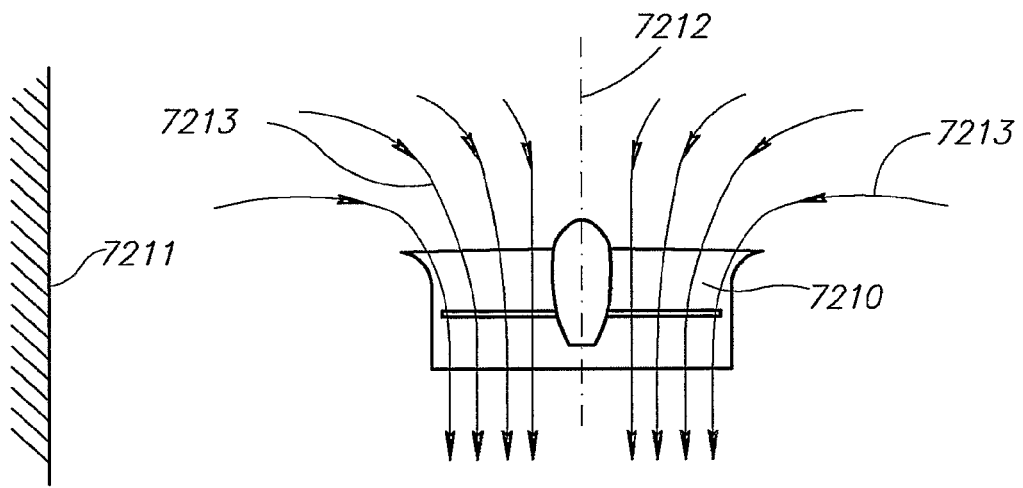
FIGS. 72a-f illustrates effects of an object located beside a ducted fan vehicle.
Figure 72B:
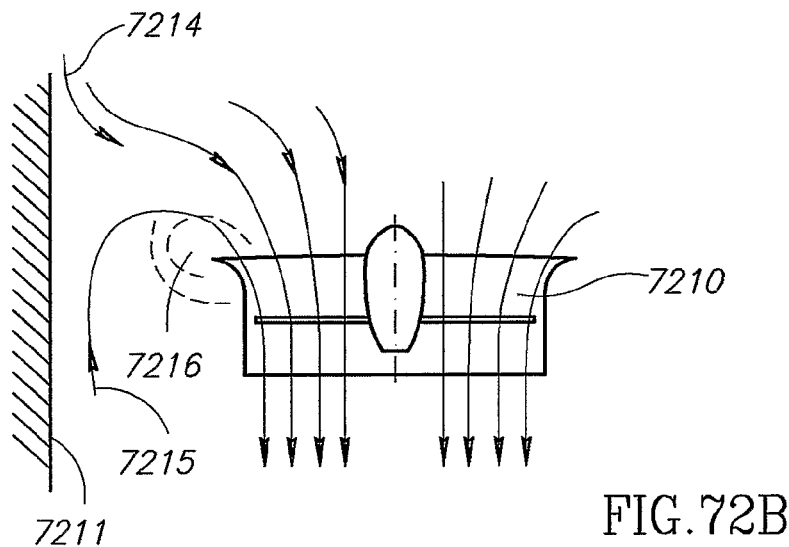
Figure 72C:
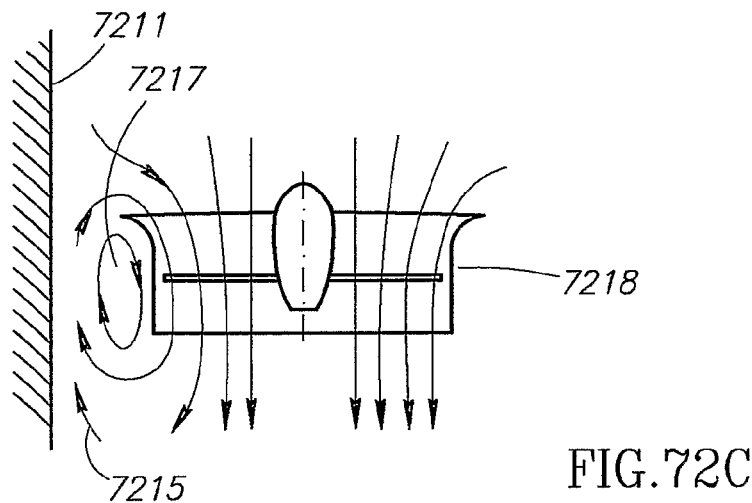
Figure 72D:
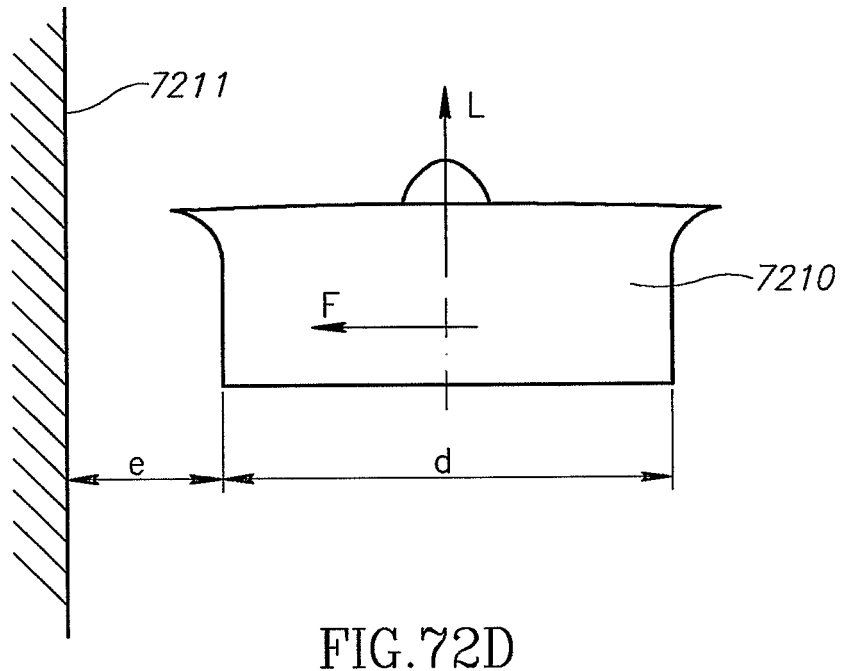
Figure 72E:
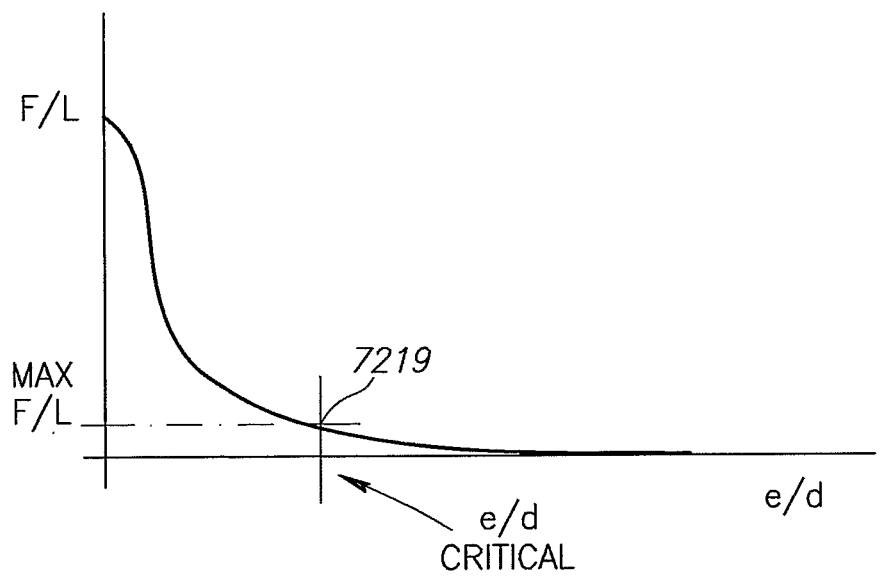

FIG. 72a-c illustrate schematic airflows in and around ducted fans and vehicles hovering at various distances from an object. Such object can be a wall a window, a cliff, a vehicle or any other static or moving object or matter which has a surface area. It has been observed that when the ducted fan gets close to an object it is attracted to the object. FIG. 72a demonstrates a ducted fan 7210 at distance far away from an object 7211 in which case the airflow 7213 through the duct is substantially symmetric at the two sides of the duct relative to its longitudinal axis 7212. In FIG. 72b the duct 7210 approaches the object 7211 which interferes with the free flow of air by the side of the vehicle close to the object. As air does not flow through the object, a portion 7214 of the air flows towards the duct substantially from the upper part of the object and a portion 7215 flows as rising airflow substantially from the lower part. Also a low pressure area 7216 is created near the entrance to the duct. FIG. 72c illustrates a closer distance between the object and the duct whereas the airflow 7215 from below may create a vortex 7217 or some other air acceleration characterized by local pressures which are lower than the static ambient conditions that prevail on the other side 7218 of the duct that is far from the object. As result of this difference in pressures that prevail on the two sides or walls of the vehicle or duct, one close to the object and the other far from the object, a force F is generated as illustrated in FIG. 72d which is inclined to draw and suck the vehicle towards the object. This attraction towards the object increases as the distance e between the object and the duct decreases; additionally, a substantially Venturi Effect that may be created between the vehicle and the object contributes to this attraction as well. The lift force acting on the duct is designated L. FIG. 72e illustrates the characteristic behavior of the force F normalized with respect to duct lift L relative to the distance ratio e/d. Point 7219 is a critical point substantially at value of 0.2-0.4 from where the non linear increase of F/L over e/d begins to rise sharply.

Figure 72F:
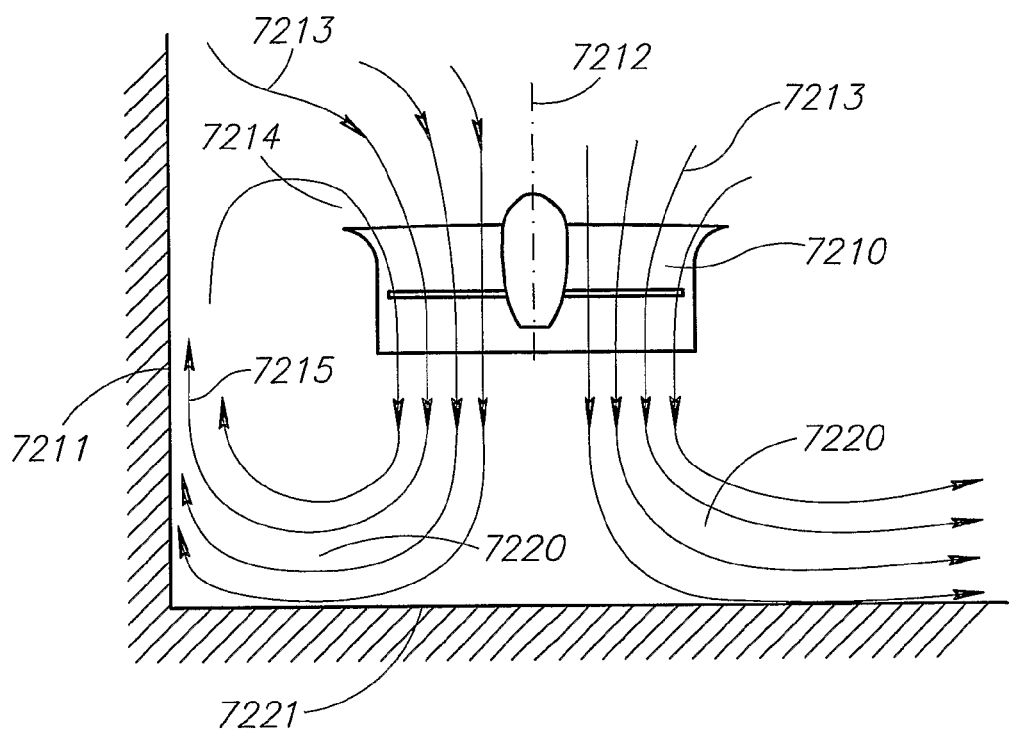
Figure 72G:
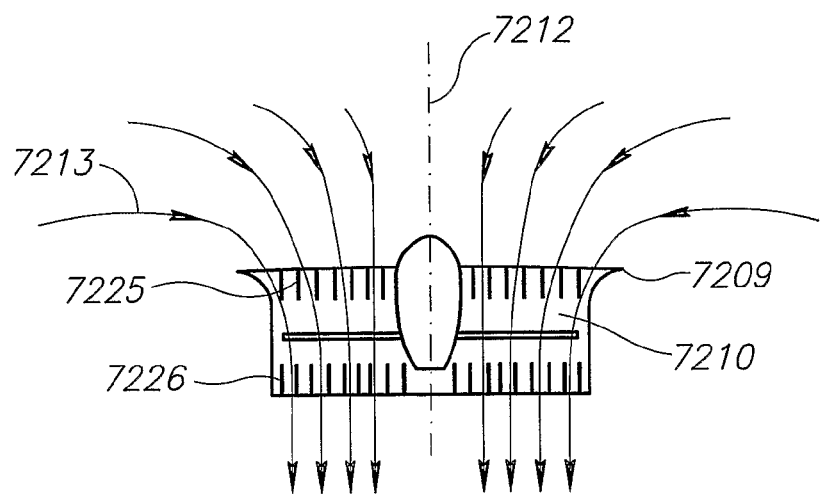
FIGS. 72g-k illustrate ducts with control vanes in various airflows and controls henceforth.
Figure 72H:
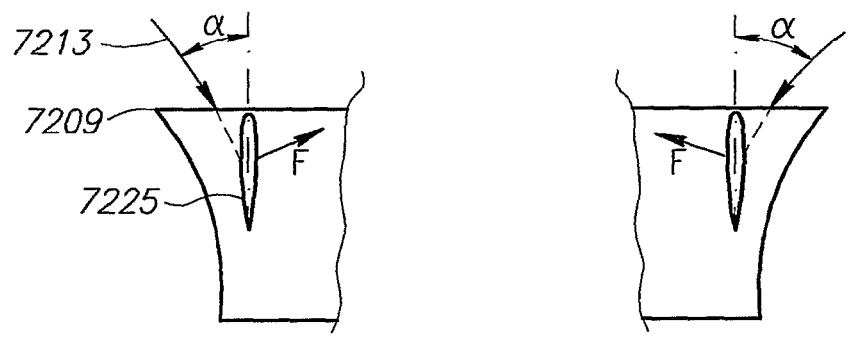
Figure 72I:
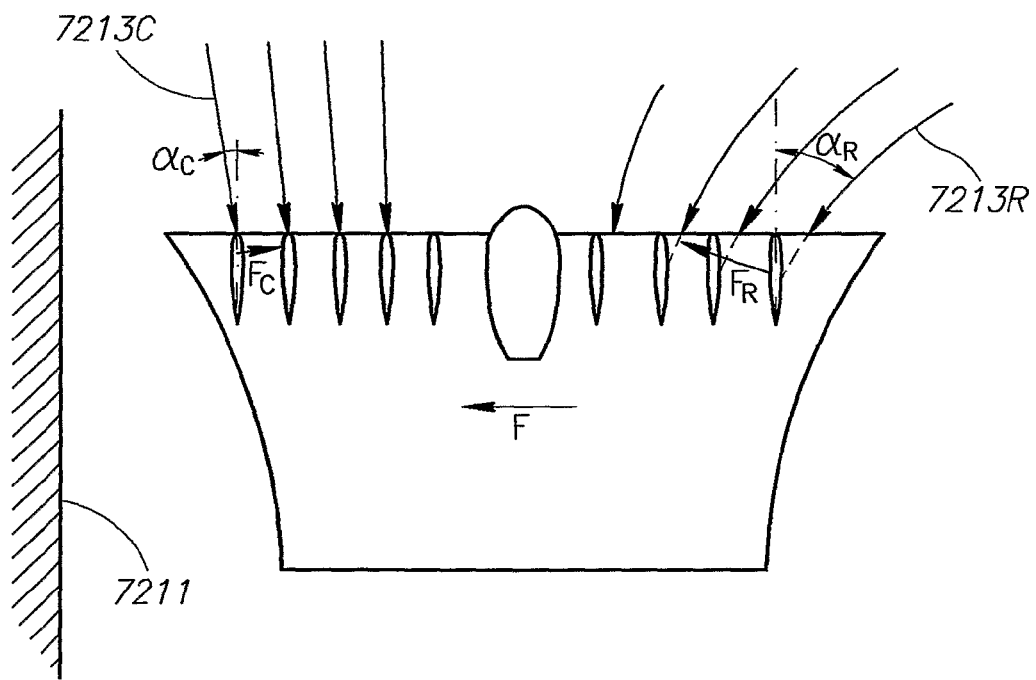

FIG. 72*f* illustrates the vehicle 7210 hovering in the vicinity to an object with corner shape surfaces with wall 7211 and floor 7221. As the airflow 7220 which exit the duct approaches the floor 7221 it preferably flows in outwardly manner, and as it continues to flow at the side close to the object it then approaches wall 7211 and thus is being shifted upwards further affecting the upstream airflow 7215 which was shown in FIGS. 72*b-c*, hence the attraction force F. FIGS. 72*g-h* schematically illustrate vanes 7225 installed at the inlet side of a duct for purpose of controlling the vehicle. FIG. 72*g* illustrates the airflow 7213 at the inlet of duct 7210 when it is remote from an object. The airflow 7213 towards entering the duct is inclined outwards like a funnel at the edges or lips 7209 of the duct and straightens towards the center of the duct to become substantially parallel to the longitudinal axis 7212 of the duct. FIG. 72*h* illustrates the detail of airflow 7213 stream lines when hitting a vane 7225 at angle of attack α thus creating force F on the vane. Due to the substantially symmetrical airflows 7213 over the duct there is also symmetry between forces F on the vanes at opposite sides of the duct having equal size and opposite directions hence they cancel each other to zero equivalent horizontal component of forces F on the duct. When the duct gets closer to an object as illustrated in FIG. 72*i* the airflow 7213*c* which is close to the object is tilted and becomes substantially aligned with the object wall 7211 at angle of attack αc, unlike the airflow 7213*r* at the side remote from the object which is substantially unaffected by the object wall and therefore remains inclined at angle αr similar to the original angles of attack α shown in FIGS. 72*g* and 72*h*. Since αr is greater and in opposite direction than αc the corresponding force Fr is grater than Fc and hence the equivalent of the horizontal components of the forces on the vanes yield a horizontal force F directed towards the object which pushes the duct towards the object. It should be appreciated that similar effect may apply also to other various arrangements and types of vanes such for example as tilted vanes described in FIG. 17 herein above, or to non pivotal or other vanes. Some flow asymmetry due to the vicinity to the object may also affect the vanes 7226 placed at the exit side of the ducts in a manner similar to that described above for the entrance to the duct.

Figure 72J:
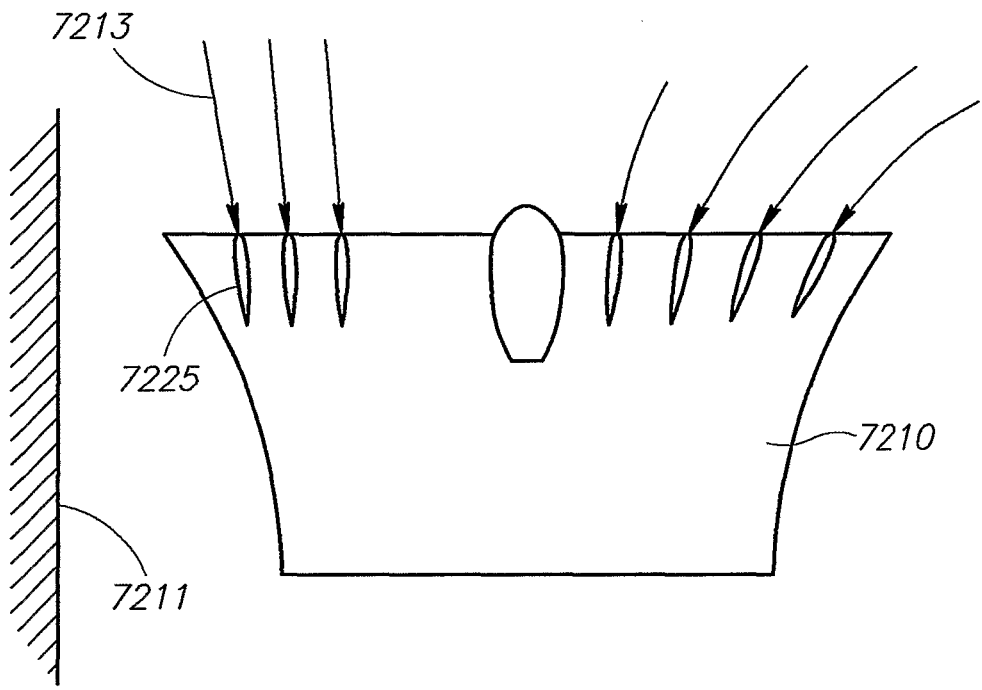
Figure 72K:
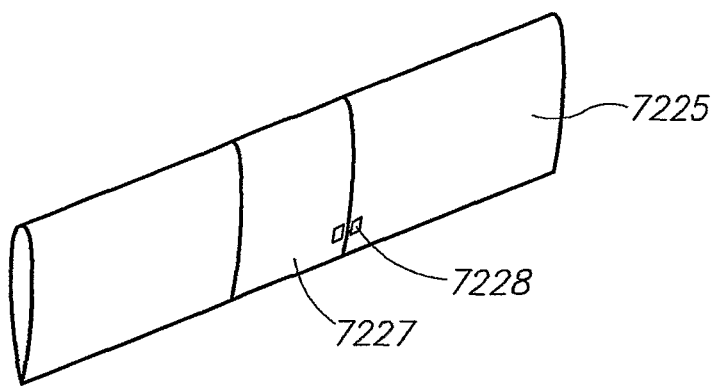

FIG. 72*j* illustrates a ducted fan 7210 where the vanes 7225 are oriented to align with the airflow stream lines 7213 over the duct, which results in angles of attack close or equal to zero hence reducing the side forces F to substantially zero. The alignment of the vanes varies according to the variation of the airflows in order to keep the vanes substantially parallel to the stream lines at different situations. In FIG. 72*j* for example the vehicle is near an object whereas the proximity to the object wall 7211 creates non symmetric airflow stream lines over the ducts as explained herein above, but due to the possibility to align the vanes that are remote from the object the attraction force toward the object is substantially minimized or eliminated. On the other hand in previously shown FIG. 17 and its Section A-A the alignment to the airflow stream lines is symmetric to both ends of the duct. In most typical cases the alignment of the vanes is achieved either by mapping the airflow stream lines or field either predetermined or by real time sensing devices, and selectively pivoting the vanes accordingly. For example, FIG. 72*k* illustrates one of the preferred embodiments of a vane 7225 with sections of which a portion 7227 is independent of the rest of the vane and connects to transducer 7228 and can act as sensor to monitor the angle of attack on the vane thus move the vane to 'zero' angle aligned with the airflow. This independence can be achieved by 'free' flag like motion of the portion 7227 relative to the vane 7225 or by other method. The measuring of the angle of attack on the vane and activation can be measured by other means as well.

Figure 38:
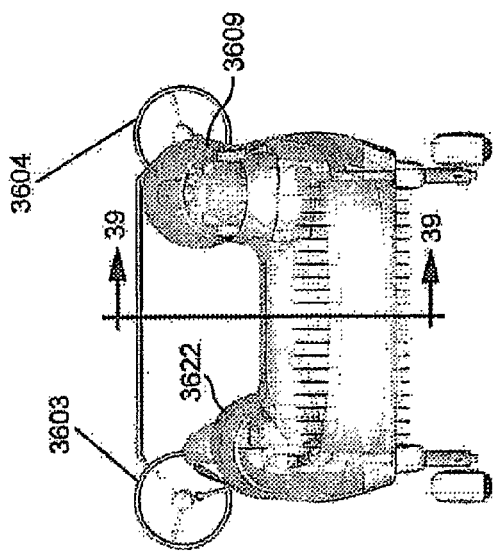
FIG. 38 is a front elevation view of the vehicle shown in FIG. 36.
Figure 37:
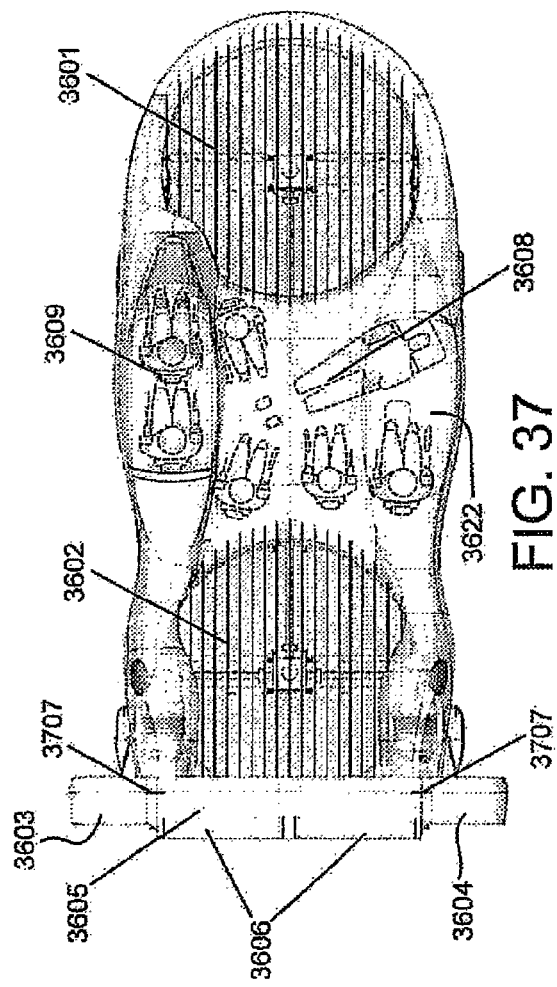
FIG. 37 is a top plan view of the vehicle shown in FIG. 36.
Figure 73A:
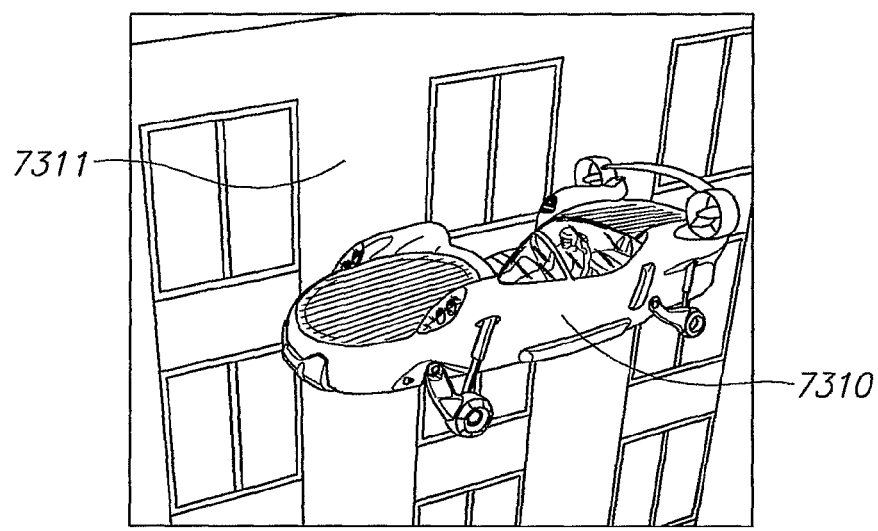
Figure 73B:
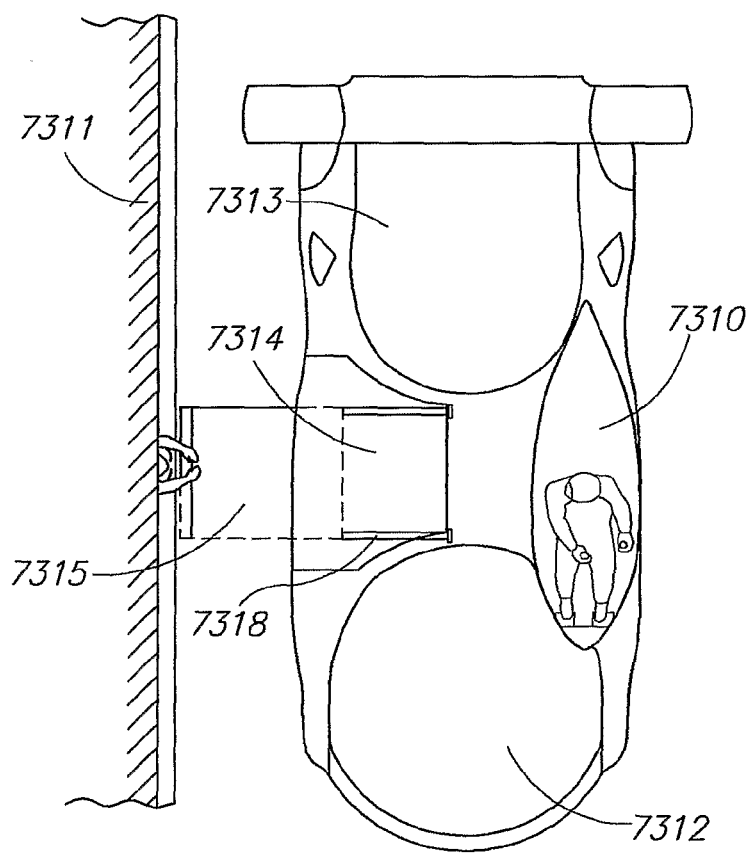
Figure 73C:
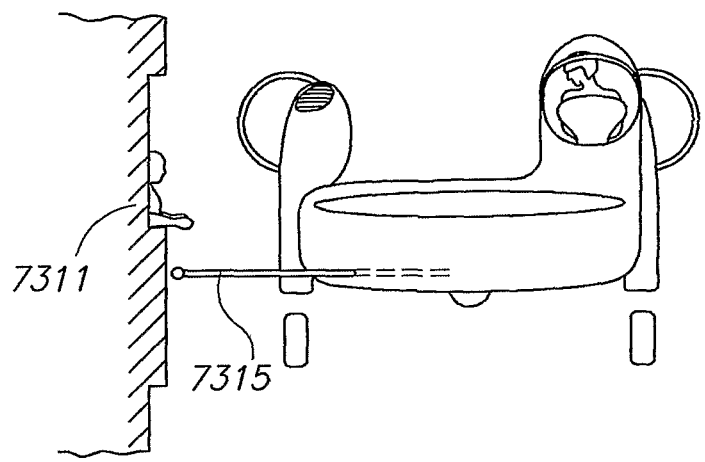
Figure 73D:
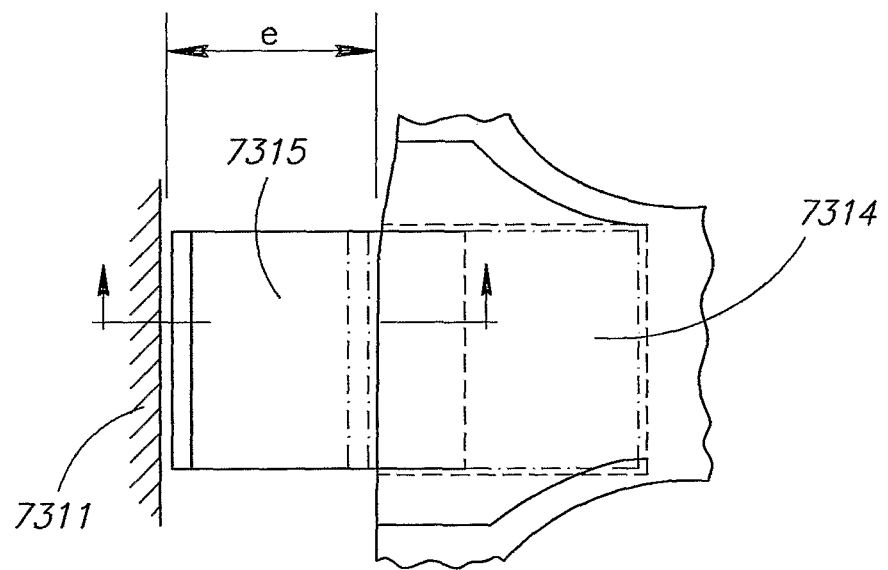

FIGS. 73*a-g* illustrate a vehicle similar to the vehicle illustrated in FIGS. 36-38. In FIG. 73*a* the vehicle 7310 is hovering close for example to a building window 7311 to rescue persons from the building or for embarking persons into the building or deliver equipment to or from the building or performing a job related or adjacent to the building. FIGS. 73*b* and 73*c* illustrate top and front views of the vehicle 7310 hovering close to an object 7311, for example a building wall and a schematically shown separator 7315 extended from the vehicle preferably from the payload bay area 7314 towards the wall preventing the vehicle from being drawn into the wall. The separator 7315 counters the attraction force F toward the object as explained in FIG. 72. FIGS. 73*d-f* schematically illustrate the separator in extended and in retracted positions. FIG. 73*d* is a top view of the separator 7315 extended to distance e so as to avoid the vehicle from being drawn into the wall 7311, e being equal or greater than distance e at the critical point e/d as explained in FIG. 72*e*. FIG. 73*e* is a cross section of the side of the vehicle illustrating the separator 7315 in extended and in retracted positions whereas it retracts into a groove 7316 in the payload bay area 7314, and FIG. 73*f* is a cross section of the vehicle illustrating the separator in extended and in retracted positions whereas it retracts to below the payload bay area 7314. FIG. 73*g* is another example of mechanism of the separator sliding in a curve 7317 to retract into a groove 7316 which is lower than the separator plane when in extended position. It should be appreciated that the separator can be extended and retracted by various mechanisms such as telescopic extenders or pivotal axes or incline or fold, and also can remain in fixed extended position fully or partially, and can be operated by various control means such for example as electric, hydraulic or pneumatic actuators schematically shown as 7318 in FIG. 73*b*. It should be appreciated that the separator may have various shapes, sizes and forms and have additions such as a bumper 7328 installed at the edge for better contact and further protection from the object, as illustrated schematically in FIG. 73*g*. Since the extended separator may be hovering in substantially rising airflow environment or vortex as illustrated in FIGS. 72*b* and 72*c* it may be subject to directional forces such as upward acting force which might be detrimental to the maneuver and control of the vehicle. FIG. 73*h* illustrates a schematic separator 7315 with a grille or other substantially perforated surface 7319 which provides perforated flow or lattice to reduce these disturbances. It should be appreciated that the separator which is intended to prevent uncontrolled and undesired drift of the vehicle towards objects as explained hereinabove can also be utilized as walkway for people or ramp to move between the vehicle and the object. In such case the separator may be provided with railing, stepping surface or other convenience or safety devices. The preferred location of the separators when used also as walkway would be substantially in the payload bay area 7314 located between the forward duct 7312 and the aft duct 7313.

FIGS. 74*a-b* illustrate the deployment of additional schematic substantially plate like separators 7424 at the front and rear sides of the vehicle. This can attain some blockage of the rising airflow such as 7215 illustrated in FIG. 72*b* with the potential of reducing the suction force F attracting the vehicle to the object. In that case the airflow into the ducts will obviously increase from above the duct. The separators 7424 which can also be referred to as spoilers are especially advantageous when mounted next or by side to the front and rear ducts 7412 and 7413 respectively, where suction to the wall is maximal. It should be appreciated that for the separators next to the ducts there should be a folding or tilt mechanism such for example as illustrated in Section A-A since it is not desirable to retract the separators into the contour area of the ducts 7412 and 7413, as done with separator 7315 next to the payload bay 7314 area in FIG. 73. Section A-A shows schematically a single fold separator with hinge 7425 and a double fold separator with hinges 7425 and 7426 that when folded remain outside the contour area of the ducts. It should be appreciated that there can be other folding or tilting shapes and forms.

Figure 74C:
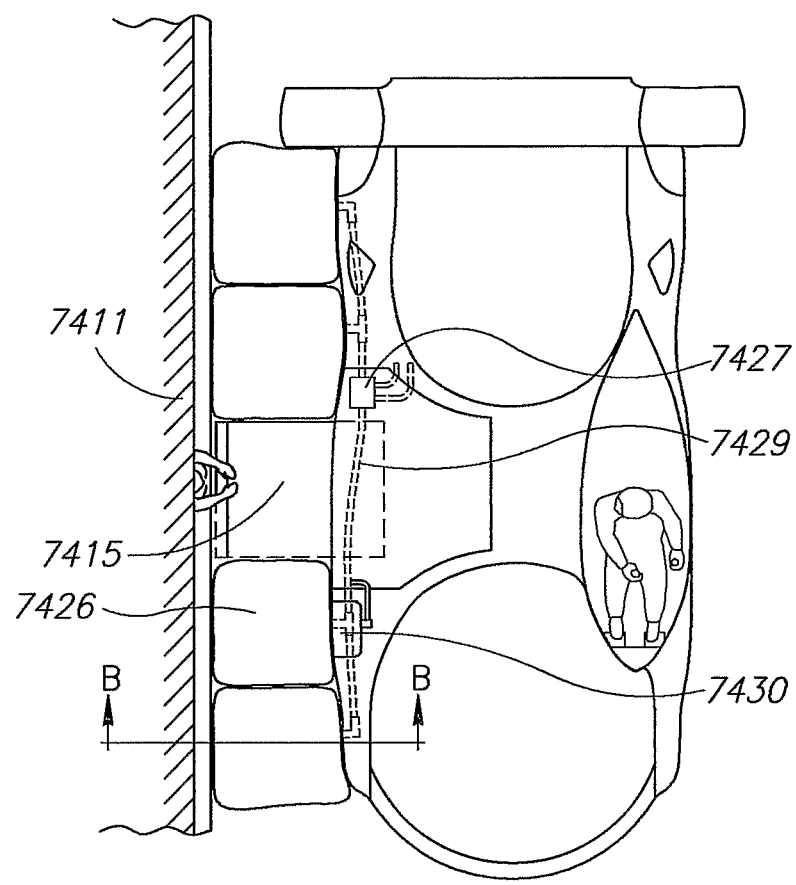
Figure 74D:
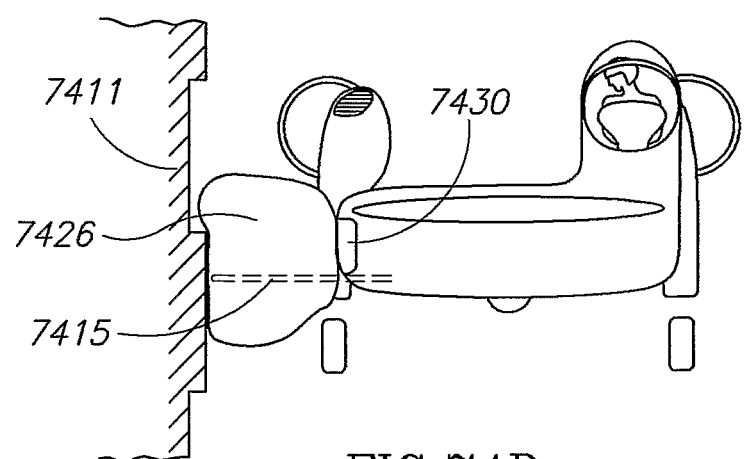

FIG. 74*c-d* illustrates a separator which is flexible and can fit and align better with the contour lines of the adjacent object. This can be achieved for example by separators of inflatable bags 7426 which can be inflated individually or severally by compressed air sources in the vehicle such for example as a compressor or electric pump, controllers and valve system 4247 connected to the separators by tubes 7429. The separators when deflated may collapse or fold into preferably shallow cavities or compartments 7430 which can be installed inside the wall of the vehicle or attached to its surface.

It should be appreciated that because the inflated separators are flexible they can adjust and seal the gap between the vehicle and the object substantially along the contour line of the object hence improve the blockage of upstream airflow compared to the less flexible hence less sealing rigid separator blocker 7424 shown in FIG. 74*a-b*. This causes the flexible separators to be more effective in reducing the attracting force F on the vehicle. Additional advantage of the flexible separators is their softer contact with the object whereas the suction force is distributed on a wider surface area thus reducing the potential damage on the vehicle or on the object from the contact between them.

It will be also appreciated that another advantage of the separator is to prevent debris to be thrown into the intakes of the ducts. As illustrated in FIG. 72*f* when the vehicle is substantially close to the ground the airflow 7220 when hitting the ground may rise and collect debris or other objects sucked from the ground and than turn it upward with flow 7215 to be eventually returned to the duct in airflow 7214 with potential of causing damage. Similarly it can carry debris from the object. The separators as explained hereinabove block the upstream airflow 7215 thus blocking the debris to continue its move upward and back into the duct.

Another means to prevent damage from debris or other flying objects into the duct or from disturbing or suffocating the airflow into it is to install a fender substantially in the form of a grille, net or other perforated device in the duct or above the duct at a distance from the duct, so as to block flying and intruding objects but allow airflow intake into the duct, for example when the flying object is a fabric or nylon sheet.

FIGS. 75*a-b* illustrate top and front views of vehicle 7510 with an alternative arrangement of the flexible separator where a tubular section 7532 is inflated along the side of the vehicle close to the object 7511. It will be appreciated that it can be combined also with other types of separators such for example as separator 7515 acting also as walkway as explained herein above.

It will be appreciated that when the separator besides being directed sideway towards the object wall is partially inclined or extended downward it may be possible to use it also for absorbing impact or preventing collision with the object floor. This additional feature of the separator can be advantageous for example in landing of the vehicle as anti collision fender or even to enhance or replace the landing gear of the vehicle.

Figure 75F:
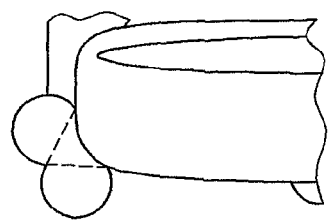

FIGS. 75*c-f* illustrate sections of various arrangements of the tubular separator. It should be appreciated that the said side force F acting on its side may cause deformation of the separator as illustrated in FIG. 75*c*. Similarly, in FIG. 75*d* vertical force G acting on its bottom may cause deformation in the corresponding direction. One of the preferred ways to overcome these deformations is by using arrays of multiple tubes as shown in FIG. 75*e* or a multi-compartments tube as shown in FIG. 75*f* allowing for improved rigidity through the multiple attachment points of the separator to the fuselage, lower height of the separators compared to that shown in FIGS. 75*c-d* and improved and direct load reaction by the vehicle's fuselage to the external forces F and G.

Figure 75G:
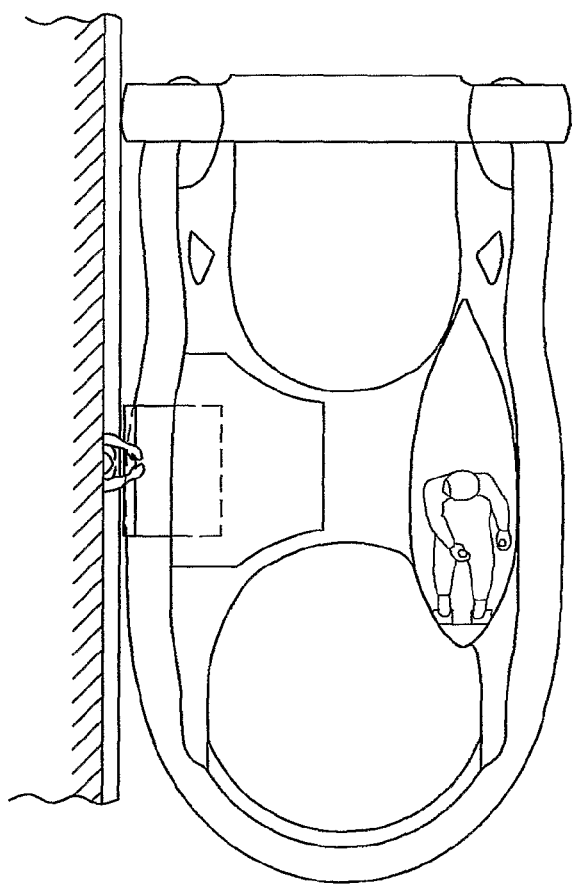

FIG. 75*g* illustrates another preferred embodiment of the vehicle 7510 whereas the flexible or the tubular separators encircle the vehicle including both sides and front and rear in which case FIGS. 75*c-f* apply to the circumference of the vehicle. This configuration enables the separators to cushion the vehicle in landing or absorb impact in emergencies and unexpected contacts in landing, docking or uncontrolled proximity to objects in various directions.

Another advantage of this configuration is the ability of the tubular separators to act as a flotation device for the vehicle, either for emergency ditching or as a normal provision to enable operation from water.

Figure 75H:
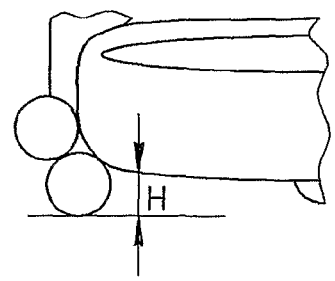

Another advantage of this configuration can be achieved when using the separators around the circumference also as skirting between the vehicle and the ground or water to enable operation in hovercraft mode, which typically requires substantially less lift power. This is possible when the vertical size H of the separator illustrated in FIG. 75*h* confirms with the required hovercraft skirt size for vehicles of this type.

It should be further appreciated that the separators may have various shapes, structure and cross sections in order to optimize their multifunction uses such as described herein above, for example they can be made of several parts to fit the different specific requirements for separation of the uprising airflow, for hovercraft skirt and for the anti collision bumpers. These parts fully or partially may be flexible also by means of employing absorbing material such as foam and not necessarily only through internally filled or compressed air.

Figure 76A:
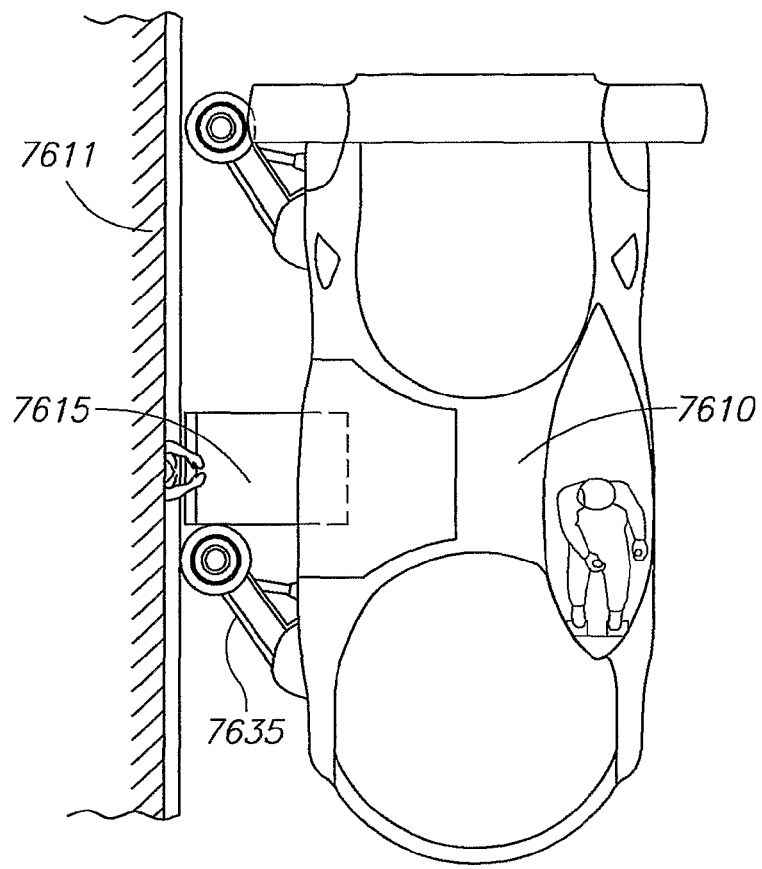
FIGS. 76a-e illustrate various landing gear positions and uses.
Figure 76B:
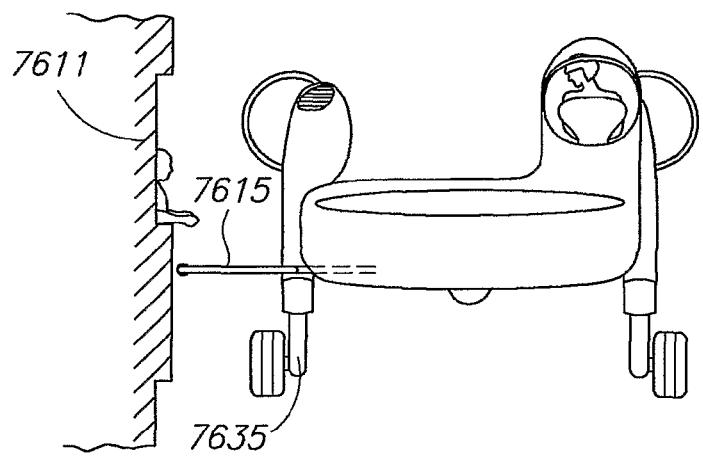
Figure 76C:
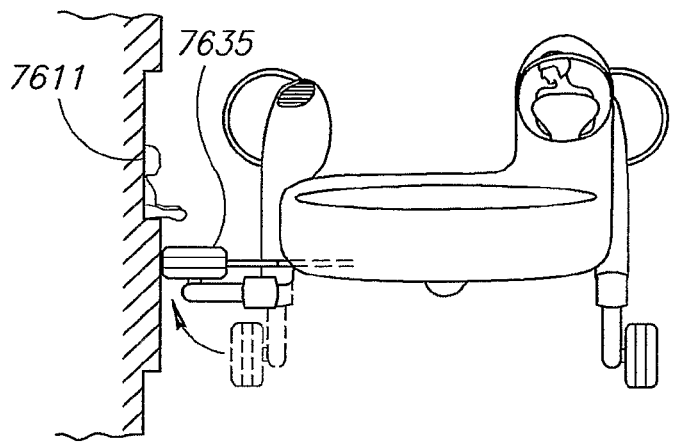
Figure 76D:
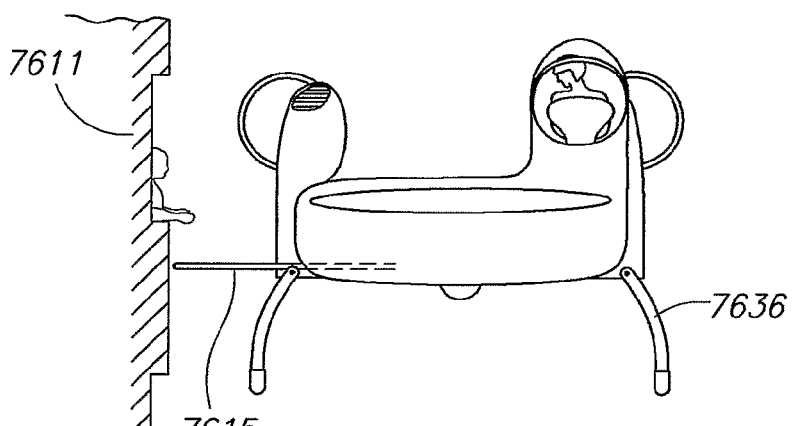
Figure 76E:
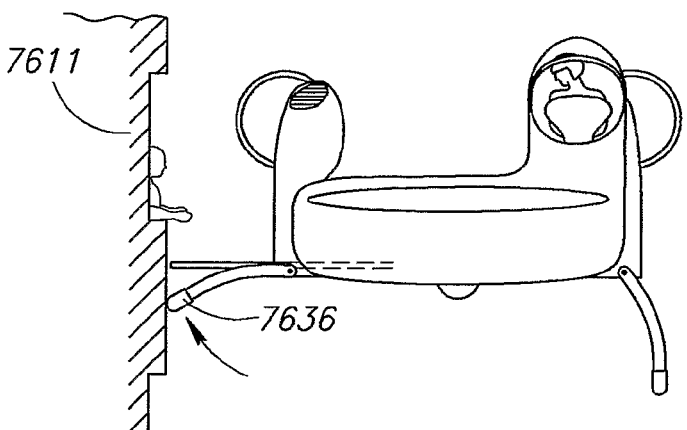

FIG. 76*a-e* illustrate various landing gears which can be also used as separators. Landing gears in air vehicles may be folding typically retraceable into the vehicle body or wing contour line to reduce drag during forward flight so that in takeoff and landing the landing gear is in substantially exposed position and during flight it is in fully or partially retracted position. FIG. 76*a-c* illustrate upper and front views of a ducted fan vehicle with wheels landing gear 7635. The landing gear can be shifted to 'separator position' where it is substantially perpendicular to the gear landing vertical position hence adding absorption force to the vehicle facing a side object 7611. FIG. 76*d-e* illustrates similar use of skid landing gear as separator wherein the skid 7636 is used for landing when tilted downward and as a separator when substantially horizontal. The side absorption mechanisms of the various gears may be similar to those of vertical landing, such as hydraulic, shock absorbers, structure frame, etc, so that another advantage of the invention described herein is the ability of the gears to support the vehicle in two planes or modes.

Figure 77A:
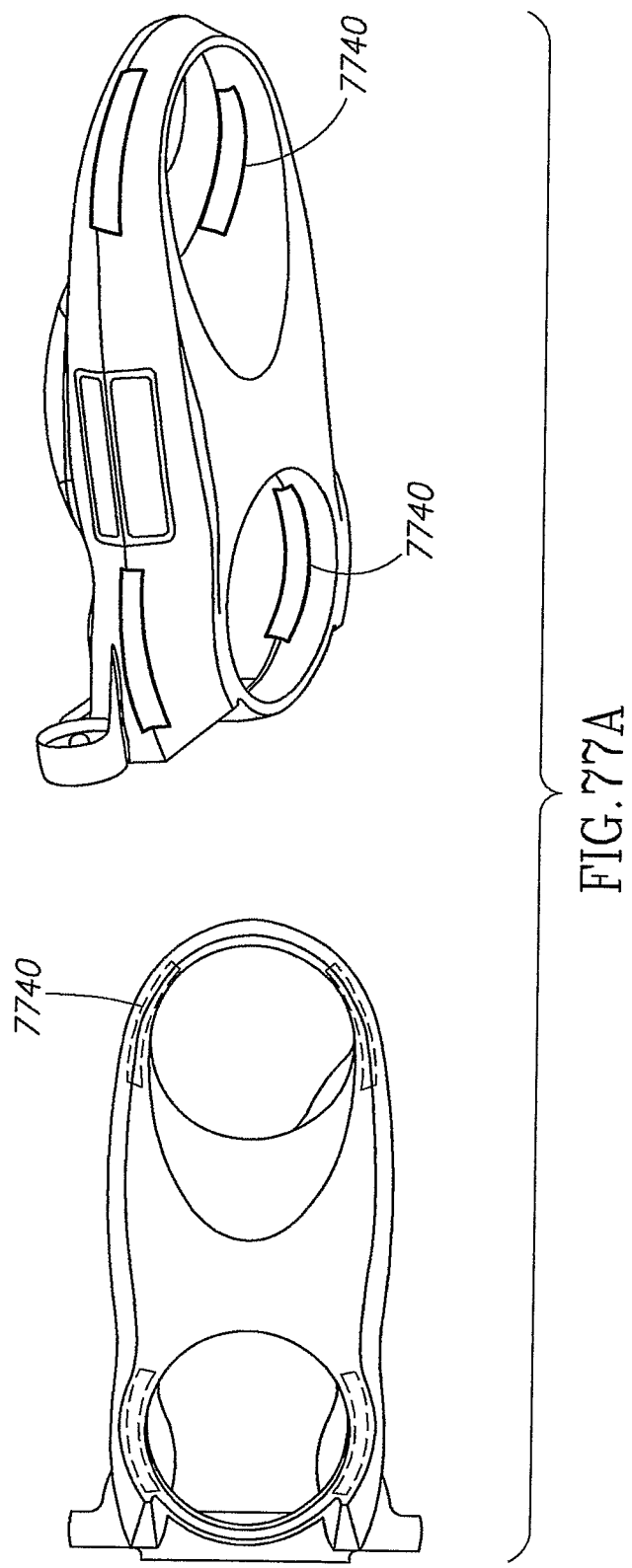
FIGS. 77a-c illustrate various openings in ducted fans.
Figure 77B:
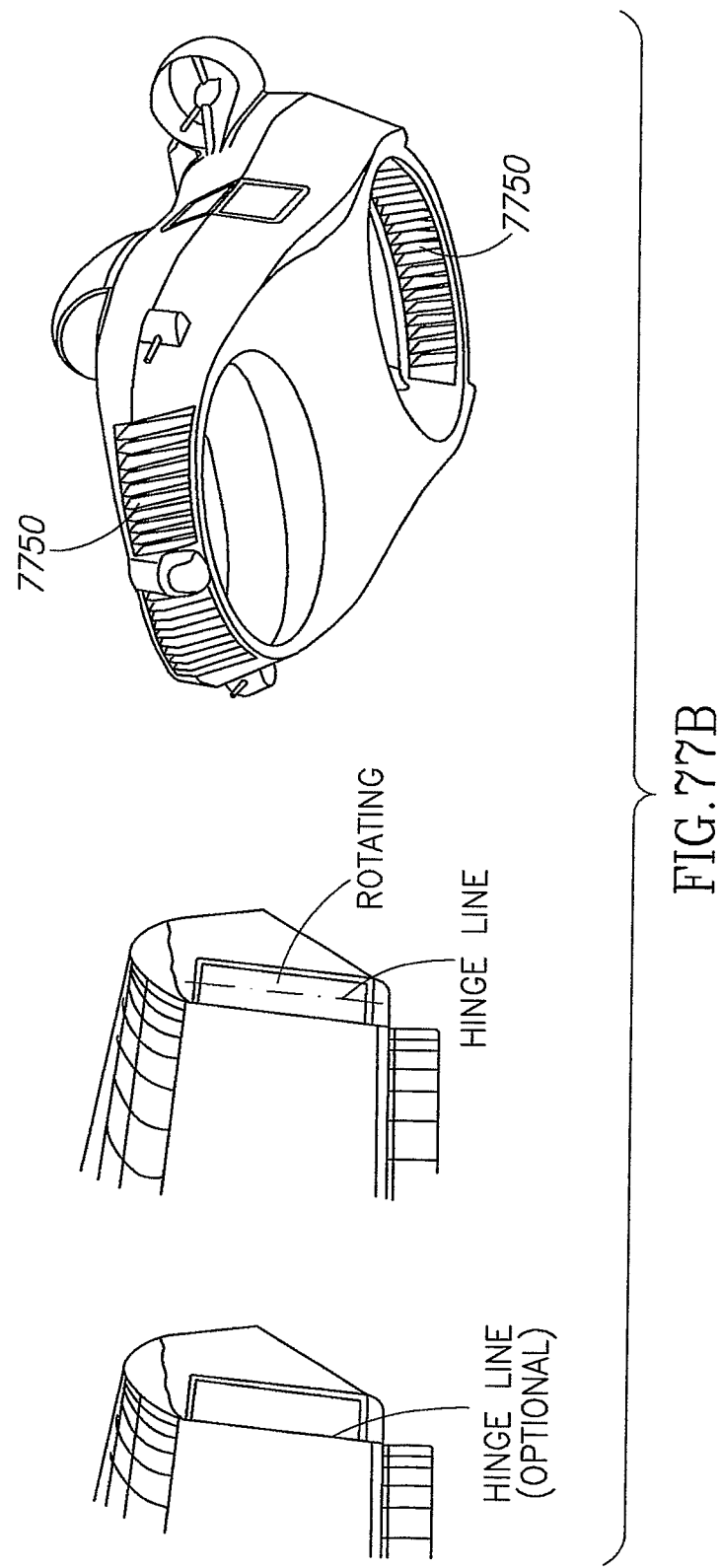
Figure 77C:
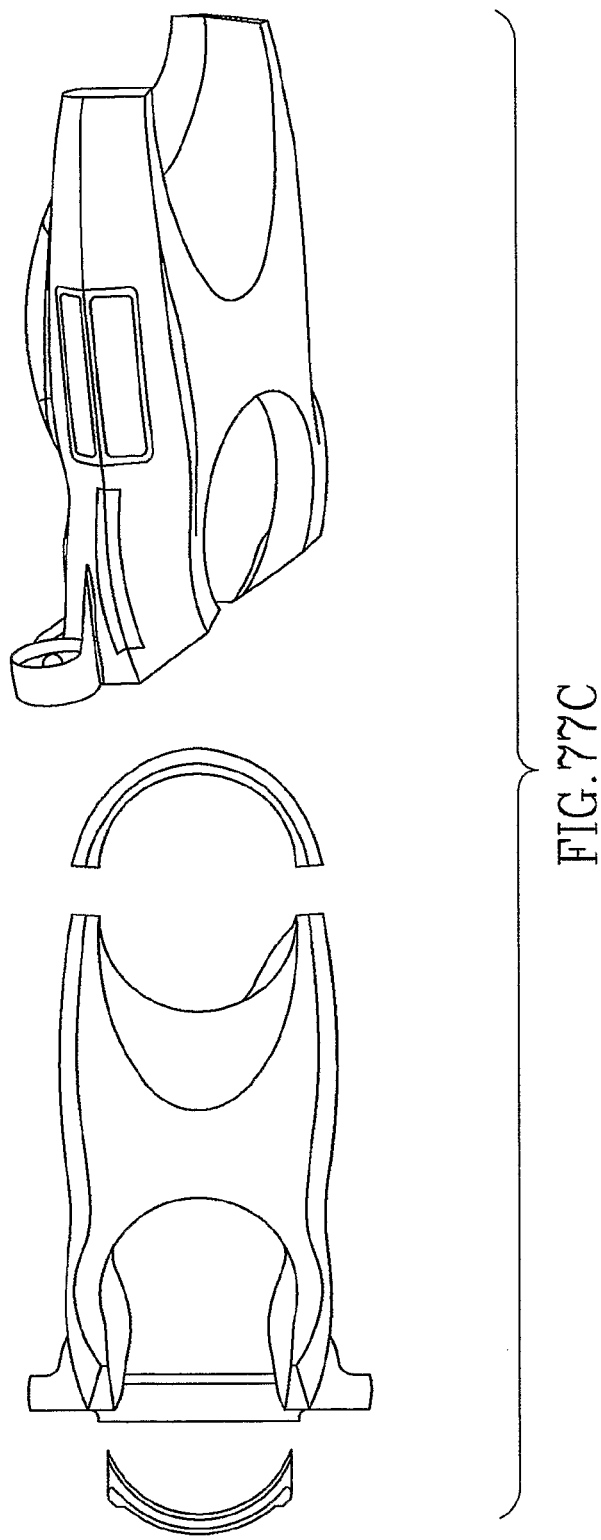

FIG. 77*a-c* illustrate a ducted fan vehicle in various configurations. The vehicle in FIG. 77*a* has two closed ducts with selectively operated openings 7740 at the side walls of the forward and or the aft ducts preferably between the planes of the upper and lower vanes. Such openings can be advantageous when the vehicle is facing side forces such as the attraction force F to an object described herein above, or when flying in gusty conditions being subject to substantial side forces. The potential benefit of these side openings is the reduction of the sensitivity of the ducted fan to side winds causing for example rolling moments. FIG. 77b illustrates various openings in the front of the forward facing duct and/or aft of the aft duct which can be of various sizes shapes and opening and closing features and mechanisms such as described herein above. The openings in the ducts may retain their upper and/or lower structure like a frame or support.

FIG. 77c illustrates ducts which may be completely open without the supporting frames described in FIG. 77b so that the opened portion of the duct is removed leaving the duct as an incomplete circle or cavity. Such open duct can however be also encircled with a mesh or other protector against forward facing objects and debris, also for protection from collision or injury, especially from and to the rotating fans inside the open duct/cavity.

It should be appreciated that the side forces and the various separators and provisions described herein above may also apply when the vehicle is in detaching positions from an object.

While the invention has been described with respect to several preferred embodiments, it will be appreciated that these are set forth merely for purposes of example, and that many other variations, modifications and applications of the invention will be apparent.

What is claimed is:

1. A ducted flow vehicle comprising: a fuselage having a longitudinal axis and supporting front and rear airflow ducts, each duct having a prime mover arranged to force surrounding air into said duct through an inlet at an upper end thereof thereby creating a lifting force directed substantially along a duct axis and wherein said ducts are formed with open areas along opposite sides of said fuselage configured for reducing sensitivity to side winds during flight of the vehicle.

2. The vehicle of claim 1 wherein said open areas comprise adjustable openings in walls forming said ducts.

3. The vehicle of claim 1 wherein each duct is provided with inlet and outlet vanes and wherein said open areas are between planes containing said inlet and outlet vanes.

4. The vehicle of claim 1 wherein a plurality of adjustable vanes extend across said inlets of said ducts and wherein at least some of said vanes are pivotably adjustable to an orientation substantially parallel with air streams entering said ducts.

* * * * *